United States Patent
Hoobler et al.

(10) Patent No.: US 9,858,460 B2
(45) Date of Patent: Jan. 2, 2018

(54) BARCODE-READING SYSTEM HAVING CIRCUITRY FOR GENERATING A BARCODE READ SIGNAL ON A MICROPHONE INPUT CONNECTOR OF A MOBILE DEVICE

(71) Applicant: The Code Corporation, Draper, UT (US)

(72) Inventors: Ryan Hoobler, Salt Lake City, UT (US); George Powell, Draper, UT (US); Ming Lei, Princeton Junction, NJ (US); Eric Alldredge, Herriman, UT (US)

(73) Assignee: The Code Corporation, Draper, UT (US)

(*) Notice: Subject to any disclaimer, the term of this patent is extended or adjusted under 35 U.S.C. 154(b) by 164 days.

(21) Appl. No.: 14/799,464

(22) Filed: Jul. 14, 2015

(65) Prior Publication Data

US 2015/0356336 A1 Dec. 10, 2015

Related U.S. Application Data

(63) Continuation-in-part of application No. 14/581,821, filed on Dec. 23, 2014, and a continuation-in-part of
(Continued)

(51) Int. Cl.
*G06K 7/10* (2006.01)
*G06K 7/04* (2006.01)
(Continued)

(52) U.S. Cl.
CPC ....... *G06K 7/10722* (2013.01); *G06K 7/0004* (2013.01); *G06K 7/089* (2013.01);
(Continued)

(58) Field of Classification Search
CPC ............ G06K 7/1404; G06K 7/10821; G06K 7/10831; G06K 7/10881; G06K 7/1098;
(Continued)

(56) References Cited

U.S. PATENT DOCUMENTS 8,162,218 B2 4/2012 Meier
8,750,637 B2 6/2014 Stroem
(Continued)

FOREIGN PATENT DOCUMENTS

| CN | 203838715 U | * | 9/2014 |
|---|---|---|---|
| JP | 2004032507 A | | 1/2004 |
| WO | 2015083979 | | 6/2015 |

OTHER PUBLICATIONS

English equivalent machine translation, retrieved Apr. 2, 2017, https://worldwide.espacenet.com/publicationDetails/biblio?CC=CN&NR=203838715U&KC=U&FT=D&ND=3&date=20140917&DB=EPODOC&locale=en_EP#.*

*Primary Examiner* — Suezu Ellis
(74) *Attorney, Agent, or Firm* — Timothy P. O'Hagan; Ray Quinney & Nebeker

(57) ABSTRACT

Described herein is a barcode reading system that comprises a barcode reading enhancement accessory secured to a mobile device. The mobile device comprises a camera. The barcode reading enhancement accessory comprises a user-activated barcode read control and circuitry for generating a barcode read signal on the microphone input connector of the mobile device in response to user activation of the barcode read control. The barcode reading system also comprises a barcode reading application that comprises an image capture and decode function for controlling the camera to capture an image of a barcode within the field of view of the camera and generating decoded data representing data
(Continued)

encoded in the barcode in response to the barcode read signal on the microphone input connector.

36 Claims, 32 Drawing Sheets

Related U.S. Application Data application No. 14/527,594, filed on Oct. 29, 2014, which is a continuation-in-part of application No. 13/644,356, filed on Oct. 4, 2012, now abandoned, application No. 14/799,464, which is a continuation-in-part of application No. 13/708,835, filed on Dec. 7, 2012, now abandoned.

(51) Int. Cl.
| | |
|---|---|
| *G06K 7/08* | (2006.01) |
| *H04M 1/02* | (2006.01) |
| *G06K 7/00* | (2006.01) |
| *H02J 7/00* | (2006.01) |
| *H01M 2/10* | (2006.01) |

(52) U.S. Cl.
CPC ..... *G06K 7/10732* (2013.01); *G06K 7/10831* (2013.01); *G06K 7/10881* (2013.01); *H02J 7/0045* (2013.01); *H04M 1/026* (2013.01); *H04M 1/0254* (2013.01); *H01M 2/1022* (2013.01); *H01M 2/1066* (2013.01); *H01M 2220/30* (2013.01)

(58) Field of Classification Search
CPC .... G06K 2007/10524; A45C 2011/002; H04B 1/3888; H04M 1/21; H04M 1/0264; H04M 1/0249; H04M 1/0252; H04M 1/0254; H04M 1/0258; H04M 1/72527; H01R 24/58
USPC ............ 235/462.43, 462.45, 462.47, 462.48
See application file for complete search history.

(56) References Cited

U.S. PATENT DOCUMENTS

| | | |
|---|---|---|
| 9,257,396 B2 | 2/2016 | Uzoh |
| 2003/0025822 A1 | 2/2003 | Shimada |
| 2003/0030923 A1 | 2/2003 | Hsu |
| 2004/0056956 A1 | 3/2004 | Gardiner et al. |
| 2006/0131419 A1 | 6/2006 | Nunnik |
| 2006/0284987 A1 | 12/2006 | Wolf, II |
| 2007/0158220 A1 | 7/2007 | Cleereman et al. |
| 2007/0205287 A1 | 9/2007 | Tien |
| 2008/0142599 A1 | 6/2008 | Benillouche |
| 2012/0061462 A1* | 3/2012 | Shadwell, Jr. ... G06K 19/06112 235/375 |
| 2013/0109316 A1 | 5/2013 | Lee |
| 2013/0155253 A1 | 6/2013 | Wood |
| 2014/0017955 A1* | 1/2014 | Lo ........................ H01R 13/703 439/668 |
| 2014/0171150 A1 | 6/2014 | Hurst et al. |
| 2014/0313377 A1 | 10/2014 | Hampton |
| 2014/0327815 A1 | 11/2014 | Auger |
| 2015/0126244 A1* | 5/2015 | Moran .................. G06K 9/209 455/556.1 |
| 2015/0126245 A1* | 5/2015 | Barkan ............... H04M 1/0254 455/556.1 |
| 2015/0317503 A1* | 11/2015 | Powell ............... G06K 7/10831 235/455 |
| 2016/0012269 A1 | 1/2016 | Kowalczyk et al. |
| 2016/0104016 A1* | 4/2016 | Deal .................... G06K 7/0004 235/462.15 |
| 2016/0104017 A1* | 4/2016 | Deal .................... G06K 7/0004 235/462.07 |
| 2016/0171357 A1* | 6/2016 | Kwon .................... G06Q 50/10 358/1.15 |
| 2016/0180128 A1* | 6/2016 | Utykanski .......... G06K 7/10564 235/462.42 |
| 2016/0180129 A1* | 6/2016 | Utykanski .......... G06K 7/10722 235/462.42 |
| 2016/0188932 A1* | 6/2016 | Powell ............... G06K 7/10564 235/462.42 |
| 2016/0188933 A1* | 6/2016 | Powell ............... G06K 7/10564 235/462.42 |
| 2016/0188934 A1* | 6/2016 | Powell ............... G06K 7/10564 235/462.42 |
| 2016/0232389 A1 | 8/2016 | Gifford |
| 2016/0321483 A1* | 11/2016 | Utykanski ............ G06K 7/0004 |
| 2016/0321485 A1* | 11/2016 | Utykanski .......... G06K 7/10811 |
| 2016/0373629 A1 | 12/2016 | Jung |
| 2017/0004340 A1* | 1/2017 | Powell ................. G06K 7/0004 |

* cited by examiner

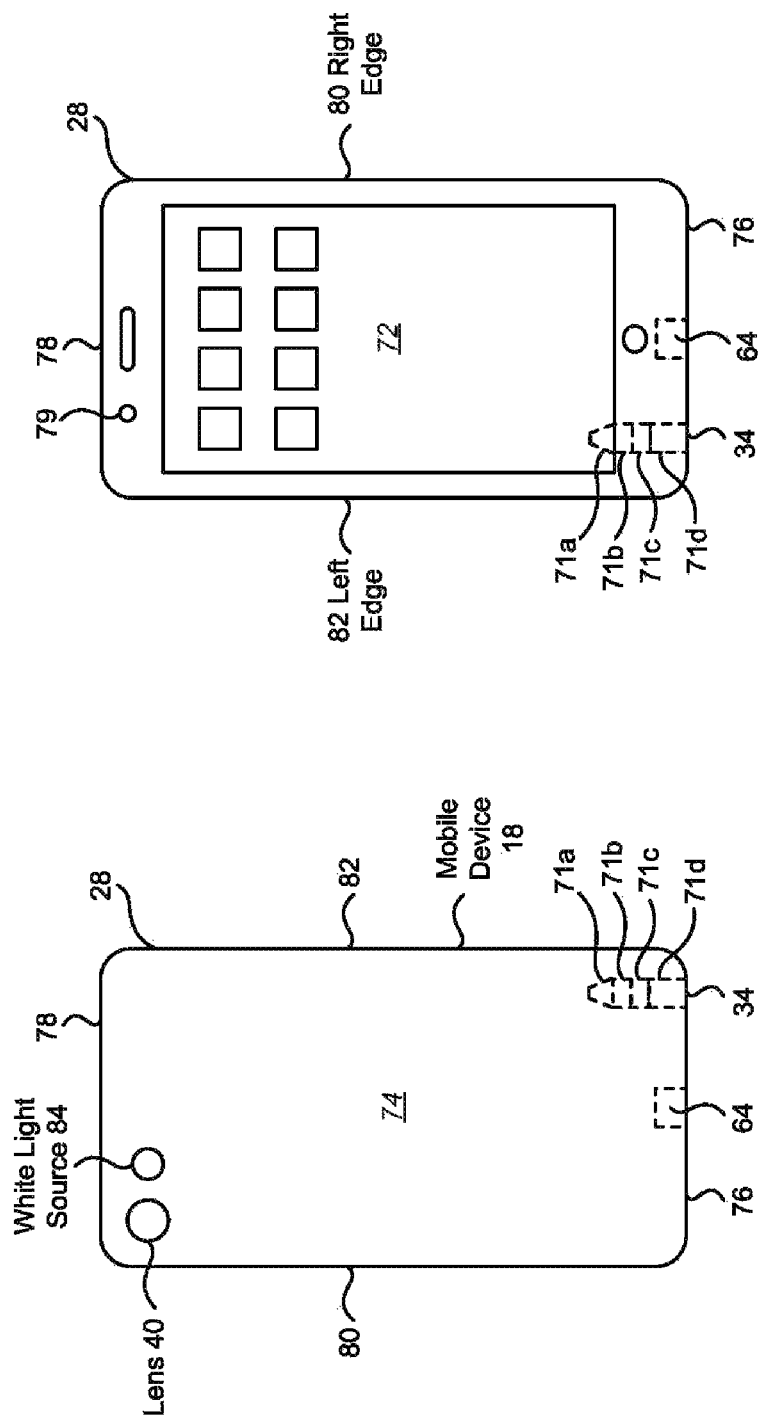

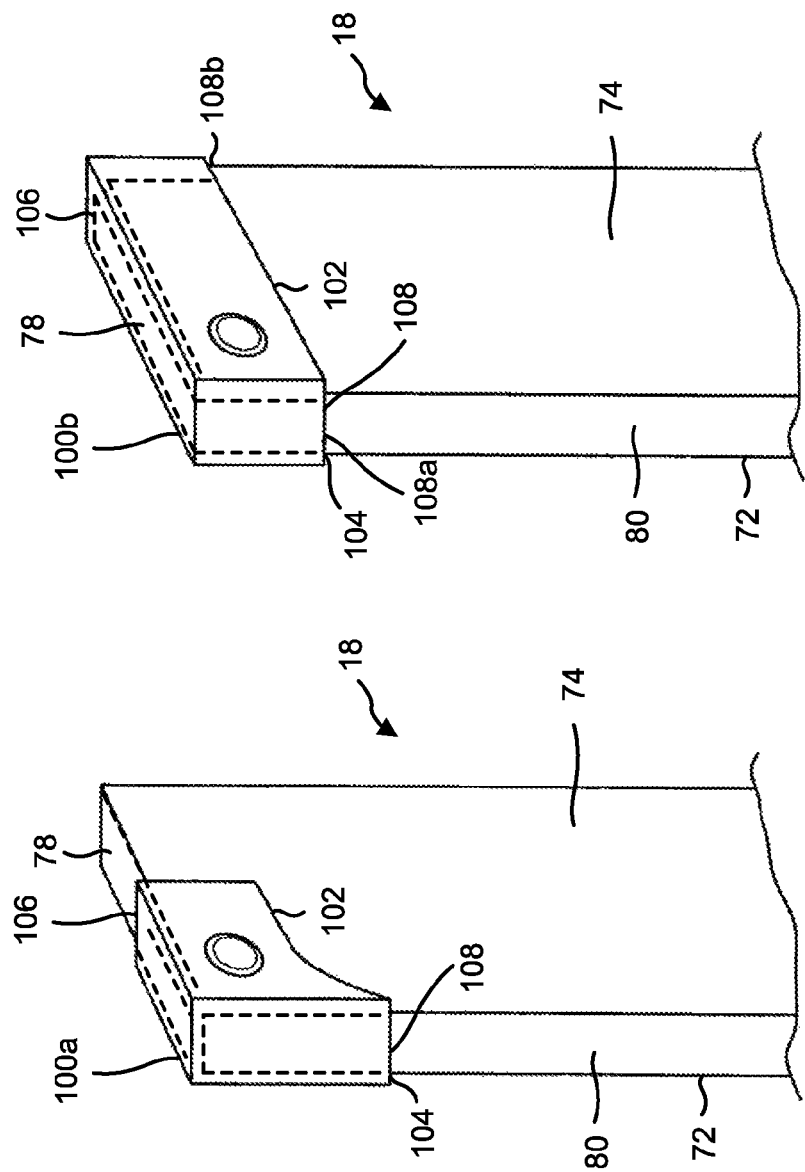

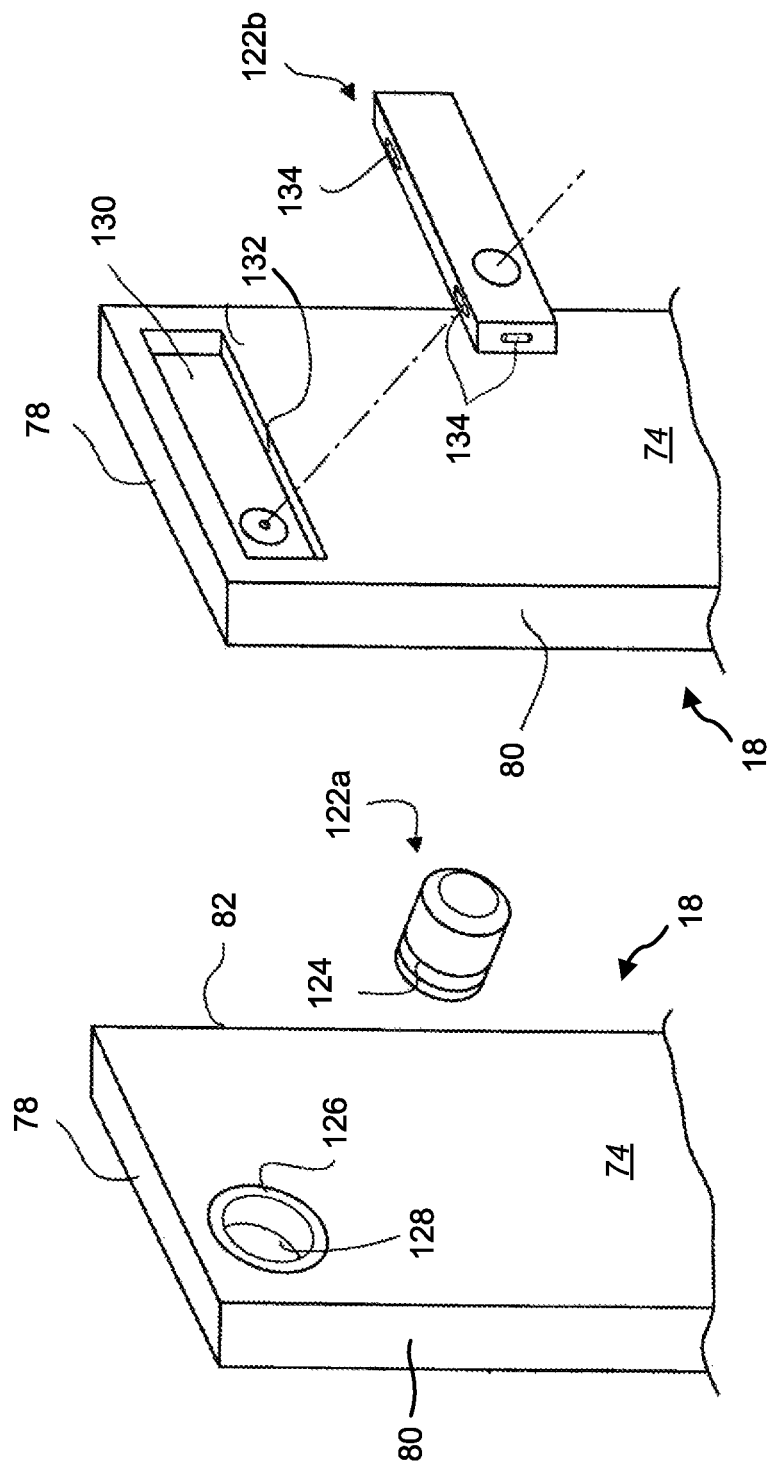

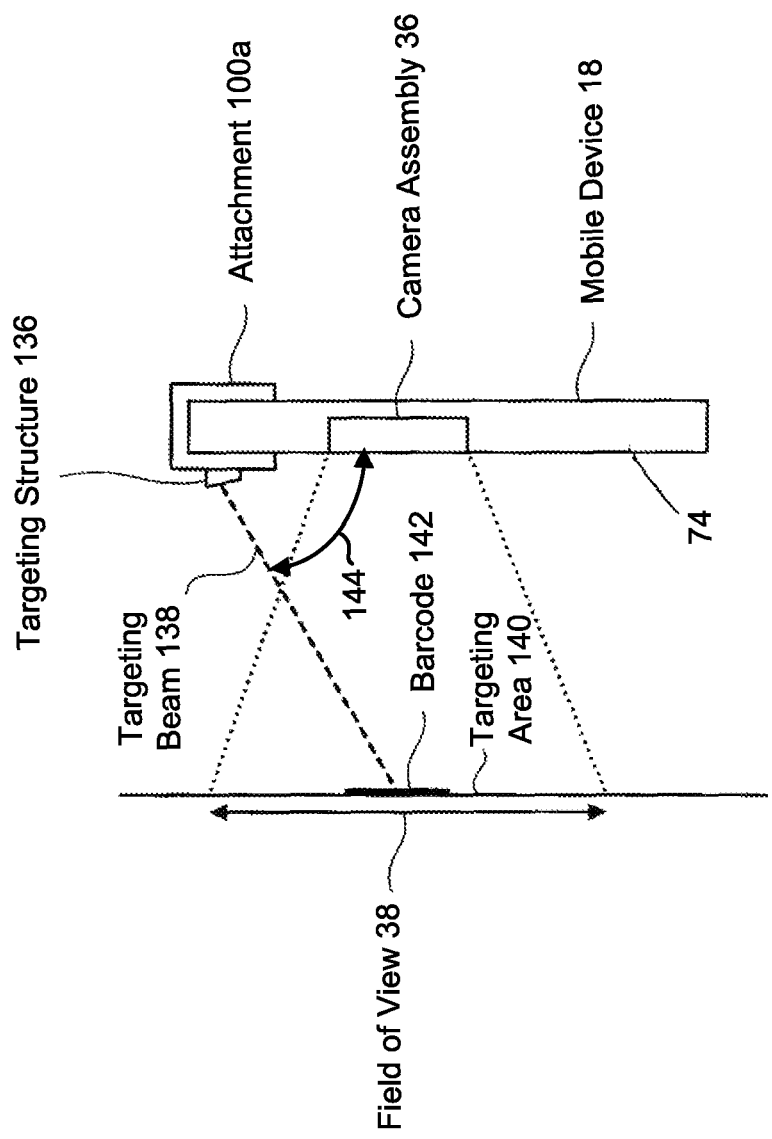

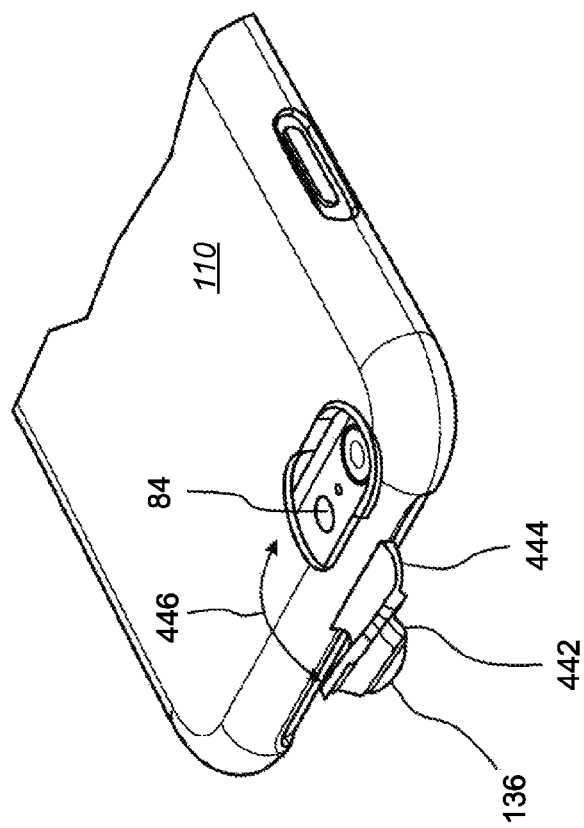
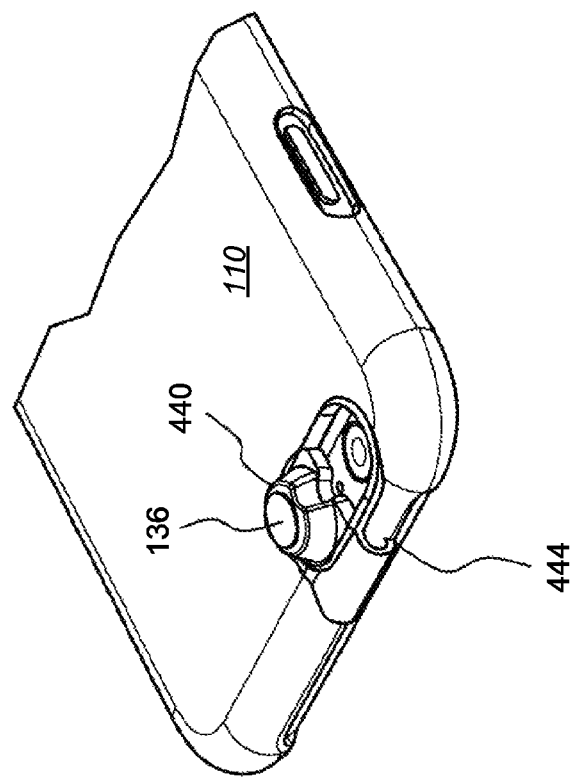
FIG. 12A
FIG. 12B

BARCODE-READING SYSTEM HAVING CIRCUITRY FOR GENERATING A BARCODE READ SIGNAL ON A MICROPHONE INPUT CONNECTOR OF A MOBILE DEVICE

RELATED APPLICATIONS

This application is a continuation-in-part of U.S. patent application Ser. No. 14/581,821 filed Dec. 23, 2014, and entitled "BARCODE-READING ENHANCEMENT SYSTEM FOR A COMPUTING DEVICE THAT COMPRISES A CAMERA AND AN ILLUMINATION SYSTEM". This application is also a continuation-in-part of U.S. patent application Ser. No. 14/527,594, filed Oct. 29, 2014, and entitled "IMPROVING THE BARCODE-READING CAPABILITIES OF A PORTABLE, HAND-HELD COMPUTING DEVICE THAT COMPRISES A CAMERA" which is a Continuation-in-Part of Ser. No. 13/644,356, filed Oct. 4, 2012, and entitled "HAND-HELD ELECTRONIC DEVICE ACCESSORY THAT FACILITATES RAPID BATTERY REPLACEMENT". This application is also a continuation-in-part of U.S. patent application Ser. No. 13/708,835, filed Dec. 7, 2012, and entitled "AN ATTACHMENT INCLUDING A MIRROR THAT CHANGES AN OPTICAL PATH OF CAMERA DEVICE". All of the foregoing patent applications along with: i) patent application Ser. No. 14/319,193, filed Jun. 30, 2014, and entitled "BARCODE READING SYSTEM INCLUDING A SLED READER AND RELAY APPLICATION"; ii) patent application Ser. No. 14/717,112, filed May 20, 2015 and entitled "BARCODE READER"; and iii) patent application Ser. No. 14/510,341, filed Oct. 9, 2014 and entitled "DIFFUSE BRIGHT FIELD ILLUMINATION SYSTEM FOR A BARCODE READER," are incorporated by reference as though set forth herein in their entirety.

BACKGROUND

Smartphones (and other types of portable, hand-held computing devices, such as tablet computers) are in widespread use today, most often in connection with entertainment, communications and office productivity. Most smartphones include a camera, and applications have been developed for using the camera to read barcodes. In a typical known application an image feed from the camera is displayed on the display screen of the smart phone. The user moves the smart phone with respect to the barcode until the image of the barcode is centered on the display screen and the application decodes the barcode. A problem exists in that this process is too time consuming for most non-consumer barcode reading applications. Further, the smart phone camera system and illumination system are not optimized for reading a barcode and therefore using a smart phone for barcode reading is much less efficient than utilizing a traditional barcode reader.

SUMMARY

This patent specification relates generally to improving the barcode-reading capabilities of a smartphone, a tablet computer, or any other portable, hand-held computing device that comprises a camera (hereinafter, "mobile device"). More specifically, this patent specification describes a barcode reading enhancement system for a mobile device.

The mobile device may comprise a camera, a white light source for projecting a field of illumination into a field of view of the camera, a memory and a processor for executing an operating system and applications stored in the memory.

The barcode reading enhancement system may include a barcode reading enhancement accessory secured to the mobile device and a barcode reading application stored in the memory and executable by the processor of the mobile device.

The barcode reading enhancement accessory secured to the mobile device may comprise at least one optic system. The at least one optic system: i) may be positioned within the field of illumination of the white light source for modifying the field of illumination; or ii) may be positioned within the field of view of the camera for modifying illumination reflected from objects within the field of view of the camera.

The barcode reading application may include: i) an image capture function for controlling the white light source and the camera to capture an image of a barcode, the image of the barcode being affected by the at least one optic system; ii) a decoder function for receiving the image of a barcode and generating decoded data representing data encoded in the barcode; and iii) a relay function for sending the decoded data to a remote server via a wireless connection established between the mobile device and a network.

The operating system may further include an application retrieval function. The application retrieval function may be the exclusive means for obtaining the barcode reading application and loading the barcode reading application to the memory. The application retrieval function may be configured to connect to a remote application server via a network and identify the mobile device to the application server. The application retrieval function may be further configured to control a user interface of the mobile device to enable a user of the mobile device to identify the barcode reading application for downloading from the application server, download the barcode reading application from the application server and install the barcode reading application to the memory for execution by the processor. The barcode reading application may be downloaded in a form of an install file, the install file may be written to the memory, and an executable file may be built from the install file and written to memory for execution by the processor.

The at least one optic system of the accessory may include a target-generating structure for modifying the field of illumination of the white light source to emit a targeting pattern of illumination into the field of view of the camera of the mobile device. The target-generating structure may further include an illumination filter positioned within the field of illumination of the white light source for passing a portion of the spectrum of the illumination from the white light source. As such, the targeting pattern may be of a color corresponding to the portion of the spectrum passed by the illumination filter.

The illumination filter may be a narrow band filter for passing a narrow band of the spectrum (such as blue) and attenuating portions of the spectrum to each side of the narrow band.

The optic system may further include a camera filter positioned within the field of view of the camera for passing a portion of the spectrum of illumination reflected from objects within the field of view of the camera. The camera filter may attenuate the portion of the spectrum passed by the illumination filter.

The target-generating structure may also comprise an optical component for narrowing a field of illumination of the white light source in at least one direction.

The target-generating structure may narrow the field of illumination of the white light source to a divergence angle in the at least one direction that is approximately the same as the divergence angle of the field of view of the camera.

Further yet, the target-generating structure may further narrow the field of illumination of the white light source in a second direction, orthogonal to the first direction, to a divergence angle approximately the same as the divergence angle of the field of view of the camera in the second direction.

The image capture function may be further configured to disable an autofocus function of the camera.

Another aspect of the present specification provides a barcode reading system for a mobile device. The mobile device may comprise a camera having a field of view to a back side of the mobile device, a white light source for projecting a field of illumination towards the back side of the mobile device, a memory, and a processor.

The barcode reading system may comprise a barcode reading enhancement accessory secured to the mobile device and a barcode reading application stored in the memory and executable by the processor of the mobile device.

The barcode reading enhancement accessory may comprise an optic system with a reflective surface for folding the field of view of the camera towards a target area positioned at a top side of the mobile device and a reflective surface for folding the field of illumination of the white light source towards the target area.

The barcode reading application may include: i) an image capture function for controlling the white light source and the camera to capture an image of a barcode in the target area; ii) a decoder function for receiving the image of the barcode and generating decoded data representing data encoded in the barcode; and iii) a relay function for sending the decoded data to a remote server via a wireless connection established between the mobile device and a network.

The optic system may include a target-generating structure for modifying the field of illumination of the white light source to emit a targeting pattern of illumination into the target area.

The optic system may further include an illumination filter positioned within the field of illumination of the white light source for passing a portion of the spectrum of the illumination from the white light source, the targeting pattern being of a color corresponding to the portion of the spectrum passed by the illumination filter.

The illumination filter may be a narrow band filter for passing a narrow band of the spectrum, such as blue light, and attenuating portions of the spectrum to each side of the narrow band.

The optic system may further include a camera filter positioned within the field of view of the camera for passing a portion of the spectrum of illumination reflected from objects within the target area. The camera filter may attenuate the portion of the spectrum passed by the illumination filter.

The target-generating structure may also comprise an optical component for narrowing a field of illumination of the white light source in at least one direction. The target-generating structure may narrow the field of illumination of the white light source to a divergence angle in the at least one direction that is approximately the same as the divergence angle of the field of view of the camera.

Further yet, the target-generating structure may further narrow the field of illumination of the white light source in a second direction, orthogonal to the first direction, to a divergence angle approximately the same as the divergence angle of the field of view of the camera in the second direction.

The image capture function may be further configured to disable an autofocus function of the camera.

Another aspect of the present specification comprises a method of reading a barcode utilizing a mobile device. The mobile device may comprise a camera, a white light source for projecting a field of illumination into a field of view of the camera, a memory and a processor for executing applications including an operating system stored in the memory.

The method may comprise: i) directing the operating system to obtain a barcode reading application from a remote application server and to install the barcode reading application in the memory for execution by the processor; ii) securing a barcode reading enhancement accessory to the mobile device; and iii) executing the barcode reading application by the processor.

The barcode reading enhancement accessory may comprise at least one optic system, the at least one optic system: i) being positioned within the field of illumination of the white light source for modifying the field of illumination; or ii) being positioned within the field of view of the camera for modifying illumination reflected from objects within the field of view of the camera.

Execution of the barcode reading application may comprise: i) execution of an image capture function to control the white light source and the camera to capture an image of a barcode, the image of the barcode being affected by the at least one optic system; ii) execution of a decoder function to generate decoded data representing data encoded in the barcode; and iii) execution of a relay function to send the decoded data to a remote server via a wireless connection established between the mobile device and a network.

The optic system may include a target-generating structure for modifying the field of illumination of the white light source to emit a targeting pattern of illumination into the target area.

The optic system may further include an illumination filter positioned within the field of illumination of the white light source for passing a portion of the spectrum of the illumination from the white light source, the targeting pattern being of a color corresponding to the portion of the spectrum passed by the illumination filter.

The illumination filter may be a narrow band filter passing a narrow band of the spectrum, such as blue light, and attenuating portions of the spectrum to each side of the narrow band.

The optic system may further include a camera filter positioned within the field of view of the camera for passing a portion of the spectrum of illumination reflected from objects within the target area. The camera filter may attenuate the portion of the spectrum passed by the illumination filter.

The target-generating structure may also comprise an optical component for narrowing a field of illumination of the white light source in at least one direction. The target-generating structure may narrow the field of illumination of the white light source to a divergence angle in the at least one direction that is approximately the same as the divergence angle of the field of view of the camera.

Further yet, the target-generating structure may further narrow the field of illumination of the white light source in a second direction, orthogonal to the first direction, to a divergence angle approximately the same as the divergence angle of the field of view of the camera in the second direction.

The image capture function may be further configured to disable an autofocus function of the camera.

Another aspect of the present specification comprises a method of reading a barcode utilizing a mobile device. The mobile device may comprise a camera having a field of view to a back side of the mobile device, a white light source for projecting a field of illumination towards the back side of the mobile device, a memory and a processor.

The method may comprise: i) directing the operating system to obtain a barcode reading application from a remote application server and to install the barcode reading application in memory for execution by the processor; ii) securing a barcode reading enhancement accessory to the mobile device, and iii) executing the barcode reading application by the processor.

The barcode reading enhancement accessory may comprise an optic system with a reflective surface for folding the field of view of the camera towards a target area positioned at a top side of the mobile device and a reflective surface for folding the field of illumination of the white light source towards the target area.

Execution of the barcode reading application may comprise: i) execution of an image capture function to control the white light source and the camera to capture an image of a barcode in the target area; ii) execution of a decoder function to generate decoded data representing data encoded in the barcode; and iii) execution of a relay function to send the decoded data to a remote server via a wireless connection established between the mobile device and a network.

The optic system may include a target-generating structure for modifying the field of illumination of the white light source to emit a targeting pattern of illumination into the target area.

The optic system may further include an illumination filter positioned within the field of illumination of the white light source for passing a portion of the spectrum of the illumination from the white light source, the targeting pattern being of a color corresponding to the portion of the spectrum passed by the illumination filter.

The illumination filter may be a narrow band filter for passing a narrow band of the spectrum, such as blue light, and attenuating portions of the spectrum to each side of the narrow band.

The optic system may further include a camera filter positioned within the field of view of the camera for passing a portion of the spectrum of illumination reflected from objects within the target area. The camera filter may attenuate the portion of the spectrum passed by the illumination filter.

The target-generating structure may also comprise an optical component for narrowing a field of illumination of the white light source in at least one direction. The target-generating structure may narrow the field of illumination of the white light source to a divergence angle in the at least one direction that is approximately the same as the divergence angle of the field of view of the camera.

Further yet, the target-generating structure may further narrow the field of illumination of the white light source in a second direction, orthogonal to the first direction, to a divergence angle approximately the same as the divergence angle of the field of view of the camera in the second direction.

The image capture function may be further configured to disable an autofocus function of the camera.

Another aspect of the present specification comprises a barcode reading system for a mobile device. The mobile device may comprise a camera for capturing an image of a field of view, a microphone input connector, a memory and a processor for executing applications including an operating system stored in the memory.

The barcode reading system may comprise a barcode reading enhancement accessory secured to the mobile device and a barcode reading application stored in the memory and executable by the processor.

The barcode reading enhancement accessory may comprise: i) a user-activated barcode read control; and ii) circuitry for generating a barcode read signal on the microphone input connector of the mobile device in response to user activation of the barcode read control.

The barcode reading application may include an image capture and decode function for controlling the camera to capture an image of a barcode within the field of view and generating decoded data representing data encoded in the barcode in response to the barcode reading enhancement accessory generating the barcode read signal on the microphone input connector.

The microphone input connector may be embodied, for example, in a four-contact audio jack. The four-contact audio jack may comprise a ground contact, a left speaker contact, a right speaker contact, and a microphone contact. The microphone input connector may comprise the microphone contact and the ground contact.

The barcode reading enhancement accessory may comprise a mating audio jack configured to be inserted into the four-contact audio jack of the mobile device when the barcode reading enhancement accessory is secured to the mobile device. When the mating audio jack is inserted into the four-contact audio jack, the mating audio jack comprises at least a ground contact coupled to the ground contact of the four-contact audio jack and a microphone contact coupled to the microphone contact of the four-contact audio jack. Generating the barcode read signal on the microphone input connector may comprise at least one of: i) generating a potential differential between the ground contact and the microphone contact; and/or ii) modifying a potential differential between the ground contact and the microphone contact.

The user-activated barcode read control may be a mechanical control which, when activated, moves a magnetic field with respect to a conductor to generate the potential differential between the ground contact and the microphone contact.

The barcode reading enhancement accessory may comprise a gun-shaped case for the mobile device that includes a handle extending downward from a back side of the mobile device, the back side of the mobile device being parallel to an upward-facing face side of the mobile device, the face side including a display screen.

The mechanical control may be embodied as a trigger switch positioned where the handle meets a portion of the case adjacent to the back side of the mobile device.

The mobile device camera may have a field of view to the back side of the mobile device. The barcode reading enhancement accessory may further comprise an optic system with a reflective surface for folding the field of view of the camera towards a target area positioned at the top side of the mobile device.

The mobile device may further include a white light source for projecting a field of illumination towards the back side of the mobile device and the optic system may further include a reflective surface for folding the field of illumination of the white light source towards the target area.

The optic system may include a target-generating structure for modifying the field of illumination of the white light source to emit a targeting pattern of illumination into the target area.

The optic system may further include an illumination filter positioned within the field of illumination of the white light source for passing a portion of the spectrum of the illumination from the white light source, the targeting pattern being of a color corresponding to the portion of the spectrum passed by the illumination filter.

The illumination filter may be a narrow band filter for passing a narrow band of the spectrum, such as blue light, and attenuating portions of the spectrum to each side of the narrow band.

The optic system may further include a camera filter positioned within the field of view of the camera for passing a portion of the spectrum of illumination reflected from objects within the target area. The camera filter may attenuate the portion of the spectrum passed by the illumination filter.

The target-generating structure may also comprise an optical component for narrowing a field of illumination of the white light source in at least one direction. The target-generating structure may narrow the field of illumination of the white light source to a divergence angle in the at least one direction that is approximately the same as the divergence angle of the field of view of the camera.

Further yet, the target-generating structure may further narrow the field of illumination of the white light source in a second direction, orthogonal to the first direction, to a divergence angle approximately the same as the divergence angle of the field of view of the camera in the second direction.

Another aspect of the present specification may comprise a method of reading a barcode utilizing a mobile device. The mobile device may comprise a camera for capturing an image of a field of view, a microphone input connector, a memory, and a processor for executing applications including an operating system stored in the memory.

The method may comprise: i) directing the operating system to obtain a barcode reading application from a remote application server and to install the barcode reading application in the memory for execution by the processor; ii) securing a barcode reading enhancement accessory to the mobile device; and iii) executing the barcode reading application by the processor.

The barcode reading enhancement accessory may comprise: i) a user-activated barcode read control; and ii) circuitry for generating a barcode read signal on the microphone input connector of the mobile device in response to user activation of the barcode read control.

Executing the barcode reading application may capture an image of a barcode within the field of view of the camera and generate decoded data representing data encoded in the barcode in response to the barcode reading enhancement accessory generating the barcode read signal on the microphone input connector.

The microphone input connector may be embodied, for example, in a four-contact audio jack. The four-contact audio jack may comprise a ground contact, a left speaker contact, a right speaker contact, and a microphone contact. The microphone input connector may comprise the microphone contact and the ground contact.

The barcode reading enhancement accessory may comprise a mating audio jack configured to be inserted into the four-contact audio jack of the mobile device when the barcode reading enhancement accessory is secured to the mobile device. When the mating audio jack is inserted into the four-contact audio jack, the mating audio jack comprises at least a ground contact coupled to the ground contact of the four-contact audio jack and a microphone contact coupled to the microphone contact of the four-contact audio jack. Generating the barcode read signal on the microphone input connector may comprise at least one of: i) generating a potential differential between the ground contact and the microphone contact; and ii) modifying a potential differential between the ground contact and the microphone contact.

The user-activated barcode read control may be a mechanical control which, when activated, moves a magnetic field with respect to a conductor to generate the potential differential between the ground contact and the microphone contact.

The accessory may comprise a gun-shaped case for the mobile device that includes a handle extending downward from a back side of the mobile device, the back side of the mobile device being parallel to an upward-facing face side of the mobile device, the face side including a display screen.

The mechanical control may be embodied as a trigger switch positioned where the handle meets a portion of the case adjacent to the back side of the mobile device.

The mobile device camera may have a field of view to the back side of the mobile device. The barcode reading enhancement accessory may further comprise an optic system with a reflective surface for folding the field of view of the camera towards a target area positioned to the top side of the mobile device.

The mobile device may further include a white light source for projecting a field of illumination towards the back side of the mobile device and the optic system may further include a reflective surface for folding the field of illumination of the white light source towards the target area.

The optic system may include a target-generating structure for modifying the field of illumination of the white light source to emit a targeting pattern of illumination into the target area.

The optic system may further include an illumination filter positioned within the field of illumination of the white light source for passing a portion of the spectrum of the illumination from the white light source, the targeting pattern being of a color corresponding to the portion of the spectrum passed by the illumination filter.

The illumination filter may be a narrow band filter for passing a narrow band of the spectrum, such as blue light, and attenuating portions of the spectrum to each side of the narrow band.

The optic system may further include a camera filter positioned within the field of view of the camera for passing a portion of the spectrum of illumination reflected from objects within the target area. The camera filter may attenuate the portion of the spectrum passed by the illumination filter.

The target-generating structure may also comprise an optical component for narrowing a field of illumination of the white light source in at least one direction. The target-generating structure may narrow the field of illumination of the white light source to a divergence angle in the at least one direction that is approximately the same as the divergence angle of the field of view of the camera.

Further yet, the target-generating structure may further narrow the field of illumination of the white light source in a second direction, orthogonal to the first direction, to a divergence angle approximately the same as the divergence angle of the field of view of the camera in the second direction.

BRIEF DESCRIPTION OF THE DRAWINGS

FIGS. 2B and 2C show a back side surface and a face surface of an exemplary mobile device that may be used in the barcode reading system.

FIGS. 4A and 4B illustrate an exemplary corner-positioned attachment useful in a barcode reading enhancement system.

FIGS. 6A and 6B illustrate an exemplary mounted attachment useful in a barcode reading enhancement system.

FIGS. 7A and 7B illustrate an exemplary target-generating mechanism useful for implementing in an attachment in a barcode reading enhancement system.

FIGS. 12A-12D illustrate an exemplary attachment for a barcode reading enhancement system which includes a target-generating mechanism.

DETAILED DESCRIPTION

Figure 1:
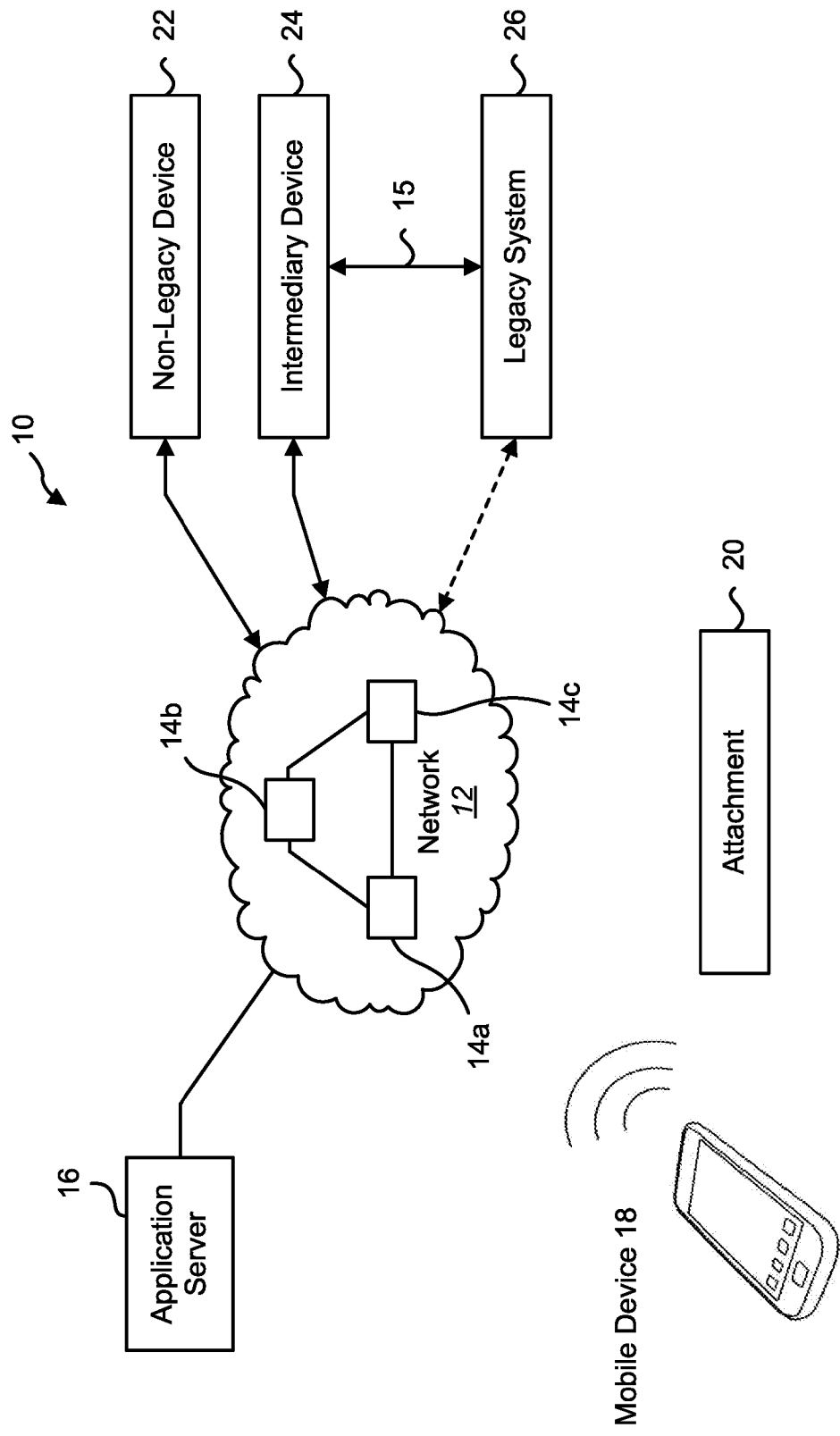
FIG. 1 illustrates an example of a barcode reading system.

FIG. 1 depicts an exemplary barcode reading system 10. The barcode reading system 10 comprises a network 12 which may interconnect one or more mobile device(s) 18, an application server 16, a non-legacy system 22, an intermediary device 24, and a legacy system 26. The barcode reading system 10 further includes one or more attachments 20 associated with at least one or more mobile devices 18.

The network 12 may comprise any combination of one or more networks which support Internet Protocol (IP) communication including local area networks, internet service provider (ISP) networks, and internet backbone networks. Any of such one or more networks may be implemented utilizing an optical fiber, a co-axial cable, traditional conductors, or they may be implemented wirelessly, as the physical communication medium. The wireless communication may utilize any permutation of: i) a wide area network (WAN) communications protocol such as Wideband Code Division Multiple Access (WCDMA), High Speed Packet Access (HSPA), cdma2000, Long Term Evolution (LTE), and other similar long range wireless communication protocols; and/or ii) a local area network (LAN) communication protocol such as Wi-Fi (IEEE 802.11) or similar wireless local area communication protocols.

Mobile Device

As used in this patent specification and the accompanying claims, the term "mobile device" will be used to describe a portable, hand-held computing device that comprises a camera. As indicated above, one example of a mobile device is a smartphone. Another example of a mobile device is a tablet computer. Yet another example is a hybrid tablet/smartphone device, often nicknamed a "phablet."

As used herein, the term "camera" refers to an apparatus for capturing a digital image of a field of view. A camera that is included in a mobile device (such as a smartphone, a tablet computer, etc.) typically comprises a lens and an image sensor.

Figure 2A:
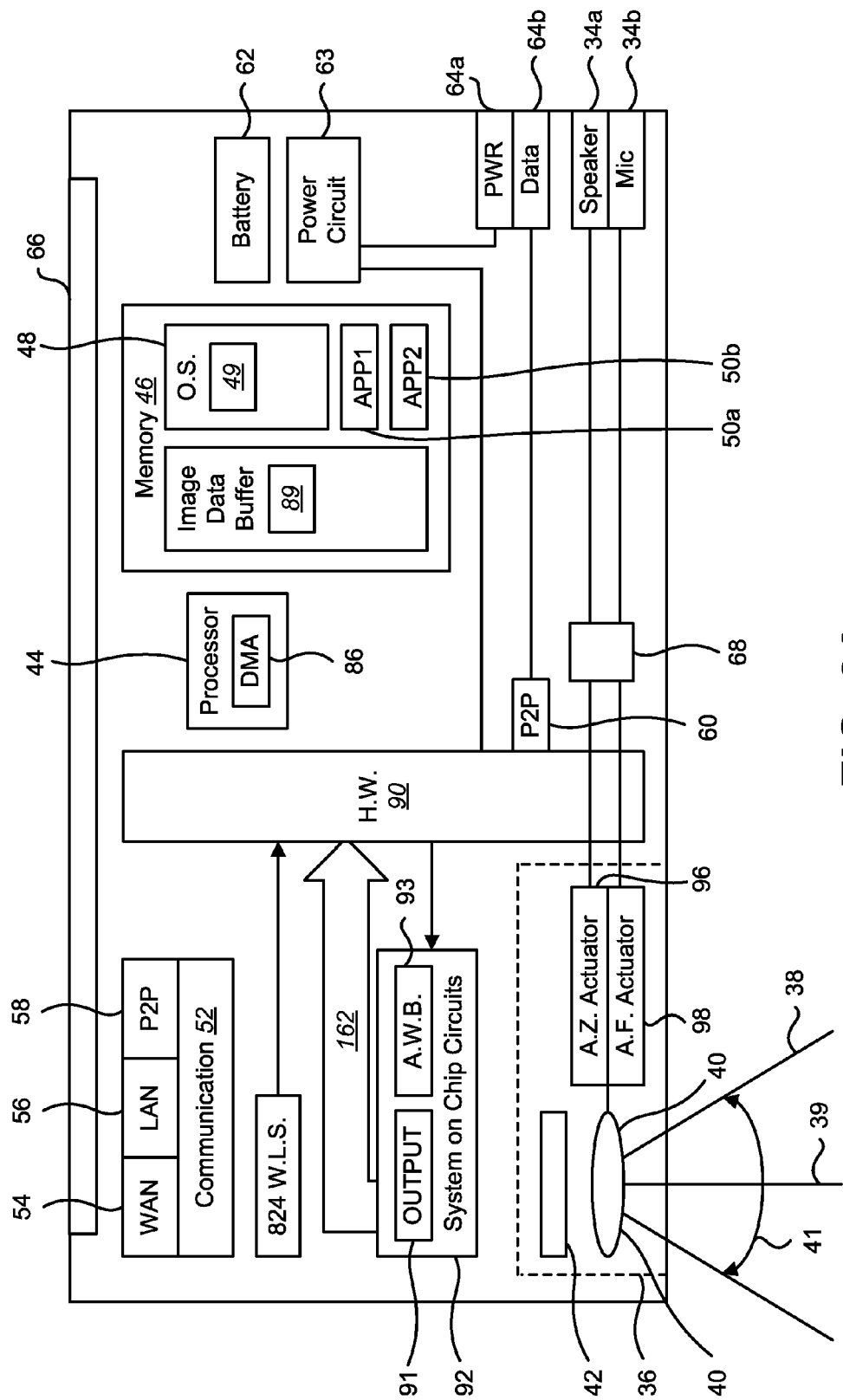
FIG. 2A is a block diagram of an exemplary mobile device useful in a barcode reading system.

FIG. 2A is a block diagram of an exemplary mobile device. FIGS. 2B and 2C illustrate a back side surface and a face surface of an exemplary mobile device. Referring to FIGS. 2B and 2C, the mobile device 18 may comprise a housing 28 with a plurality of external surfaces such as a face surface 72 and a back surface 74 which is generally parallel to the face surface 72 and separated from the face surface 72 by four (4) edge surfaces (each orthogonal to, and extending about the perimeter of, both the face surface 72 and the back surface 74 including a bottom edge 76, a top edge 78 (which is parallel to the bottom edge surface 76), a right edge 80 and a left edge 82 (which is parallel to the right edge 80).

The face surface 72 may include a user interface such as a capacitive multi-touch display screen (with a glass cover) 66 (shown in FIG. 2A) which may define the face surface 72 of the housing 28. The face surface 72 may also include a front-facing camera 79 with a field of view extending from the face surface 72—opposite (180 degrees opposed) to the field of view of the camera 36.

Referring to FIG. 2C, the nomenclature bottom edge 76, top edge 78, right edge 80, and left edge 82 have been chosen because they correspond to the bottom, top, right, and left sides of the display screen 66 of the face surface when the display screen 66 is operated in a portrait mode. Each of the right edge 80 and the left edge 82 may be of equal length and longer than each of the bottom edge 76 and the top edge 78 (which may also be of equal length).

Referring to FIG. 2A, the mobile device 18 may include a processor 44 and memory 46. The processor 44 may be embodied as a combination of one or more microprocessors, microcontrollers, digital signal processors (DSP) and, when operating, may execute instructions (in the form of an operating system and/or applications) stored in the memory 46. The memory 46 may be any component capable of storing electronic information, including an operating system and/or application instructions executable by the processor 44, and may be embodied as read-only memory (ROM), random access memory (RAM), magnetic disk storage media, optical storage media, flash memory devices in RAM, on-board memory included with the processor 44, erasable programmable read-only memory (EPROM) memory, electrically erasable programmable read-only memory (EEPROM) memory, registers, etc.

The memory 46 may include an operating system 48, one or more applications 50a, 50b, and a data buffer including an image data buffer 89. In operation, the processor 44 may execute instructions embodied in the operating system 48 and each of the applications 50a, 50b. Hardware circuits 90 interface the processor 44 with peripheral systems including, but not limited to, a (multi-touch) display screen 66, a wireless communication system 52, a hardwired point-to-point communication system 60, an audio interface 68, a camera assembly 36, and a white light source 84 (e.g., an illuminator or a flash for utilizing the camera assembly 36 for photography).

The wireless communication system 52 may comprise any permutation of: i) a wide area network (WAN) communications module 54 which may utilize Wideband Code Division Multiple Access (WCDMA), High Speed Packet Access (HSPA), cdma2000, Long Term Evolution (LTE), and other similar long-range wireless communication protocols for communication with applicable network infrastructure components 14a-14c of the network 12 (shown in FIG. 1); ii) a local area network (LAN) communications module 56 which may utilize Wi-Fi (IEEE 802.11) or similar wireless local area communication protocols for communication with applicable network infrastructure components 14 of the network 12; and/or iii) a wireless point-to-point communication interface 58 for forming a wireless point-to-point communication link with another compatible system utilizing Bluetooth® or similar wireless point-to-point communication protocols.

The hardwired point-to-point communication interface 60 may utilize Universal Asynchronous Receiver/Transmitter (UART), Universal Serial Bus (USB), and similar communication protocols for communicating with a compatible system connected to a data connector 64b (which may be a part of a single power/data connector 64 such as a USB connector or an Apple® Lightening Connector®.

Figure 2D:
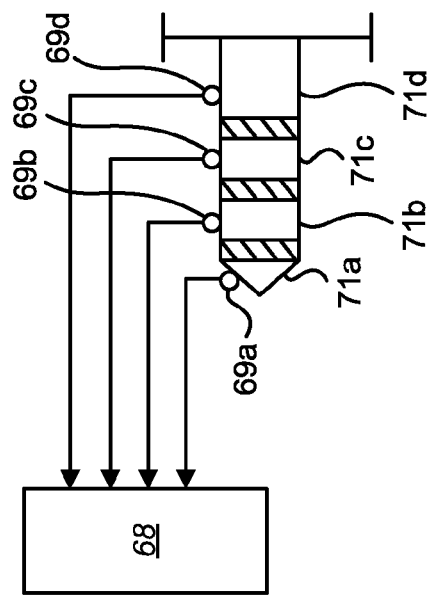
FIG. 2D shows an exemplary TRRS connector.

The audio interface 68 may include circuits for generating analog audio signals on a speaker connector 34a and receiving analog microphone input on a microphone connector 34b. The speaker connector 34a and the microphone connector 34b may be embodied as a single TRRS connector typically referred to as a head-set connector 34. FIG. 2D shows an exemplary TRRS connector. The TRRS connector includes four contacts, tip contact 71a, ring 1 contact 71b, ring 2 contact 71c, and sleeve contact 71d, along the side of recesses 69a, 69b, 69c, 69d which contact the corresponding contacts of the TRRS connector of an audio jack when inserted within the recess. Typically the contacts are for left audio, right audio, microphone, and ground in the order of tip, ring 1, ring 2, and sleeve. A microphone input signal may be a potential difference between the ground contact (sleeve) and the microphone contact (ring 2) generated by a microphone coupled thereto.

Referring to FIG. 2A, the camera assembly 36 may include a (color) photo sensor 42 (i.e., an array of image sensors) positioned parallel to each of the face surface 72 and the back surface 74 and a lens assembly 40 with an optical axis 39 orthogonal to the photo sensor 42 and defining a center line of a camera field of view 38 extending outward from the back surface 74 of the mobile device 18. The photo sensor 42 may include one or more sensors such as charge-coupled display (CCD) sensors, complementary metal-oxide-semiconductor (CMOS) sensors, or the like.

The lens assembly 40 may receive light reflected from objects within the camera field of view 38. The camera field of view 38 may have a camera angular size 41 which may be the angle at which the camera field of view 38 spreads with respect to distance from the lens assembly 40. The lens assembly 40 may have a camera aperture size measured as an f-number which is the ratio of the focal length of the lens assembly 40 to the diameter of the entrance pupil (i.e., the lens aperture (an aperture stop or an inherent aperture of the lens component defining the aperture) as viewed through the front of the lens assembly 40).

The camera assembly 36 may further include an auto zoom module 96 and/or an autofocus module 98 which may serve to control an optical zoom setting and/or autofocus setting of the camera. Autofocus and auto zoom may be controlled by moving the position of at least one of the lenses making up the lens assembly 40 with respect to each other (or with respect to the photo sensor 42) and/or altering the curvature of at least one of the lenses making up the lens assembly 40.

In general, the camera lens assembly 40 and the autofocus module 98 (which compensates for limited depth of field at larger apertures) and the auto zoom module 96 (which adjusts the angular size 41 and image magnification) are designed and/or optimized for general purpose photography, and may therefore not be ideal for barcode capture and/or decoding. More specifically, in a barcode reading application an operator expects to read and decode a barcode in less than 300 ms. The focus and zoom adjustment process requires significantly more time and therefore, if used, it would significantly delay the response time in a barcode reading application.

If the camera lens assembly 40 is fixed (e.g. not adjusted for focus and zoom) at any particular focus and/or zoom setting for the lens assembly 40, the combination of the camera angular size 41 and the camera aperture size affect the camera depth of field (e.g. the range of distances at which a barcode of a particular modular size is imaged onto the photo sensor with sufficient sharpness for decoding). The angular size 41 affects the minimum distance at which a barcode of a certain overall size can be imaged onto the photo sensor 42.

The photo sensor 42 may be coupled to system-on-chip circuits 92 which include an output module 91 and an auto-white balance module 93. In one embodiment, the output module 91 controls the operation of the photo sensor 42 (e.g., exposer, gain, and coupling of pixels to analog-to-digital (A/D) converters for image read out), formats the digital intensity values of each pixel of the photo sensor 42 for color image output, and makes the color image output available for writing to the image data buffer 89.

In another embodiment, the output module 91 may perform image processing on images captured by the photo sensor 42. Control of the photo sensor 42 and image pre-processing are described in more detail in U.S. patent application Ser. No. 14/717,112. The auto-white balance module 93 may perform auto-white balance algorithms on the captured image to enhance the quality of color photographs captured by the photo sensor 42 under different illumination conditions. The digital image output 162 (which may be the color image or a result of processing the image one or more times in accordance with the teachings of the Ser. No. 14/717,112 application) may be written to the image data buffer 89. The mobile device 18 may include a direct memory access (DMA) system 86 which may be a part of the processor 44. DMA 86 provides for direct writing of the digital image output 162 from the camera assembly 36 to the image data buffer 89.

Figure 2E:
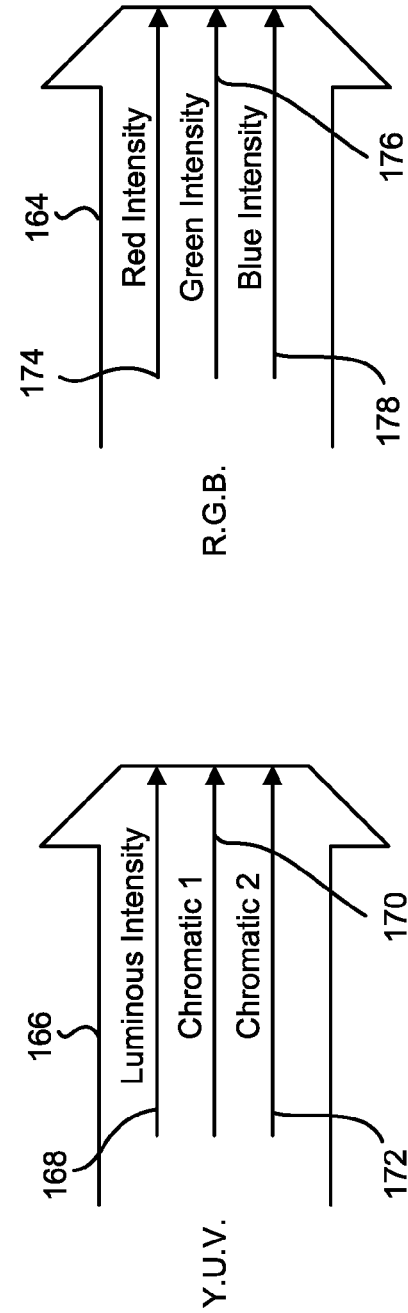
FIG. 2E shows an image output format.

FIG. 2E shows the image output format. The image output format from the photo sensor 42 (or from the output module 91 prior to any image processing as described in U.S. patent application Ser. No. 14/717,112) may be in either R.G.B. format 164 and/or Y.U.V format 166. The Y.U.V. format 166 may include, for each pixel, a luminous intensity 168 indicative of the overall intensity of light received by the pixel, a first chromatic 170 representative of a first dimension of color of the light of the pixel, and a second chromatic 172 representative of a second dimension of color of the light of the pixel. The R.G.B. format 164 may include, for each pixel, a red intensity 174 indicating the intensity of red light received by the pixel, a green intensity 176 indicating the intensity of green light received by the pixel, and a blue intensity 178 indicating the intensity of blue light received by the pixel.

Returning to FIG. 2A, the mobile device 18 may further include a battery 62 and power circuits 63. In general the power circuits 63 control charging of the battery 62 from power received from an external power source via the power connector 64a and providing operating power at the voltage and current drawing requirements of the various components of the mobile device 18 from the power received from the battery 62 or the external power source (when connected to the external power source).

Referring to FIG. 2A in conjunction with FIG. 1, in an exemplary embodiment, the operating system 48 may include an application retrieval system 49 which obtains the applications 50a, 50b from the application server 16.

In an exemplary embodiment, the operation of the application retrieval system 49 to obtain applications 50a, 50b from the application server 16 may be the exclusive means for loading, writing, or otherwise placing the applications 50a, 50b into the memory 46. The operating system 48 may be configured to block or prevent loading of an application 50 to memory by any means other than the operation of the application retrieval system 49 in a manner such that the application 50 may be retrieved exclusively form the application server 16.

Figure 3:
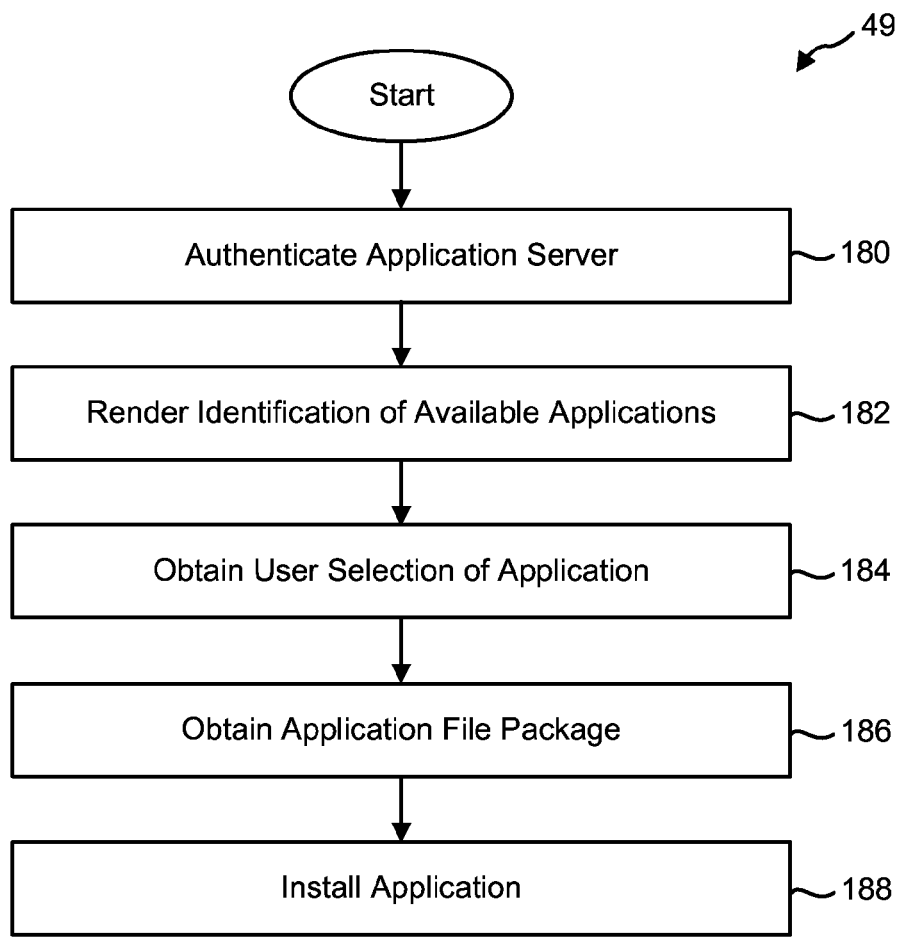
FIG. 3 illustrates an exemplary method for obtaining an application for a mobile device useful in a barcode reading system.

FIG. 3 is a flow diagram of an exemplary process for the operation of the application retrieval system 49. Step 180 represents the application retrieval system 49 establishing a secure connection to the application server 16 over the network 12 and authenticating the mobile device 18 to the application server 16.

Step 182 represents rendering, on the display screen 66, identification of applications which are available to the mobile device 18 for downloading and step 184 represents obtaining user selection of an application to download.

Step 186 represents obtaining an application file package (i.e., an install package) from the application server 16 and temporarily storing the application file package in the memory 46.

Step 188 represents installing the application which includes un-packing the install package and writing an executable application 50 to the memory 46.

Accessory

As used herein, the terms "attachment" and "accessory" are used synonymously and interchangeably, and may refer to an apparatus attached, coupled, or secured to a mobile device. An attachment for a mobile device may include just a single component that improves the barcode reading capabilities of the mobile device. Alternatively, an attachment may include multiple components that improve the barcode reading capabilities of the mobile device. In addition, an attachment for a mobile device may provide additional functionality that is unrelated to improving the barcode reading capabilities of the mobile device. In some embodiments, the attachment improves the ability of the mobile device to read a barcode utilizing the camera assembly and/or the flash/torch illumination system of the mobile device. In some embodiments, the attachment may include a supplemental camera system and/or one or more supplemental illumination systems which provide barcode reading capability for the mobile device.

An attachment for a mobile device may cover a relatively small portion of the mobile device. Alternatively, an attachment for a mobile device may be a protective case that covers a substantial portion of the mobile device. Attachments may be designed for attachment to mobile devices in a wide variety of ways, including but not limited to a corner-positioned attachment, an encapsulating attachment, and a mounting attachment. These attachment modes will be explained in detail below.

FIGS. 4A and 4B depict examples of a corner-positioned attachment that covers a relatively small portion of the mobile device 18. A corner-positioned attachment may cover one or more (but not all) corners of a mobile device.

The corner-positioned attachment 100a shown in FIG. 4A secures to, and covers, a single corner of a mobile device 18. More specifically, the corner-positioned attachment 100a may have an interior back surface 102, an interior front surface 104, an interior top surface 106, and an interior side surface 108. When installed on the corner of the mobile device 18: i) the interior back surface 102 faces, and abuts, the back surface 74 of the mobile device 18; ii) the interior front surface 104 faces, and abuts, the face surface 72 of the mobile device 18; iii) the interior top surface 106 faces, and abuts, the top edge 78 of the mobile device 18; and iv) the interior side surface 108 faces, and abuts, the right edge 80 of the mobile device 18. The distance between the interior back surface 102 and the interior front surface 104 may be sufficiently large to permit the corner-positioned attachment 100a to be inserted onto the corner of the mobile device 18 without excessive difficulty, but also small enough that, once installed, the corner-positioned attachment 100a will not slide free of the mobile device 18 due to friction fit between: i) the interior back surface 102 and the back surface 74; and ii) the interior front surface 104 and the face surface 72. Because the corner-positioned attachment 100a covers a single corner of the mobile device 18, the attachment 100a may be installed on the mobile device 18 by sliding the attachment 100a along the top edge 78 (e.g. the interior top surface 106 in contact with the top edge 78) until the interior side surface 108 abuts the right edge 80 of the mobile device. FIG. 4A shows, as an example, a corner-positioned attachment covering the right top corner of the mobile device 18. However, the corner-positioned attachment may cover the left top corner or any other corner of the mobile device 18.

The corner-positioned attachment 100b secures to, and covers, two top corners of the mobile device 18 as well as the entire top edge 78. More specifically, the corner-positioned attachment 100b may have an interior back surface 102, an interior front surface 104, an interior top surface 106, and two interior side surfaces 108a and 108b. When installed on the corner of the mobile device 18: i) the interior back surface 102 faces, and abuts, the back surface 74 of the mobile device 18; ii) the interior front surface 104 faces, and abuts, the face surface 72 of the mobile device 18; iii) the interior top surface 106 faces, and abuts, the top edge 78 of the mobile device 18; and iv) the interior side surfaces 108a and 108b face, and abut, the right edge 80 and the left edge 82 of the mobile device 18, respectively.

The distance between the interior back surface 102 and the interior front surface 104 may be sufficiently large to permit the corner-positioned attachment 100a to be inserted onto the corner of the mobile device 18 without excessive difficulty, but also small enough that, once installed, the corner-positioned attachment 100b will not slide free of the mobile device 18 due to friction fit between: i) the interior back surface 102 and the back surface 74, and ii) the interior front surface 104 and the face surface 72.

Additionally, or alternatively, the distance between the interior side surface 108a and the interior side surface 108b may be sufficiently large to permit the corner-positioned attachment 100b to be inserted onto the corner of the mobile device 18 without excessive difficulty, but also small enough that, once installed, the corner-positioned attachment 100b will not slide free of the mobile device 18 due to friction fit between: i) the interior side surface 108a and the right edge 80, and ii) the interior side surface 108b and the left edge 82.

Because the corner-positioned attachment 100b covers two corners of the mobile device 18, the attachment 100b may be installed on the mobile device 18 by sliding the attachment 100b along each of the left edge 82 and the right edge 80 (e.g. interior side surface 108a in contact with the right edge 80, the interior side surface 108b in contact with the left edge 82, the interior back surface 102 in contact with the back surface 74, and the interior front surface 104 in contact with the face surface 72) until the interior top surface 106 abuts the top edge 78 of the mobile device 18.

With respect to either attachment 100a or 100b (or any type of corner-positioned attachment), as an alternative to frictional engagement between the attachment 100a, 100b and the mobile device 18, the attachment 100a, 100b may be secured to the mobile device 18 through the use of various other attachment methods. Such attachment methods include, but are not limited to, mechanical fasteners, adhesives, and the like.

Encapsulating attachments may cover substantially the entirety of the back surface 74 of the mobile device 18 and may further cover substantially the entirety of one or more of the edges 76, 78, 80, and 82 of the mobile device 18. An encapsulating attachment i) may cover a perimeter edge of the face surface 72 (but does not cover the central portion of the face surface 72) or ii) may cover substantially the entire face surface 72 but include a transparent central portion, in each case to enable viewing of, and access to, the display screen 66 and touch panel of the mobile device 18. An encapsulating attachment may further exclude covering interface elements of the mobile device 18, such as buttons, electrical interfaces, infrared interfaces, and the like.

Figure 5A:
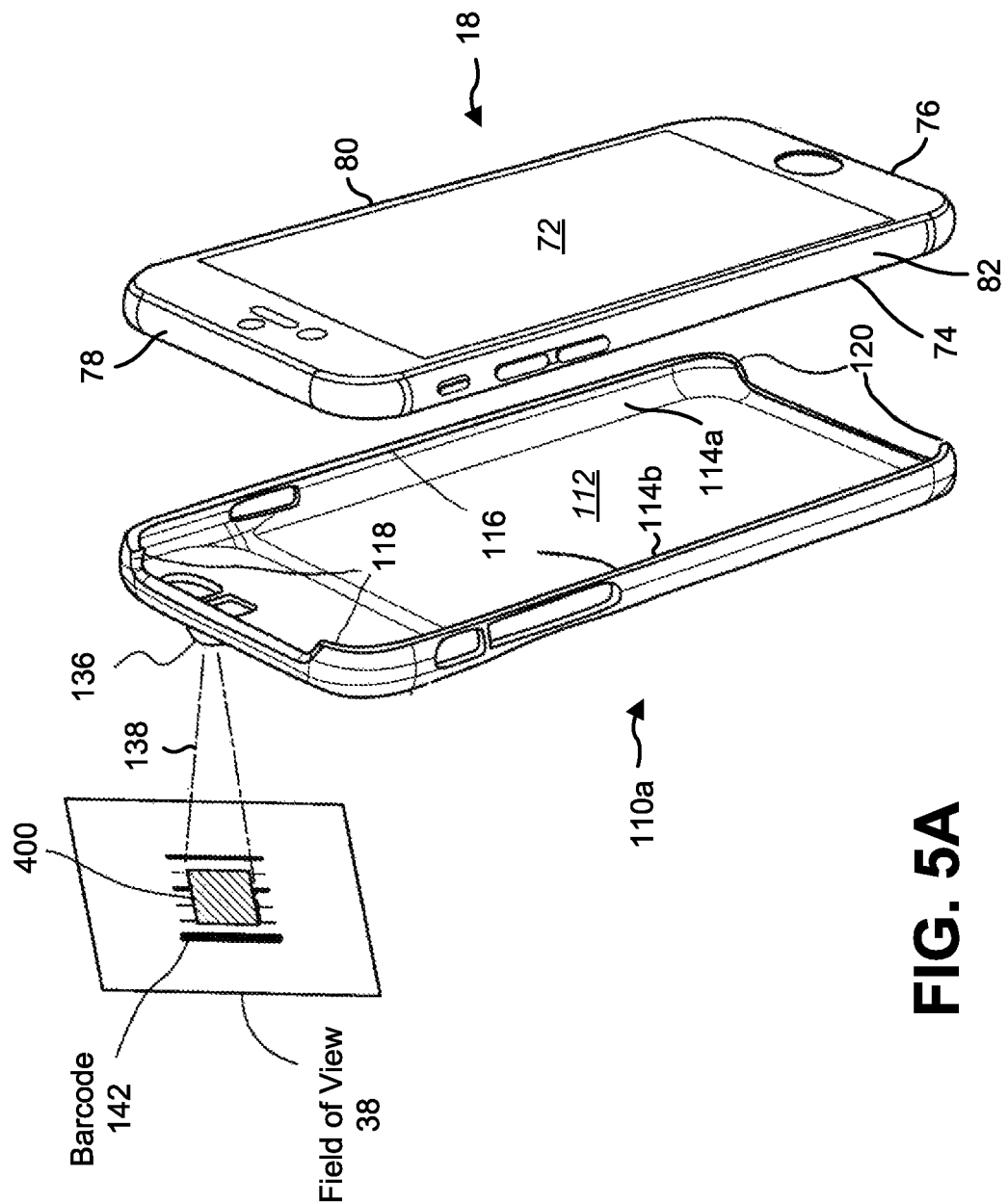
FIGS. 5A-5C illustrate an exemplary encapsulating attachment useful in a barcode reading enhancement system.

FIG. 5A depicts an exemplary encapsulating attachment 110a which covers substantially the entire back surface 74 and each of the right edge 80 and the left edge 82 of the mobile device 18 while covering portions of the top edge 78 and the bottom edge 76 near the right edge 80 and left edge 82 (e.g. the corners of the mobile device 18).

In more detail, the encapsulating attachment 110a may include: i) an interior back surface 112 which faces, and abuts, the back surface 74 of the mobile device 18; ii) interior side surfaces 114a and 114b which face, and abut, the right edge 80 and the left edge 82 of the mobile device 18, respectively; iii) an interior top surface 118 which faces, and abuts, the top edge 78 of the mobile device 18 (at the corners); and iv) an interior bottom surface 120 which faces, and abuts, the bottom edge 76 of the mobile device 18 (at the corners). The encapsulating attachment 110a may also include an interior top surface 116 which faces, and abuts, at least a portion of the periphery of the face surface 72 of the mobile device 18.

For installation of the encapsulating attachment 110a onto the mobile device 18, the walls of the encapsulating attachment 110 forming the interior side surfaces 114a and 114b may be sufficiently flexible such that, with pressure, the walls separate as the mobile device 18 is pressed towards the interior back surface 112, and the portions of the walls which form the interior front surface 116 pass along the right edge 80 and the left edge 82 of the mobile device 18, and come to rest abutting the periphery of the face surface 72 when the back surface 74 is in contact with the interior back surface 112.

The encapsulating attachment 110a, or more specifically a back side forming the interior back surface 112, may further include a camera aperture through which the camera assembly (not shown) of the mobile device 18 has the field of view 38 to the back surface 74 of the mobile device 18.

Figure 5B:
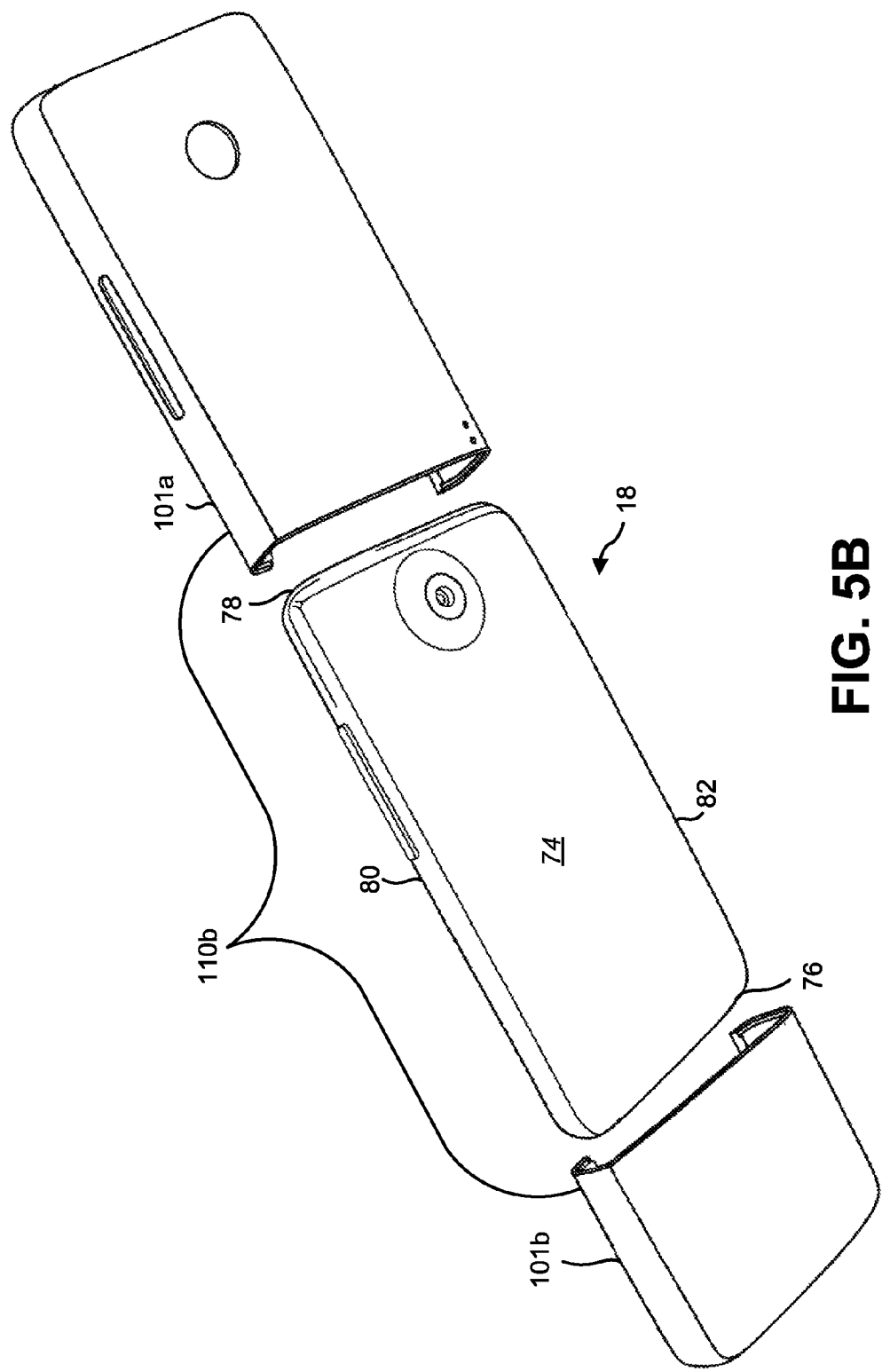

FIG. 5B depicts another example of an encapsulating attachment 100b. The encapsulating attachment 100b comprises a top corner-positioned attachment 101a (similar to 100b) which covers the top two corners of the mobile device 18 and a bottom corner-positioned attachment 101b which covers the bottom two corners of mobile device 18. The two corner-positioned attachments 101a and 101b, when installed, mate to encapsulate the mobile device 18. It should be appreciated that the interior front surface of each of the attachments 110b (e.g. each of the mating top and bottom corner-positioned attachments) covers a small portion of the periphery of the face surface 72 of the mobile device 18 such that an operator may access the display screen 66 and touch panel when the mobile device 18 is encapsulated within the attachment 110b.

Figure 5C:
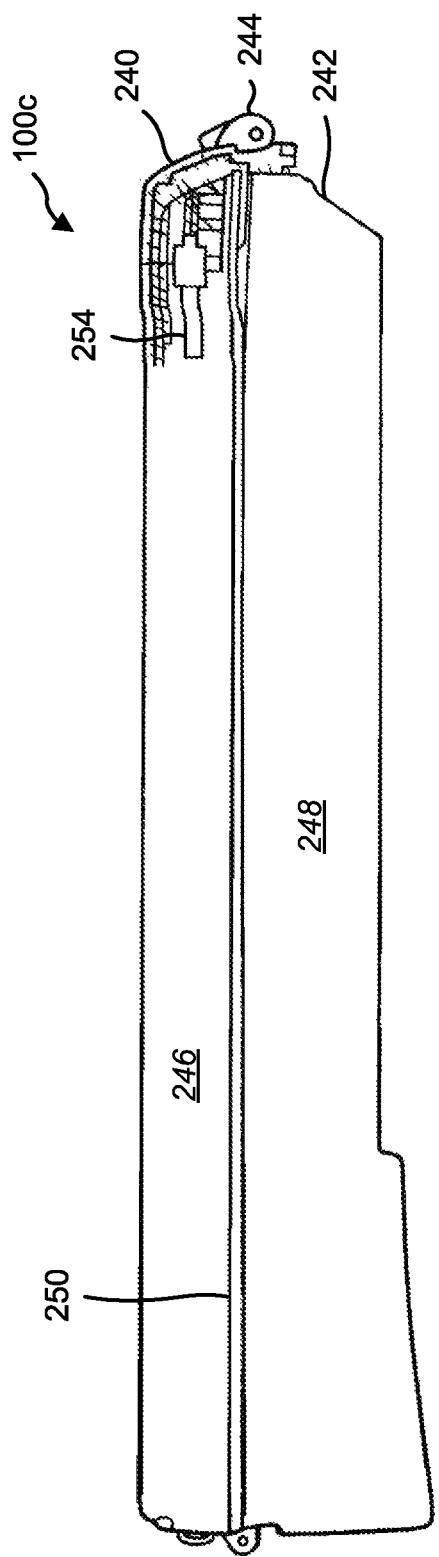

It should be appreciated that the encapsulating attachments 110a and 110b shown in FIGS. 5A and 5B are examples of encapsulating attachments. Encapsulating attachments may encompass clam-shell types of attachments, an example of which is depicted in FIG. 5C. The attachment 100c may include an upper portion 240 and a lower portion 242 which are coupled together by a hinge 244 which, when closed (the position shown in FIG. 5C), secures the upper portion 240 to the lower portion 242 at a part line 250 and forms a cavity 246 which may encapsulate the mobile device (not shown). The display of the mobile device may be accessed through a face aperture (which may be open or may include a capacitive membrane which is positioned over a touch panel/display of the mobile device). The attachment 100c may also include a cavity 248 within the lower portion 242 which, as will be discussed in more detail, may include mechanical and electrical components of the attachment 100c. The attachment 100c may also include, secured to the lower portion 242 and located within the cavity 246, a power/data connector 254 configured to mate with the power/data connector 64 of the mobile device 18 when the mobile device 18 is positioned within the cavity 246.

Mounted attachments generally are attachments that are secured to one face and/or one edge of a mobile device 18. Mounted attachments may not cover any corner of the mobile device, and may not encapsulate the mobile device 18.

FIGS. 6A and 6B depict exemplary mounted attachments 122a, 122b which are secured to the back surface 74 of the mobile device 18. In FIG. 6A, the mounted attachment 122a may be a barrel shape and include a cylindrical male engagement surface 124 which inserts into a cylindrical recess 126 within the back surface 74 of the mobile device 18 and engages a periphery engagement surface 128 of the cylindrical recess 126 for mounting. The engagement between the engagement surface 124 and the engagement surface 128 may be, for example, by threading, bayonet fitting, or any other mounting structure which may utilize rotational movement between the mounted attachment 122a and the mobile device 18 for securing the mounted attachment 122a to, and releasing the mounted attachment 122a from, the mobile device 18.

In FIG. 6B the mounted attachment 122b may be a non-cylindrical shape and may be secured into a recess 130 within the back surface 74 of the mobile device 18. The recess 130 may be of the same shape as the mounted attachment 122b and may include an engagement lip or cavity 132 around at least a portion of the periphery of the recess 130 such that engagement clips 134 around the periphery of the mounted attachment 122b may secure the mounted attachment 122b within the recess 130.

In addition to the foregoing examples of corner-mounted attachments, encapsulating attachments, and mounted attachments, the barcode reading enhancement systems and other features embodied in, or related to, attachments as described herein may utilize any (or multiple) attachment structure or means for attaching to the corresponding mobile device including, but not limited to: i) for attachments that cover some portion of the mobile device from two or more sides (e.g. corner-positioned attachments and encapsulating attachments), use of a frictional interface such as a modest interference fit between the interior dimension of the attachment and the exterior dimension of the portion of the mobile device that receives the attachment; ii) for encapsulating attachments, a wide variety of attachment features in known examples of cases, covers, and other protectors for mobile devices; and iii) for attachments that are attached to only one side of the mobile device attachment, features such as threaded fasteners, adhesives, snap-in interfaces, and the like.

The attachments described herein may include target-generating mechanisms as a component of the barcode reading enhancement system for a mobile device. FIG. 7A depicts a side cutaway view of an example corner- or edge-mounted attachment (shown as attachment 100a covering a single edge of the mobile device 18 as an example) that includes a target-generating mechanism 136 (i.e., a targeting structure). The target-generating mechanism 136 projects a targeting beam 138 into a target area 140 (corresponding to a central portion of a field of view 38 of the camera assembly 36 of the mobile device 18) and may be utilized to facilitate rapid and optimal positioning of a barcode 142 within the field of view 38 of the mobile device 18. The targeting beam 138 is projected at an acute angle 144 with respect to the back surface 74 of the mobile device 18 in a first direction such that the targeting beam 138 intersects the central portion of the field of view 38 at a distance from the camera assembly 36 that is useful for barcode reading. The distance useful for barcode reading means that a barcode 142 within the field of view 38 would be imaged by the lens assembly 40 with sufficient sharpness (focus) and resolution (size) to enable reading of the barcode 142. This targeting beam 138 is especially useful when the mobile device 18 does not have a display, or the display is dimmed or turned off to conserve battery power.

Figure 7B:
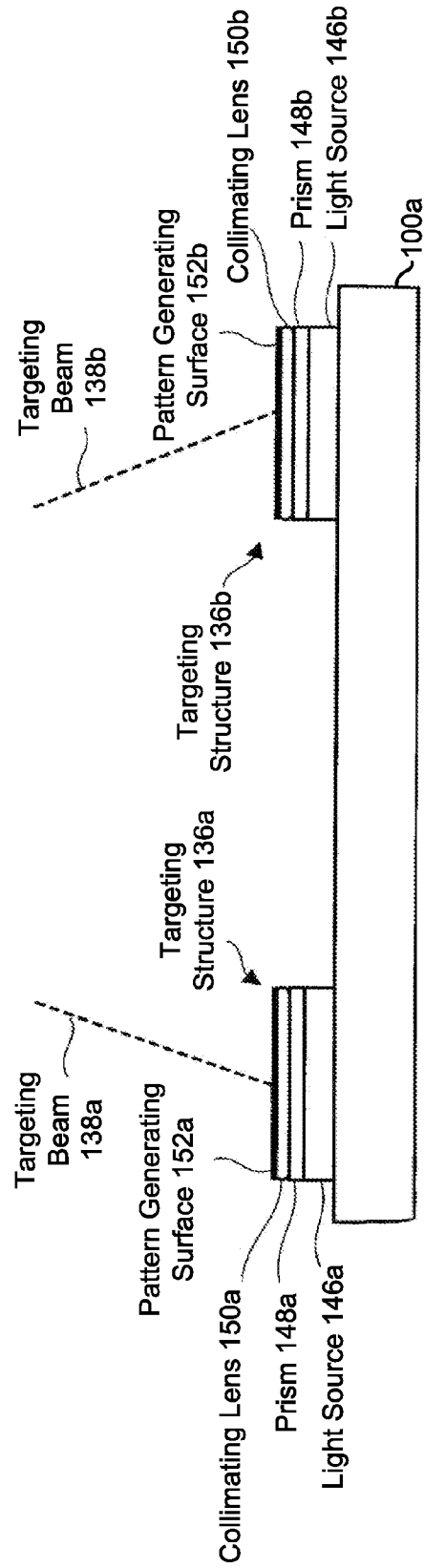

FIG. 7B shows (as a top view, which may be orthogonal to the side view depicted in FIG. 7A) an example of a target-generating mechanism. The target-generating mechanism may include multiple targeting structures 136a and 136b. The targeting structures 136a and 136b may project non-parallel targeting beams 138a and 138b of a distinct illumination pattern, each at an acute angle with respect to the back surface 74 of the mobile device 18 in a second direction orthogonal to the first direction and each of which form a point or a pattern within the target area 140. The targeting structures 136a and 136b may be configured so that (1) at a distance useful for barcode reading (i.e. the optimal distance from the camera assembly 36), the targeting beams 138a and 138b converge so that the projected patterns and/or points meet at the center of the camera's field of view 38, and (2) at any distance from the camera assembly 36 other than the optimal distance, the projected patterns and/or points are spaced apart. Thus, when the mobile device 18 is being used to read a barcode 142, the user may move the mobile device 18 until the projected patterns and/or points meet, indicating that the mobile device 18 is at the optimal distance from the barcode 142 and that the barcode 142 is positioned within the center of the camera's field of view 38.

The target-generating mechanism depicted in FIG. 7B may include a light source 146a, 146b and permutations of any of a prism 148a, 148b; a collimating lens 150a, 150b; and a pattern generating surface 152a, 152b such as an interference pattern generating element; a diffractive pattern generating element, such as a holographic element that may include one or more diffractive gratings; or a Fresnel-type pattern generating element that has been fabricated with the desired targeting beam pattern.

The light source 146a, 146b may be laser diodes, light-emitting diodes (LEDs), etc. embodied in the attachment or within the mobile device 18. The targeting beams 138a, 138b may be generated by shaping the illumination from the white light source of the mobile device by the applicable permutations of the prism 148a, 148b, a collimating lens 150a, 150b, and a pattern generating surface 152a, 152b.

Although FIGS. 7A and 7B depict the target-generating mechanism embodied in a corner- or edge-mounted attachment 100a, the target-generating mechanism may be secured to the mobile device 18 by other means including, but not limited to, embodying the target-generating mechanism 136 into an encapsulating attachment as depicted in FIG. 5A in alignment with a white light source 84 of the mobile device such that the white light source 84 of the mobile device may be used as the light source 146 of the target-generating mechanism 136.

In this application, a "distinct illumination pattern" is an illumination pattern produced by light that is focused to provide relatively crisp lines or other shapes. Thus, the illumination produced by a laser is an example of light that would typically produce a distinct illumination pattern. By contrast, a "diffuse illumination pattern" is an illumination pattern produced by light that is not focused at any particular location, but rather emanating into a broad area. Thus, the illumination produced by a typical light bulb is an example of light that would typically produce a diffuse illumination pattern.

Figure 8B:
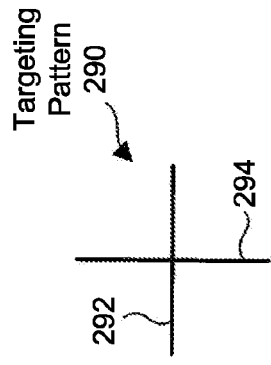
FIGS. 8A-8D illustrate exemplary targeting patterns useful for implementing an attachment of a barcode reading enhancement system.
Figure 8D:
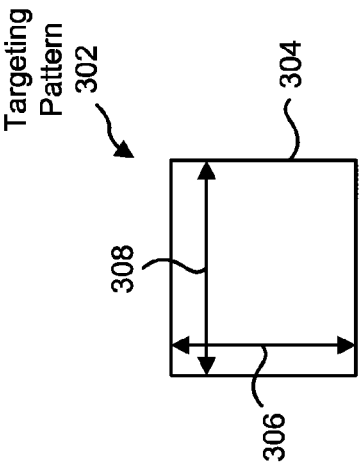
Figure 8A:
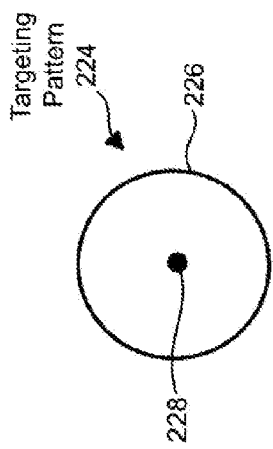

FIGS. 8A-8D illustrate various targeting patterns (distinct illumination patterns) that may be projected by the targeting structures 136 into the target area 140. FIG. 8A shows an example of a targeting pattern 224 that may be projected by the targeting structure 136. The targeting pattern 224 includes a circle 226 with a dot 228 in the center. One targeting structure (136a for example) may generate the circle 226, while the other targeting structure (136b for example) may generate the dot 228. The targeting structures 136a, 136b may be configured so that when the mobile device 18 is at an optimal distance from the barcode 142, the dot 228 is substantially in the center of the circle 226 to form the depicted targeting pattern 224.

FIG. 8B shows another example of a targeting pattern 290 that may be projected by the targeting structures 136. The targeting pattern 290 includes a cross comprising a horizontal bar 292 and a vertical bar 294. One targeting structure (136a for example) may generate the horizontal bar 292, while the other targeting structure (136b for example) may generate the vertical bar 294. The targeting structures 136a, 136b may be configured so that when the mobile device 18 is at an optimal distance from the barcode 142, the horizontal bar 292 and the vertical bar 294 intersect each other within the target area 140 to form the depicted targeting pattern 290.

Figure 8C:
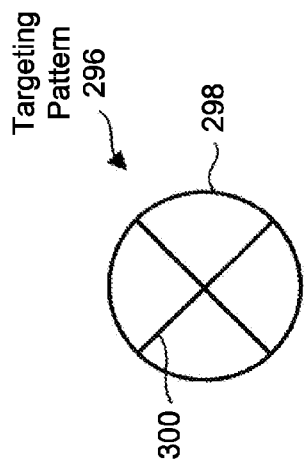

FIG. 8C shows another example of a targeting pattern 296 that may be projected by the targeting structures 136. The targeting pattern 296 includes a circle 298 comprising an X pattern 300 within the circle 298. One targeting structure (136a for example) may generate the circle 298, while the other targeting structure (136b for example) may generate the X pattern 300. The targeting structures 136a, 136b may be configured so that when the mobile device 18 is at an optimal distance from the barcode 142, the circle 298 and the X pattern 300 may intersect each other to form the depicted targeting pattern 296.

FIG. 8D shows another example of a targeting pattern 302 generated by the targeting structures 136. The targeting pattern 302 may include an intense illumination in a pattern of one or more quadrilaterals such as a rectangular or square quadrilateral or bar 304 which is/are bounded by a distinct drop in intensity (e.g. a sharp contrast at the edges of the rectangular or square quadrilateral 304). More specifically, the area around the perimeter of the illuminated rectangular or square quadrilateral 304 may be illuminated (if at all) at an intensity much less than the intensity of illumination within the rectangular or square quadrilateral 304.

The illuminated rectangular or square quadrilateral 304 may be, for example, illuminated by LEDs projecting (or appearing) blue or white and in the shape of the rectangular or square quadrilateral 304. The length of the rectangular or square quadrilateral 304 in a first direction (direction 308) may approximately coincide with the width of the field of view of the camera assembly 36 of the mobile device 18 (or the width of the system field of view if the attachment alters the field of view of the camera assembly 36) and the length of the rectangular or square quadrilateral 304 in a second direction (direction 306), orthogonal to the first direction 308, may approximately coincide with the height of the field of view of the camera assembly 36 of the mobile device 18 (or the height of the system field of view if the attachment alters the field of view of the camera assembly 36) and, in each case, may be within a central portion of the field of view of the camera assembly 36 of the mobile device 18 as depicted in FIG. 5A.

Stated another way, the angle at which the illumination diverges from the target-generating mechanism 136 in the first direction 308 may be approximately the same angle as the field of view of the camera assembly 36 in the first direction 308 (or the same angle as the system field of view if the attachment alters the field of view of the camera assembly 36). Similarly, the angle at which the illumination diverges from the target-generating mechanism 136 in the second direction 306 may be approximately the same angle as the field of view of the camera assembly 36 in the second direction 306 (or the same angle as the system field of view if the attachment alters the field of view of the camera assembly 36). As such, the targeting pattern 304 not only provides the user with an indication of the field of view of the camera assembly 36 (or the system field of view), in both the first direction 308 and the second direction 306, but the targeting pattern 304 also illuminates substantially all of the field of view in one or both of the first direction and the second direction with an intensity of illumination that does not significantly vary within the targeting pattern 304 but drops significantly at the perimeter of the targeting pattern 304.

As discussed, the target-generating mechanism 136 may include its own light source 146a, 146b (as shown in FIG. 7B) and collimate illumination therefrom to produce the applicable distinct targeting pattern. The illumination source may be of a particular wavelength (e.g. red or blue light) or may be white illumination (broad spectrum) and may include a filter 214a, 214b (which will be explained in detail with reference to FIG. 9) to pass only the particular wavelength used to generate the distinct targeting pattern by attenuating other wavelengths.

Alternatively, the target-generating mechanism 136 may culminate and otherwise shape illumination from the white light source 84 of the mobile device 18 utilizing a collimating lens and/or a pattern generating surface in both the first direction and the second direction to project the applicable targeting pattern into the target area 140. In such a case, as shown in FIG. 9, the target-generating mechanism 136 may include filters (214a, 214b) which pass a narrow band of the visible illumination spectrum, such as red illumination or blue illumination, such that the white illumination (broad spectrum) from the mobile device 18 is filtered and the targeting pattern generated by the combination of the white illumination source and the filter is a specific color, such as blue or red.

The attachments described herein may include supplementary exposure illumination systems as a component of the barcode reading enhancement system for a mobile device. More specifically, the supplementary exposure illumination systems may include one or more elements which project (or alter the projection of) diffuse illumination into the target area 140 in such a manner that illumination reflected from a barcode 142 and imaged onto the photo sensor 42 produces image characteristics that improve decodability of the image. Image characteristics which improve decodability of the image include: i) increased contrast between illumination reflected from bars (first modules in a 2D code) versus illumination reflected from spaces (second modules in a 2D code), and ii) even contrast (e.g. no hot spots, dead zones, or other significant contrast difference) of illumination reflected from bars (or first modules)

across the entire barcode 142 and similarly even contrast of illumination reflected from spaces (or second modules) across the entire barcode 142.

Figure 9:
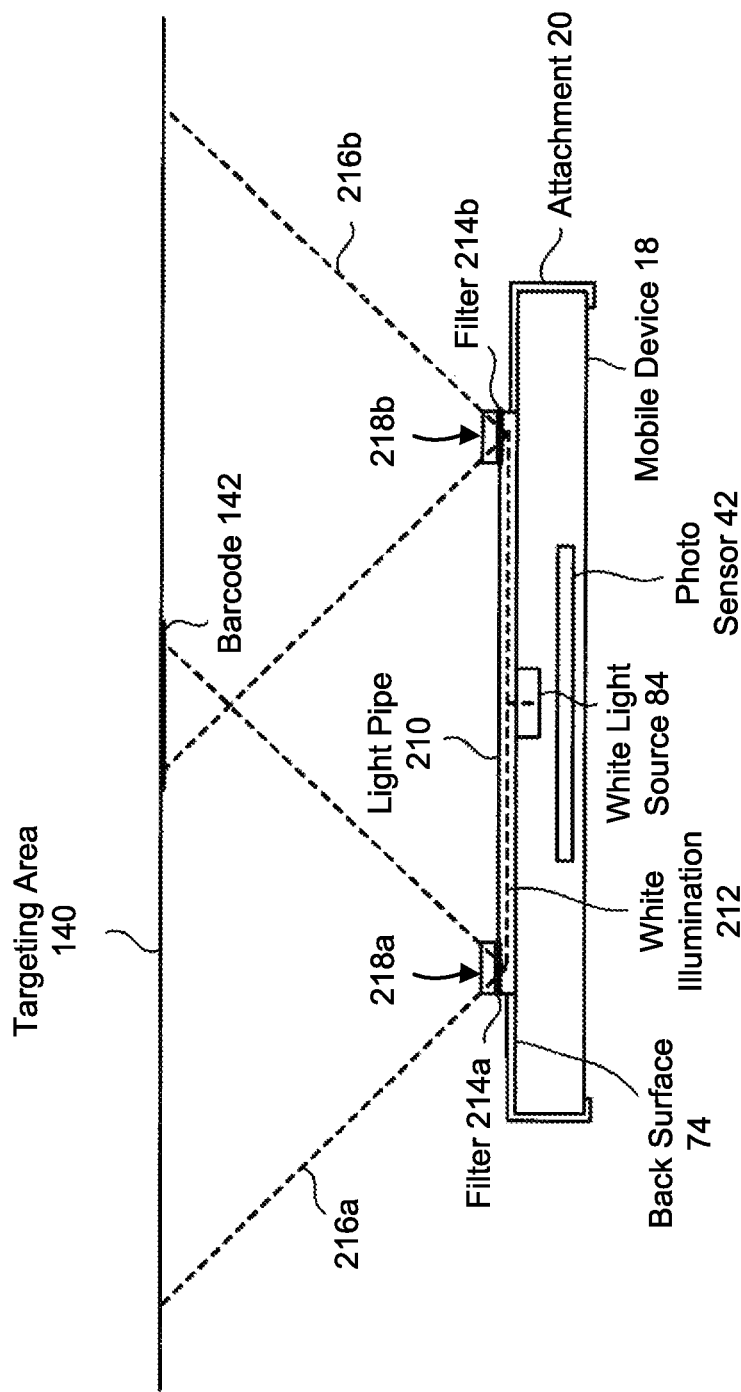
FIG. 9 illustrates an exemplary exposure illumination system useful for implementing in an attachment of a barcode reading enhancement system.

FIG. 9 depicts an example of a mobile device attachment (shown as a cross section of an encapsulating attachment 110) that includes illumination elements for optimizing illumination for barcode reading. The mobile device 18 includes a white light source 84. The attachment 110 may include a light pipe 210 that redirects white illumination 212 provided by the white light source 84 of the mobile device 18. More specifically, utilizing total internal reflection, the light pile 210 propagates the white illumination 212 in a direction parallel to the back surface 74 of the mobile device 18 towards one or more illumination emanating structures 218*a*, 218*b* which are displaced from the white light source 84 within the plane defined by the back surface 74 of the mobile device 18.

Each illumination emanating structure 218*a*, 218*b* redirects at least a portion of the white illumination 212 propagating through the light pipe 210 towards a barcode 142 present within the target area 140 as exposure illumination 216*a*, 216*b*. Each emanating structure 218*a*, 218*b* may include any permutation of the prism 148*a*, 148*b* (not shown in FIG. 9 but discussed with respect to FIG. 7B), collimating lens 150*a*, 150*b* (not shown in FIG. 9 but discussed with respect to FIG. 7B), pattern generating surface 152*a*, 152*b* (not shown in FIG. 9 but discussed with respect to FIG. 7B), and one or more filters 214*a*, 214*b*. The one or more filter(s) 214*a*, 214*b* may include: i) a narrow band filter (e.g. a single-color filter passing a single color of illumination such as red, blue, or another color); ii) a low pass filter passing all color bands below a predetermined wavelength; and/or iii) a high pass filter passing all color bands above a predetermined wavelength. When the one or more filters 214*a*, 214*b* is a narrow band filter (e.g. a single color filter), the exposure illumination 216*a*, 216*b* may be a single color (e.g., red, blue, or another single color). The redirection of illumination by the illumination emanating structures 218*a*, 218*b* may occur by reflection from a chamfered end of the light pipe 210 positioned directly below the illumination emanating structures 218*a*, 218*b*.

In some embodiments, the light pipe 210 and the illumination emanating structures 218*a*, 218*b* may be configured (positioned) such that the exposure illumination 216*a*, 216*b* is offset from the camera's photo sensor 42 (in the plane defined by the back surface 74 of the mobile device 18) in order to prevent glare. In other words, the exposure illumination 216*a*, 216*b* may be directed toward the target area 140 from locations that are not directly in front of the camera's photo sensor 42.

FIG. 9 depicts just one example of a supplementary exposure illumination system as a component of the barcode reading enhancement system for a mobile device. Other supplementary exposure illumination systems may include any of the optic elements (including illumination generating LEDs) which form a direct bright field illumination system, a diffuse bright field illumination system, and a dark field illumination system as described in U.S. patent application Ser. No. 14/510,341, entitled "DIFFUSE BRIGHT FIELD ILLUMINATION SYSTEM FOR A BARCODE READER," filed on Oct. 9, 2014. It should further be appreciated that the supplementary exposure illumination systems utilizing the optic elements of the direct bright field illumination system, the diffuse bright field illumination system, and the dark field illumination system from the Ser. No. 14/510,341 application may further utilize the corresponding illumination sources in conjunction with such optics.

The attachments described herein may include a supplementary optic system as a component of the barcode reading enhancement system for a mobile device. An "optic system" may be any set of one or more components positioned in the camera field of view 38 of a camera assembly 36 to modify one or more parameters regarding the light received by the camera, such as the quantity of the light received, the optical pathway along which the light is received, the angular size of the field of view, the depth of field, the focus distance, the f-number, and/or the wavelength(s) of the light received. Thus, an optic system, in various components, may include any of various components such as lenses, filters, mirrors, apertures, and the like. Stated another way, the one or more optical elements within the camera field of view 38 of the camera assembly 36, in combination with the lens assembly 40 of the camera, define a barcode reading optic system (the combination) which provides superior barcode reading capabilities over the lens assembly 40 alone.

Figure 10B:
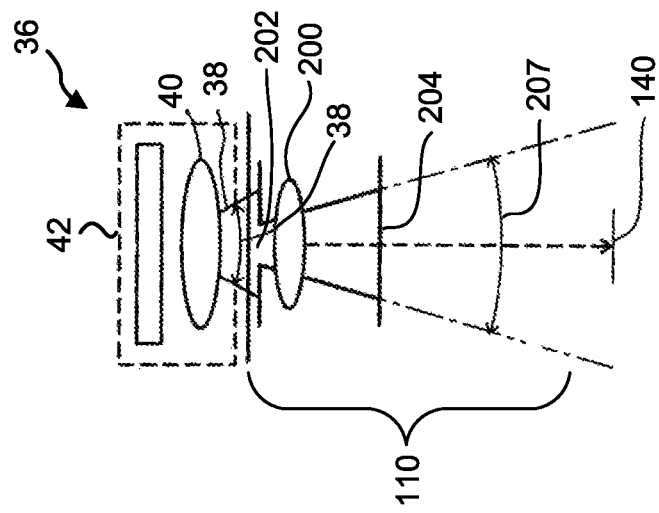
FIGS. 10A-10D illustrate exemplary supplementary optics useful for implementing in an attachment of a barcode reading enhancement system.
Figure 10A:
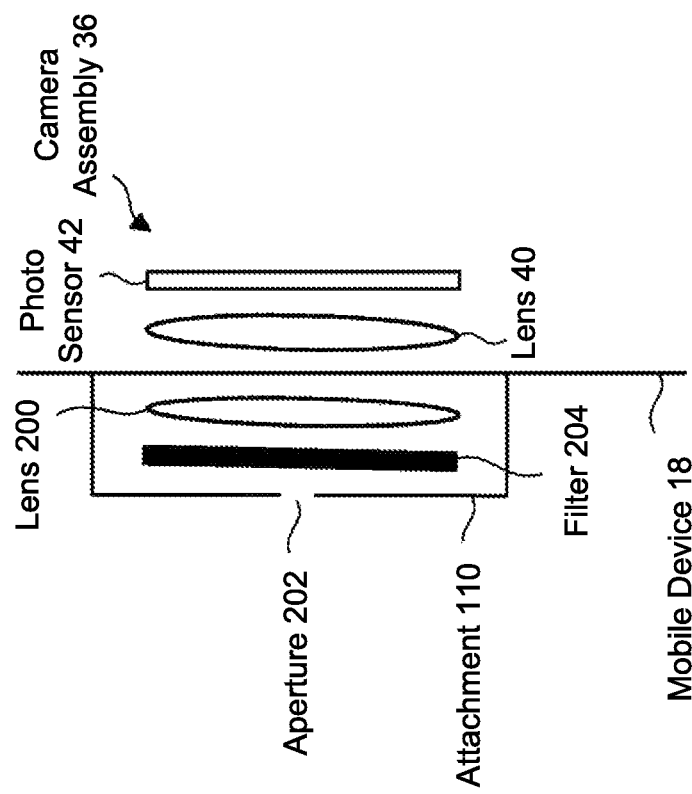

FIGS. 10A and 10B depict examples of a mobile device attachment (shown as mounted attachment 110) that include a supplementary lens system that includes permutations of: i) one or more lens(es) 200, optical filter(s) 204; and iii) an aperture 202.

The aperture 202 limits the amount of light that reaches the camera's photo sensor 42 through the camera's lens assembly 40. More specifically, the aperture 202 may be an aperture within an opaque barrier material which defines the aperture (f-number) of the supplementary lens system and, when part of the barcode reading optic system, may define the optical aperture (f-number) of the barcode reading optical system.

The aperture of the barcode reading optical system, as defined by the aperture 202, may provide for an increased depth of field (e.g. a system depth of field) over the depth of field provided by the lens assembly 40. With increased depth of field, an image on the photo sensor 42 sufficiently sharp (focused) for barcode reading may be achieved without the need for auto focusing and therefore the decode response time may be improved because the barcode reading process does not require a time-consuming auto-focusing step.

The one or more lens(es) 200 may alter the field of view 38 of the camera assembly 36 and/or magnification of the camera assembly 36 (e.g. provide a system field of view 207 that is different from the field of view 38 of the camera assembly 36).

The one or more filter(s) 204 may include: i) a narrow band filter (e.g. a single-color filter passing a single color of illumination such as red, blue, or another color); ii) a low pass filter passing all color bands below a predetermined wavelength; and/or iii) a high pass filter passing all color bands above a predetermined wavelength.

For example, it may be desirable to capture predominantly light of a relatively narrow segment of the visible portion of the electromagnetic spectrum, such as red light with a wavelength of approximately 660 nm. The filter 204 may thus have a colored tint and/or polarization with a narrow wavelength band desired for image capture for effective barcode decoding.

As mentioned previously, the parameters of the camera assembly 36, such as the angular size of the camera field of view 38, the range of focus depths, and the depth of field of the camera assembly 36 may not be ideal for barcode capture and/or decoding. Thus, any or all of these parameters may be modified by the optic system of the attachment. Thus, the system field of view 207 may have an angular size that is significantly smaller than the angular size of the camera field of view 38. This may be because conventional photography often uses a wider lens angle than is needed for capturing barcode images.

The system field of view 207 may provide a system ratio of focal length to entrance pupil diameter that is greater than a camera ratio of focal length to entrance pupil diameter of the unmodified optic system of the camera assembly 36 such that the optic system of the attachment acts to increase the f-stop of the camera lens assembly 40.

Further, the mobile device 18 and the optic system of the attachment 100, combined, may have a depth of field (not shown), consisting of the depth along the system optical pathway 205 through which an object may remain in focus (to a degree acceptable for barcode capture and/or decoding) on either side of the system focus depth. A relatively large depth of field may advantageously permit barcode capture and/or decoding at a wider ranges of distances between the mobile device 18 and the barcode to be captured. Thus, the attachment lens may advantageously provide a relatively larger depth of field, particularly at shorter focus depths, than the camera assembly 36, unaided.

The system field of view 207 may be centered on a system optical pathway, which may be the same as the optical pathway 205 for the camera assembly 36 without the attachment. More specifically, the camera assembly 36 may be designed to capture images centered on an optical pathway 205 perpendicular to the back surface 74 of the mobile device 18. In certain embodiments this optical pathway is not modified by the attachment; thus, the system optical pathway 205 may be the same as the optical pathway for the camera assembly 36. In other embodiments, an attachment may provide a different optical pathway for barcode scanning, as will be shown and described with respect to FIGS. 10C and 10D.

Figure 10C:
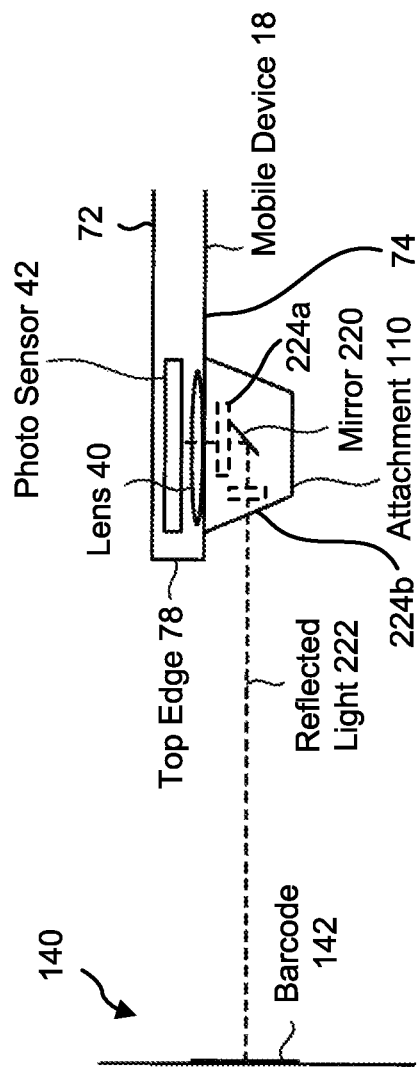

FIG. 10C depicts an example of a mobile device attachment (shown as a mounted attachment 110) that includes a mirror 220 that changes the optical path of illumination (i.e. reflected light) 222 reflected from the barcode to the mobile device 18 from a direction that is generally parallel to the face surface 72 and the back surface 74 of the mobile device 18 to a direction that is generally orthogonal to the lens assembly 40 and the photo sensor 42 of the camera assembly 36 of the mobile device 18.

The attachment 110 permits a user of the mobile device 18 to attempt to read a barcode 142 positioned within a field of view that is beyond the top edge 78 of the mobile device by aiming the top side (the top edge 78) of the mobile device 18 at the barcode 142. The light 222 reflected from the barcode 142 is redirected by the mirror 220 toward the mobile device's focusing lens assembly 40, which focuses the reflected light 222 onto the photo sensor 42.

Stated another way, the field of view 38 of the camera assembly 36 would have a center line that is generally orthogonal to the planar back surface 74 of the mobile device 18 (and orthogonal to the planar display on the face surface 72 of the mobile device 18) and that extends towards a target area 140 from the back surface 74 of the mobile device 18. The mirror 220 is within such field of view and folds the field of view such that its center line is parallel to the back surface 74 of the mobile device 18 (and the display on the face surface 72 of the mobile device 18) and extends towards a target area 140 from the top side of the mobile device 18.

In the depicted example, the mirror 220 is positioned so that the reflected light 222 is redirected by 90°. Alternatively, the mirror 220 may be positioned so that the reflected light 222 is redirected by a different angle. For example, FIG. 10D depicts a mirror 220 positioned so that the reflected light is redirected by an angle 221 between 30 and 60 degrees from perpendicular to the back surface 74.

Figure 10D:
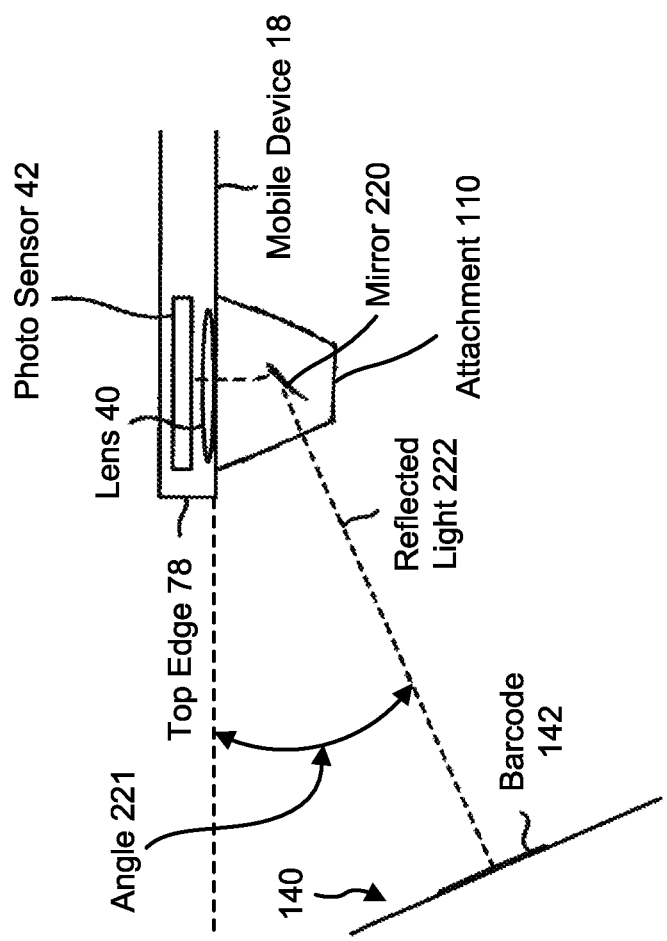

It should be appreciated that, although not depicted in either FIG. 10C or 10D, the attachment 110, in addition to including the mirror 220 to redirect the reflected light 222, may further include any permutation of optic components discussed with respect to FIGS. 10A and 10B for purposes of altering one or more of the depth of field, the f-number, the angle of the field of view, or the focal plane of the lens assembly 40 of the camera assembly 36. Such optic components may be located within the region 224a of the attachment 110 or the region 224b of the attachment.

FIGS. 11A, 11B, 12A, 12B, 12C, 12D, 13, 14, and 15 depict additional examples of attachments which may be, or form, a part of the barcode reading enhancement system for a mobile device. Although each attachment depicted in FIGS. 11A, 11B, 12A, 12B, 12C, 12D, 13, 14, and 15 is depicted in one of the general structures described with respect to FIG. 4A, 4B, 5A, 5B, 5C, 6A, or 6B, the arrangement of target-generating mechanisms, supplementary illumination systems, and supplementary optic systems described above with respect to FIGS. 7A, 7B, 8A-8D, 9, and 10A-10D may be utilized in any of the general structures.

Figure 11A:
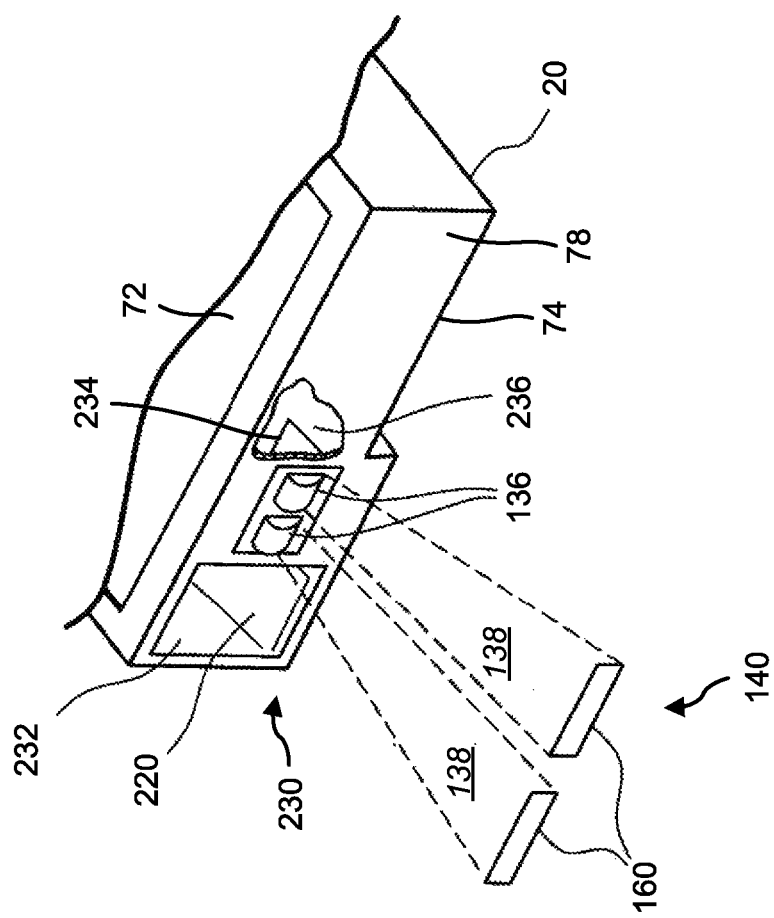
FIGS. 11A and 11B illustrate an exemplary attachment for a barcode reading enhancement system which includes a target-generating mechanism and supplementary optics.

FIG. 11A depicts an attachment 20 (shown in partial view) with a target-generating mechanism 136 which projects a targeting beam 138 from the top edge 78 of the mobile device 18 to the top side of the mobile device 18 to form a targeting pattern 160 within a target area 140 whereas the attachments depicted in FIGS. 7A and 7B include a target-generating mechanism 136 which projects a targeting beam 138 from the back surface 74 of the mobile device 18 and generates the targeting pattern 160 within a target area 140.

The attachment 20 may further include a structure 230 (with a mirror 220) as depicted in, and described with respect to, FIG. 10C or 10D for redirecting illumination reflected from a barcode in the target area extending from the top edge 78 of the mobile device 18 towards the lens assembly 40 of the camera assembly 36 on the back surface 74 of the mobile device 18. More specifically, the mirror 220 may be a first mirror within a first chamber 232 within the field of view 38 of the camera assembly 36 (not shown) on the back surface 74 of the mobile device 16. The first mirror 220 may be positioned at approximately a 45-degree angle to the center line of the field of view 38 of the camera assembly 36 to fold the field of view of the camera by approximately 90 degrees such that the field of view 38 of the camera assembly 36 extends towards the target area 140 extending from the top edge 78 (the top side) of the mobile device 18 instead of from the back surface 74 of the mobile device 18 as described with respect to FIG. 10A. Alternatively, the first mirror 220 may be positioned at an angle between 30 degrees and 60 degrees from the plane of the back surface 74 of the mobile device.

Further as described with respect to FIGS. 10A and 10B (and although not depicted in FIG. 11A) any permutation of the optics described with respect to FIGS. 10A and 10B may be positioned within the first chamber 232 for purposes of altering one or more of the depth of field, the f-number, the angle of the field of view, or the focal plane of the lens assembly 40 of the camera assembly 36.

The target-generating mechanism may include a second mirror 234, within a second chamber 236, generally parallel to the first mirror 220, but aligned with the white light source 84 on the back surface 74 of the mobile device 18, and may fold the illumination from the white light source 84 (by the same angle at which the first mirror 220 folds the field of view of the camera assembly 36) towards the target area 140 extending from the top edge 78 of the mobile device 18. The first chamber 232 may be separated from the second chamber 236 by an opaque wall or baffle to prevent illumination within the second chamber being incident on the first mirror 220 and reflected by the first mirror 220 onto the lens assembly 40 of the camera assembly 36 and thereby degrading the image quality of an image of a barcode 142 within the target area 140.

The target-generating mechanism may further include any of the targeting structures 136 described with respect to FIGS. 7A and 7B for forming and projecting the targeting beams 138 of a distinct illumination pattern into the target area 140. In FIG. 11A, the target-generating structure 136 is depicted as two culminating lens structures arranged horizontally (within a line generally parallel to the lines formed by the interface of the top edge 78 with each of the face surface 72 and the back surface 74 of the mobile device). Each of the collimating lens structures may project a targeting pattern 160 into the target area 140 which is similar to the targeting pattern 400 depicted in FIG. 7D. Again, the targeting pattern 400 may be projected into the center of the field of view and the angular size of the targeting pattern with respect to distance from the mobile device 18 may be the same as the angle of the field of view and therefore may serve as both the distinct illumination pattern indicating the field of view and the diffuse illumination (within the field of view) for exposure illumination.

Figure 11B:
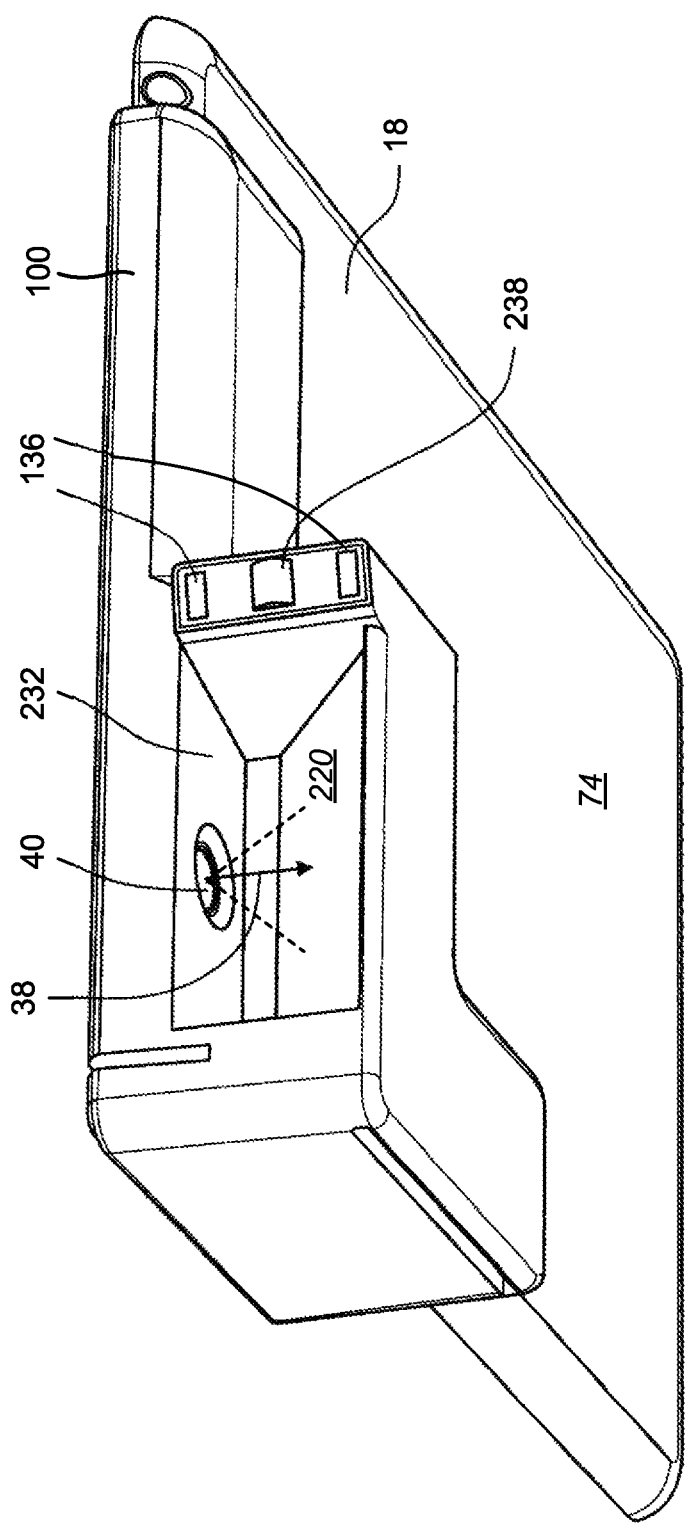

FIG. 11B depicts an attachment (depicted as a corner- or edge-mounted attachment 100) which is similar in structure to the encapsulating attachment 110 of FIG. 11A but with target-generating structures 136 arranged vertically (within a line generally perpendicular to the lines formed by the interface of the top edge 78 with each of the face surface 72 and the back surface 74 of the mobile device). The attachment 100 of FIG. 11B may further include an exposure illumination structure 238 which may utilize any of the elements described with respect to FIG. 9 or any of the supplementary exposure illumination systems which form the direct bright field illumination system, the diffuse bright field illumination system, and/or the dark field illumination system as described in U.S. patent application Ser. No. 14/510,341, entitled "DIFFUSE BRIGHT FIELD ILLUMINATION SYSTEM FOR A BARCODE READER," filed on Oct. 9, 2014.

As stated with respect to FIG. 11A, the target-generating structure 136 may utilize the second mirror 234 to redirect illumination generated by the white light source 84 into the target-generating structure 136 to form targeting beams 138 or may utilize illumination sources within the attachment 110. With respect to the embodiment of FIG. 11B, one of the targeting illumination sources or the exposure illumination source may be the white light source 84 of the mobile device 18 (reflecting from a mirror) and the other may be an illumination source within the attachment.

FIGS. 12A, 12B, 12C and 12D represent an attachment (shown as an encapsulating attachment 110) with a target-generating structure 136 that may be repositioned and used for any embodiments described herein where the white light source 84 of the mobile device 18 provides illumination for the target-generating mechanism 136 (which as discussed with respect to FIG. 7D may also be the exposure illumination system). The repositionable target-generating structure 136 is useful for uses of the mobile device 18 where, in addition to utilizing the white light source 84 and the camera assembly 36 for barcode reading, the white light source 84 and the camera assembly 36 are used for traditional photography.

FIGS. 12A and 12B depict the target-generating structure 136 as being pivotally repositionable between: i) a first position 440 as depicted in FIG. 12A wherein the target-generating structure 136 is positioned in front of the white light source 84 (i.e. an illuminating torch) such that illumination from the white light source 84 is shaped by the target-generating structure 136 into a distinct targeting illumination pattern; and ii) a second position 442 as depicted in FIG. 12B wherein the target-generating structure 136 is positioned outside of the illumination field of the white light source 84 such that the illumination from the white light source 84 is unmodified by the target-generating structure 136 and can be used for illumination when using the camera assembly 36 of the mobile device 18 to take photographic pictures.

As depicted in FIGS. 12A and 12B, the target-generating structure 136 may be secured to the attachment 110 by a flexible band 444 such that the target-generating structure 136 may be pivoted in the direction 446 between position 440 and position 442 by flexure of the flexible band. It is also envisioned that a more traditional hinge/hinge pin structure may also provide for pivoting the target-generating structure 136 between position 440 and position 442 in alternative embodiments.

Figure 12D:
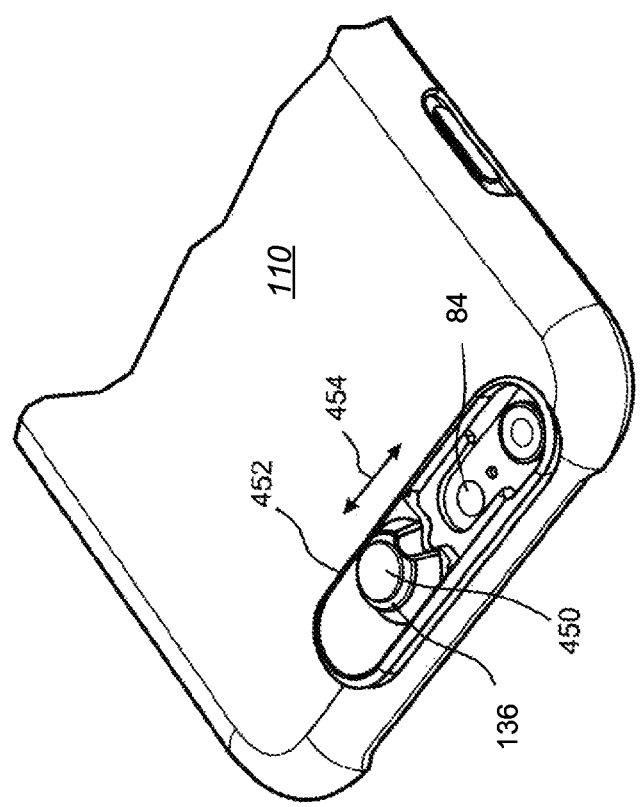
Figure 12C:
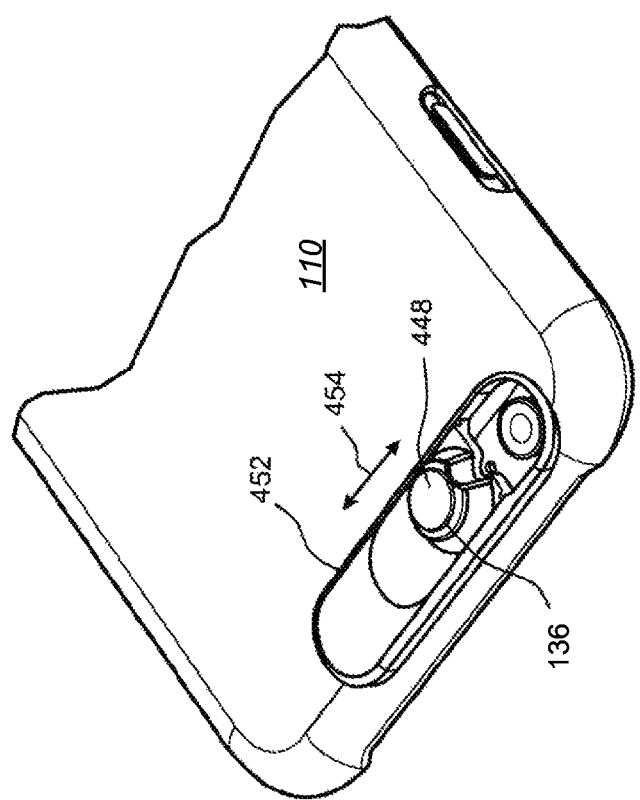

FIGS. 12C and 12D depict the target-generating structure 136 being laterally repositionable between: i) a first position 448 as depicted in FIG. 12C wherein the target-generating structure 136 is positioned in front of the white illumination source 84 (i.e. an illuminating torch) such that the illumination from the white light source 84 is shaped by the target-generating structure 136 into a targeting pattern; and ii) a second position 450 as depicted in FIG. 12D wherein the target-generating structure 136 is positioned outside of the illumination field of the white light source 84 such that the illumination from the white light source 84 is unmodified by the target-generating mechanism 136 and can be used for illumination when using the camera assembly 36 of the mobile device 18 to take photographic pictures. As depicted in FIGS. 12C and 12D, the target-generating structure 136 may be secured to the attachment 110 within a channel 452 such that the target-generating structure 136 may be laterally repositioned in the direction 454 between position 448 and position 450.

Figure 13:
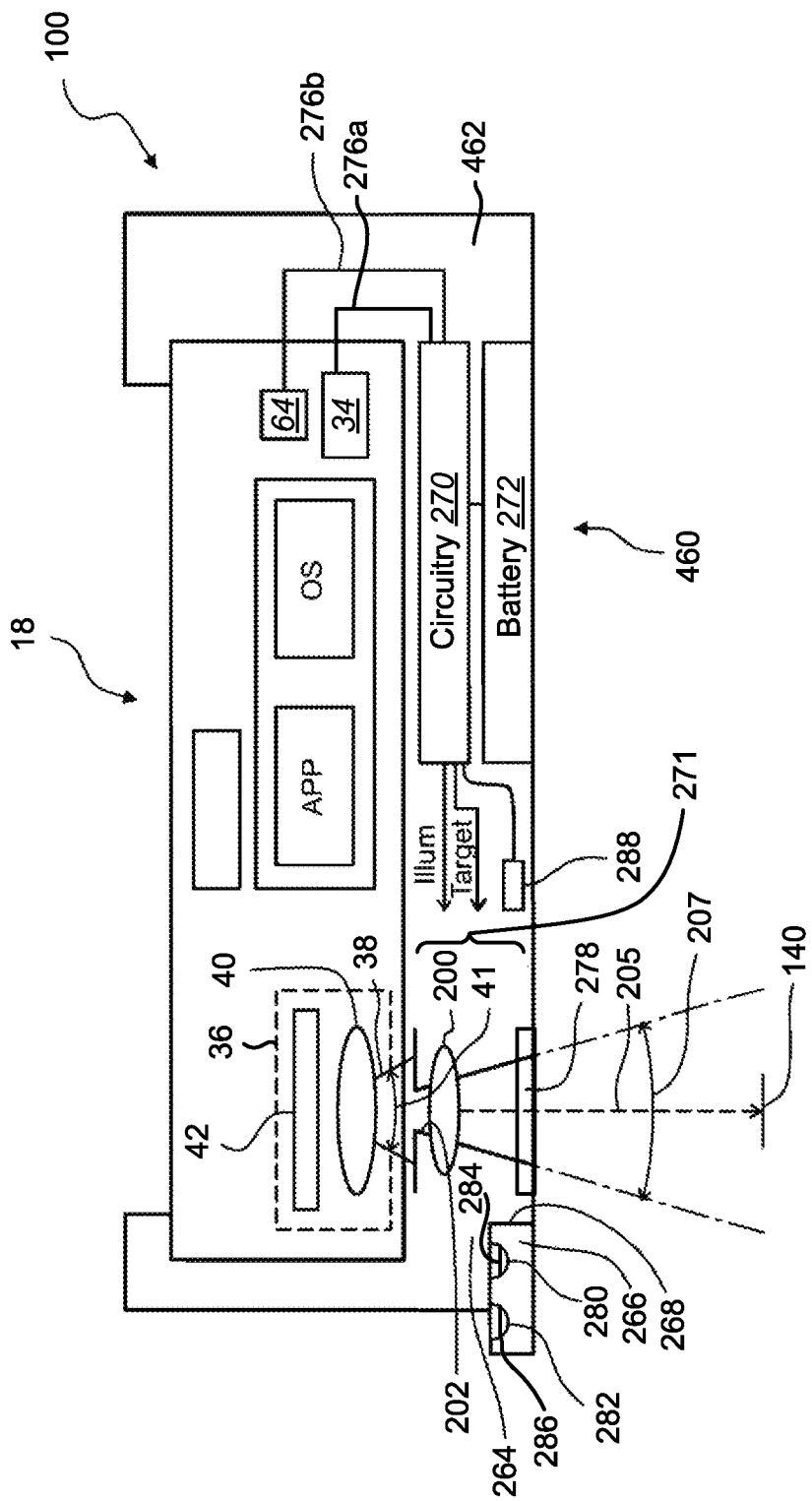
FIG. 13 illustrates an exemplary attachment for a barcode reading enhancement system with a target-generating mechanism, an exposure illumination system and supplementary optics useful for implementing in an attachment of a barcode reading enhancement system.

FIG. 13 depicts another exemplary attachment (shown as an encapsulating attachment 100) for a mobile device 18. The attachment 100 may have a housing 460 defining an interior cavity 462 of the attachment 100 which is separate from a cavity in which the attachment 100 encapsulates the mobile device 18.

The cavity 462 within the housing 460 may be divided into one or more chambers separated by an opaque barrier in order to restrict light passage from components in one chamber to components in another. For example, the cavity 462 may have a first chamber 264 and a second chamber 266. An opaque barrier 268 may separate the first chamber 264 from the second chamber 266 in a manner that prevents light from either of the first chamber 264 and the second chamber 266 from passing directly into the other chamber.

The first chamber 264 may be larger than the second chamber 266, and may contain components such as a supplementary optic system 271, attachment control circuitry 270, and an attachment battery 272.

The supplementary optic system 271 may be any of the embodiments described with respect to FIGS. 10A and 10B. A window 278 within the housing 460 may be in alignment with the supplementary optic system 271 so that illumination reflected from the target area 140 is able to enter the first chamber 264 via the window 278 to reach the supplemental optic system 271 and, after passing through the supplemental optic system 271, be received and captured by the camera assembly 36 of the mobile device 18.

In some embodiments, the window 278 may be transparent and function to enclose the first chamber 264. In other embodiments, the window 278 itself may be a component of the supplementary optic system 271 for modifying one or more of the depth of field, the f-number, the angle of the field of view, or the focal plane of the lens assembly 40 of the camera assembly 36.

For example, the window 278 may filter illumination reflected from the target area 140 (e.g. pass and/or attenuate certain wavelengths of illumination). The filter characteristics may include any of the filter characteristics described with respect to the filter 214a, 214b of FIG. 9.

The second chamber 266 may include one or more of a targeting illumination system 280 and an exposure illumination system 282. The targeting illumination system 280 may utilize an illumination source 284 and any of the targeting structures 136 described with respect to FIG. 7A or 7B to project a targeting beam (not shown) with a distinct illumination pattern (which may be any of the targeting patterns described with respect to FIGS. 8A, 8B, 8C and 8D) towards the target area 140.

The exposure illuminating system 282 may utilize an exposure illumination source 286 and the exposure illumination structure described with respect to FIG. 9 or U.S. patent application Ser. No. 14/510,341. The exposure illumination source 286 may include various light sources, including but not limited to lasers, LED's, incandescent lights, fluorescent lights, and the like.

The attachment control circuitry 270 of this embodiment may control each of the targeting illumination system 280 and the exposure illumination system 282. The targeting illumination system 280 may be configured to project light into the target area 140 prior to and/or after image capture so as to avoid interfering with decodability of the barcode image. Conversely, the exposure illumination system 282 may project illumination into the target area 140 during image capture.

The targeting illumination system 280 and the exposure illumination system 282 may also be connected to an attachment battery 272, either independently of the attachment control circuitry 270, or via the attachment control circuitry 270. Thus, the targeting illumination system 280 and the exposure illumination system 282 may be controlled by the attachment control circuitry 270 and powered by the attachment battery 272.

The attachment control circuitry 270 may further include, or be electrically connected to, an attachment communications interface, which may be coupled to the mobile device power/data interface 64 via a link 276a and/or the speaker/microphone connector 34 via a link 276b.

The housing 460 may further contain a user control 288, which may be actuated by the user to perform various functions, such as initiating the capture of a barcode. The user control 288 may include any form of user inputs known in the art, including but not limited to switches, levers, knobs, touch screens, microphones coupled to voice-operation software, and the like. The user control 288 may advantageously take the form of a trigger that can be actuated, for example, with the index finger of the user. In alternative embodiments, the housing 460 may be modified to have a pistol grip or other grip that enhances the ergonomics of the housing 460 and/or facilitates actuation of the user control similar to the housing depicted in FIG. 14.

Figure 14:
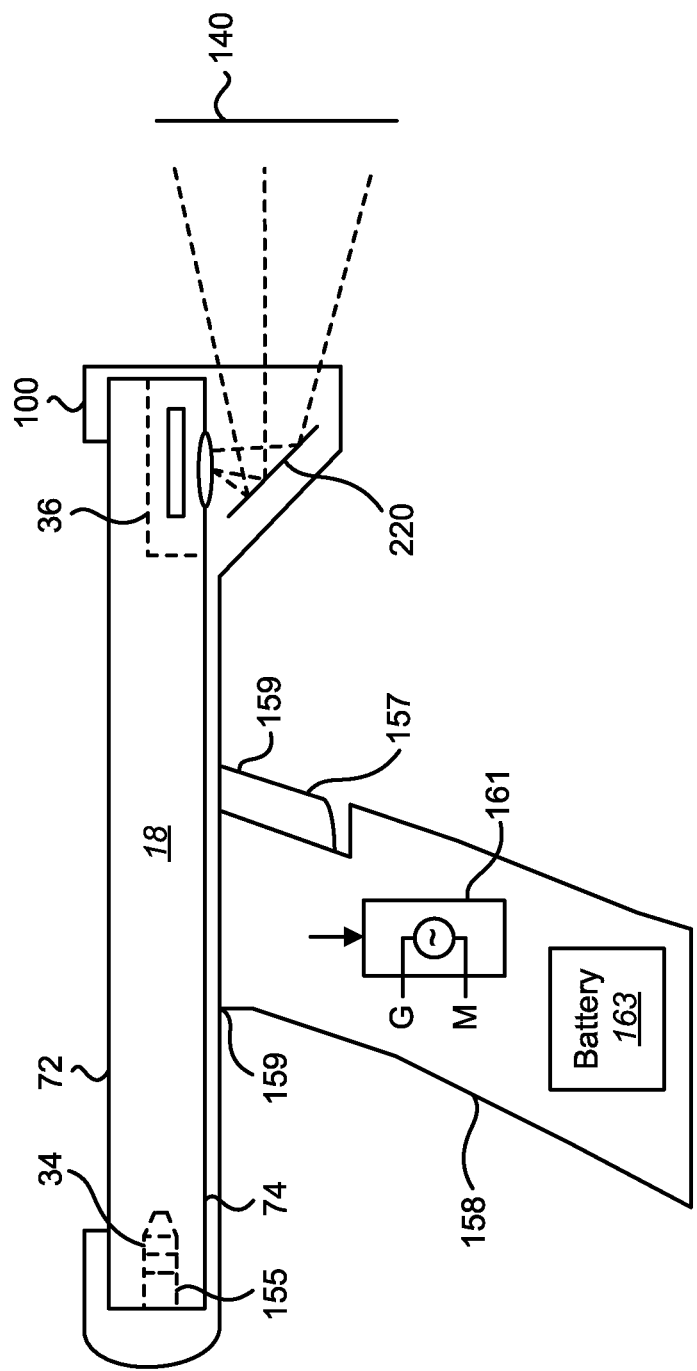
FIG. 14 illustrates an exemplary attachment for a barcode reading enhancement system.

FIG. 14 depicts another exemplary attachment (shown as an encapsulating attachment 100 as an example) for a mobile device 18. The attachment 100 may have a handle 158 which extends downward away from the back surface 74 of the mobile device 18 and is sized and shaped to be gripped by an operator with the operator's thumb and forefinger being positioned at a shoulder 159 where the handle 158 meets a portion of the attachment 100 which is adjacent to the back surface 74 of the mobile device 18. When held in this manner the face surface 72 of the mobile device is visible to an operator looking downward.

A trigger switch 157 is positioned at the shoulder 159 and is intended to enable the operator to trigger reading of a barcode utilizing the same ergonomics of a typical "gun" type of barcode reader. The trigger switch 157 activates a trigger circuit 161.

The attachment 100 includes a microphone connector 155 (shown as a speaker/microphone male connector coupled within the speaker/microphone connector 34 of the mobile device 18).

The trigger circuit 161 includes an oscillator circuit configured to create a potential difference between the ground contact and the microphone contact of the speaker/microphone connector 155 that is detectable by the mobile device 18. The potential difference may be generated by physical movement of a magnet with respect to a coil with such physical movement being generated by pulling the trigger switch 157. A combination of springs and spring-activated switches may accentuate the movement of the magnet with respect to the coil and/or break the circuit to ensure that activation of the trigger switch 157 is detectable by the mobile device 18.

The attachment 100 may also include a structure described with respect to FIG. 10C or 10D for purposes of folding the optical path for illumination reflected from the target area 140 so that the field of view of the camera assembly 36 (e.g. the system field of view) is folded from the back surface 74 of the mobile device towards the target area 140 positioned at the top side of the mobile device 18. The attachment 100 also includes a battery 163 for supplying power to the components in the attachment 100.

Figure 15:
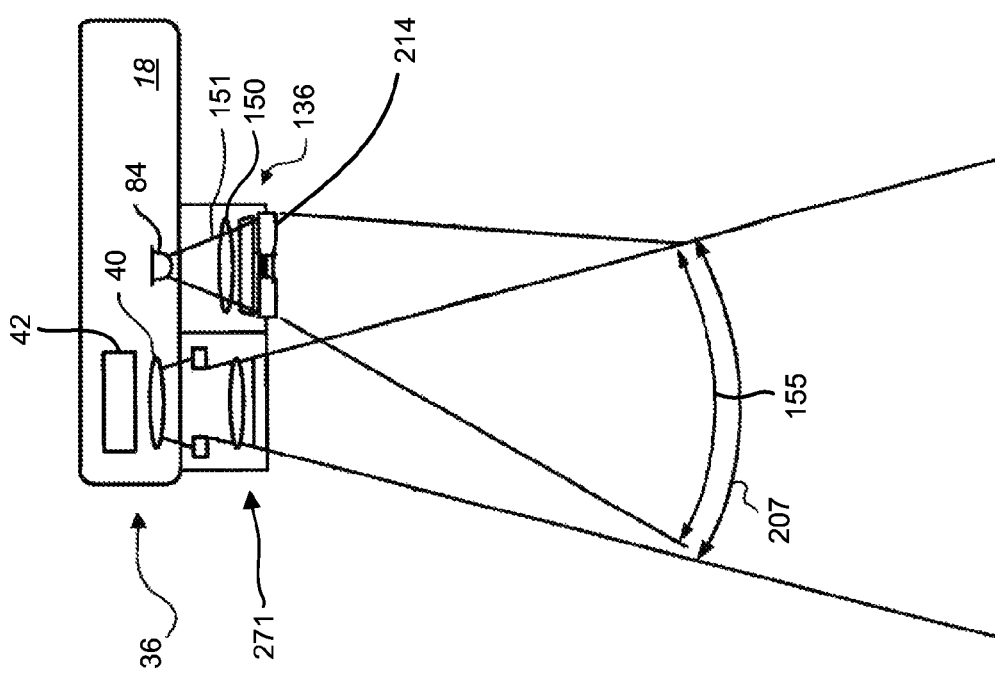
FIG. 15 illustrates an exemplary attachment for a barcode reading enhancement system which includes a target-generating mechanism and supplementary optics.

FIG. 15 illustrates a mobile device 18 with an attachment 20 which may include supplemental optics 271 for image capture and a target-generating mechanism 136 which utilizes the white light source 84 of the mobile device 18 to generate an intense targeting illumination pattern into the target area.

More particularly, the target-generating mechanism 136 may comprise a collimating lens 150 which is positioned within, and modifies, the field of illumination 151 of the white light source 84 into the shape of an intense targeting illumination pattern, which may be a pattern depicted in any of FIG. 8A, 8B, 8C or 8D. The target-generating mechanism 136 may include a filter 214 which may be a band pass filter or a low pass filter as described with respect to FIG. 19C for passing a certain color of illumination while attenuating wavelengths other than the certain color.

In a case where the intense targeting illumination pattern is as depicted in FIG. 8D with diffuse illumination across the field of view, the system illumination field 155 (illumination as modified by the target-generating mechanism 136) may substantially overlap with the system field of view 207.

Thus, with the aid of the target-generating mechanism 136 the system field of view 207 may be effectively illuminated with diffuse illumination and the borders of the diffuse illumination (depicted in FIG. 8D) may enable the user to properly position the mobile device 18 with respect to a barcode in the target area 140.

Figure 19A:
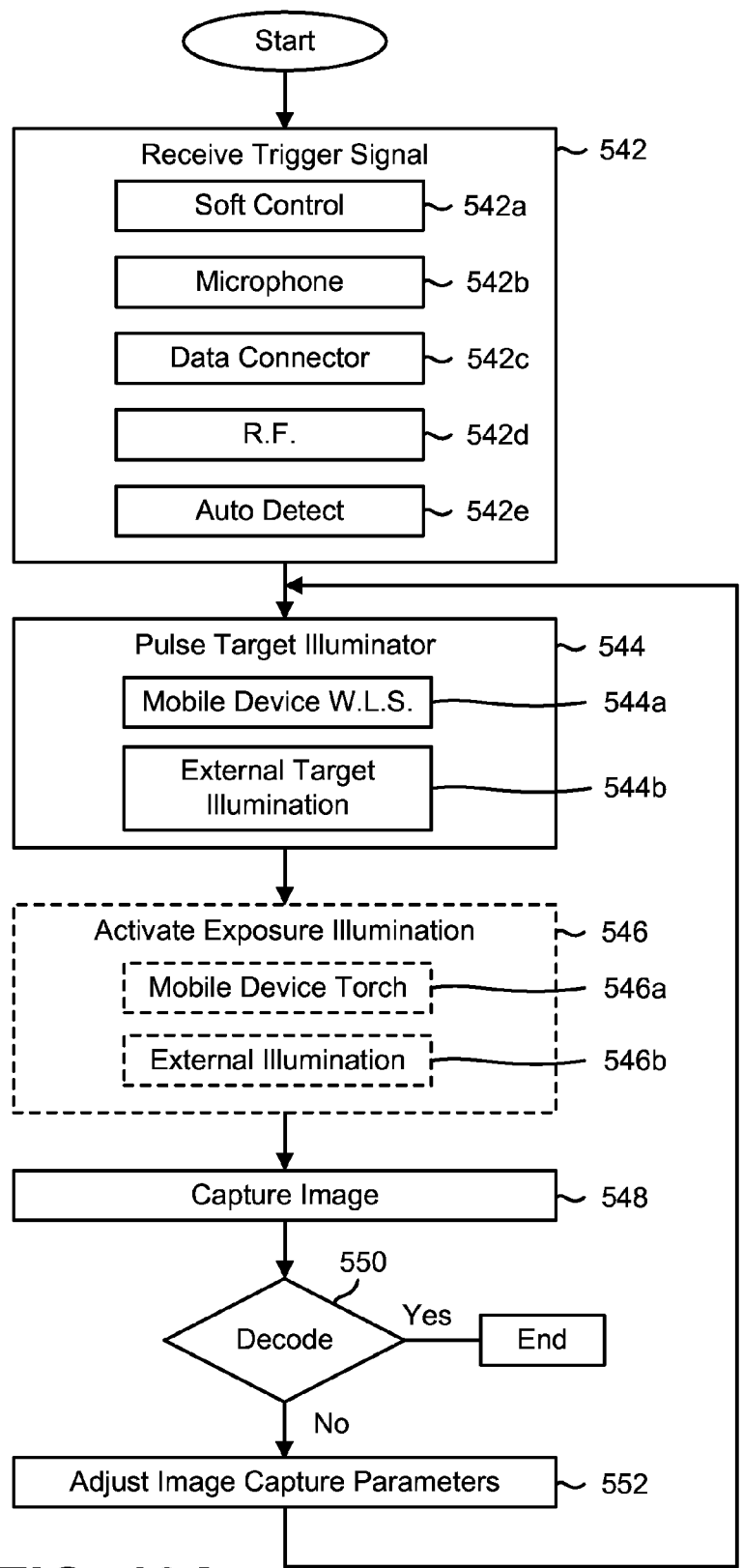
FIG. 19A depicts an exemplary method of target and exposure illumination and shutter control in accordance with one embodiment.
Figure 19B:
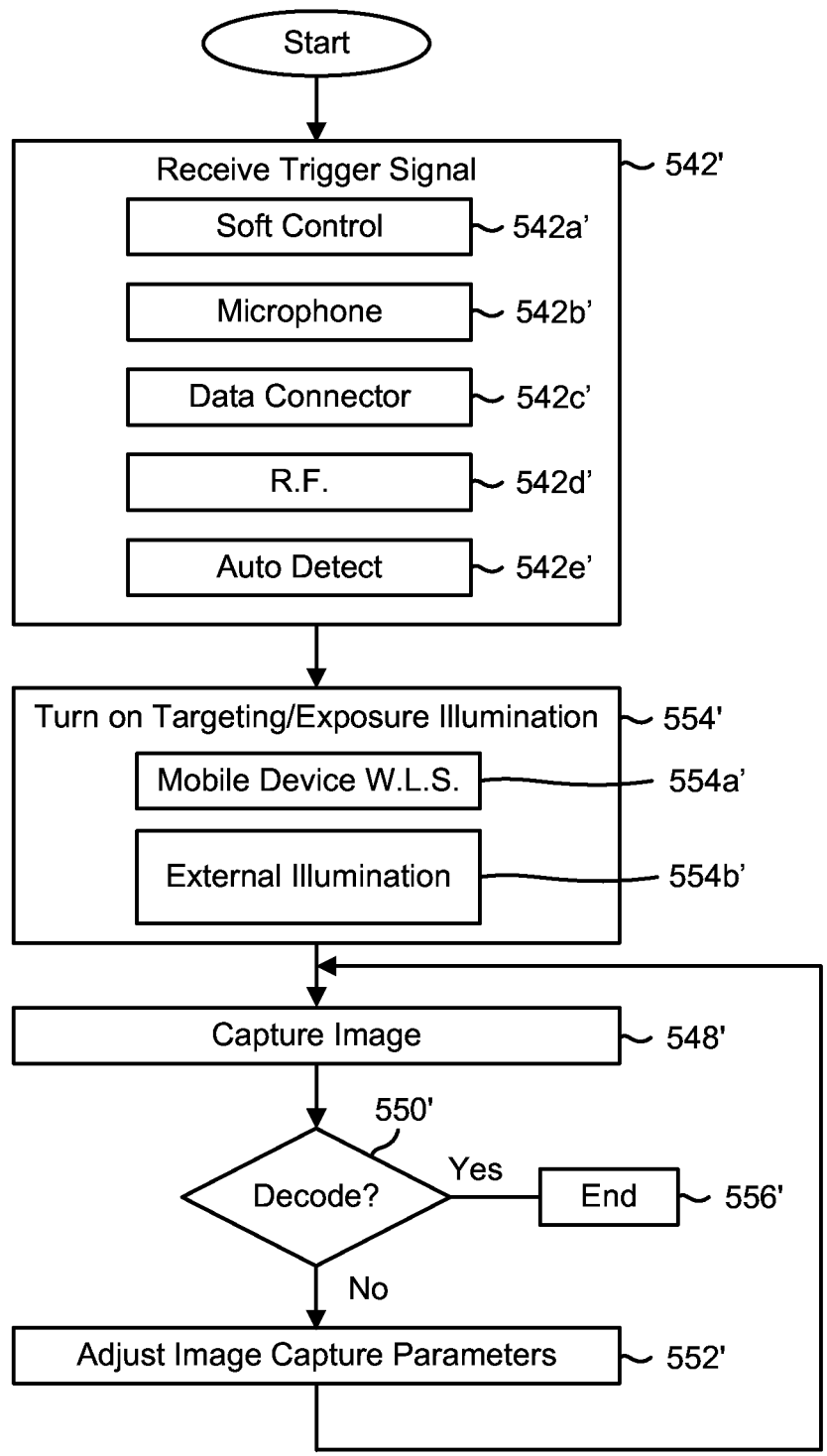
FIG. 19B depicts another exemplary method of target and exposure illumination and shutter control in accordance with another embodiment.
Figure 19C:
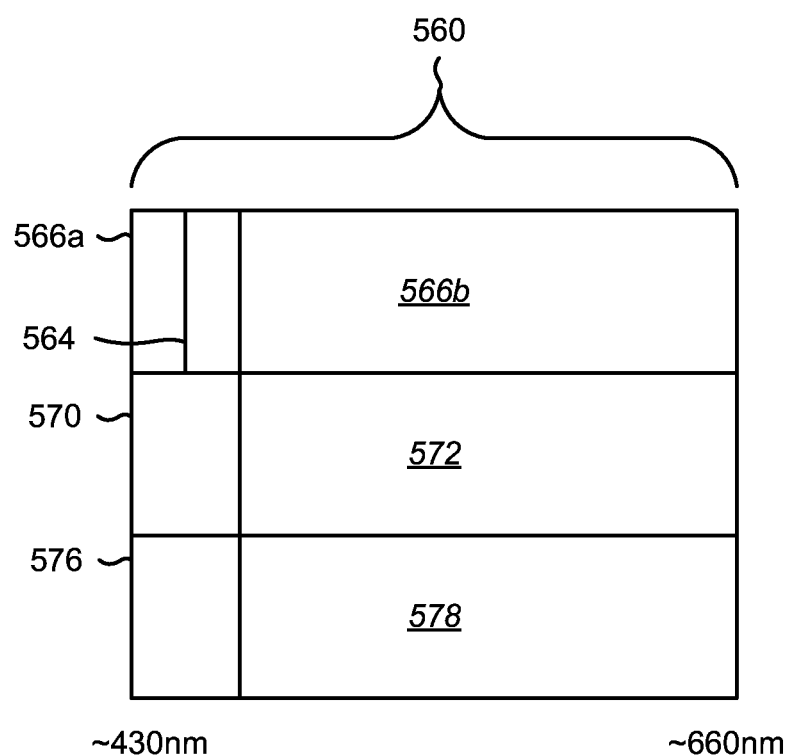
FIG. 19C represents a filtering arrangement for the targeting illumination and the supplemental optics.

In the event the targeting pattern does not provide diffuse illumination across the system field of view 207, the supplemental optics 271 may include a high pass filter described with respect to FIG. 19C such that the illumination of the targeting pattern (as filtered) is attenuated by the high pass filter and does not affect the intensity of the illumination incident on the photo sensor 42.

The barcode reading enhancement system of the present invention may include a barcode application 50 that may be obtained from the application server 16 (shown in FIG. 1) and installed on the mobile device 18 as described with respect to FIG. 3.

Figure 16:
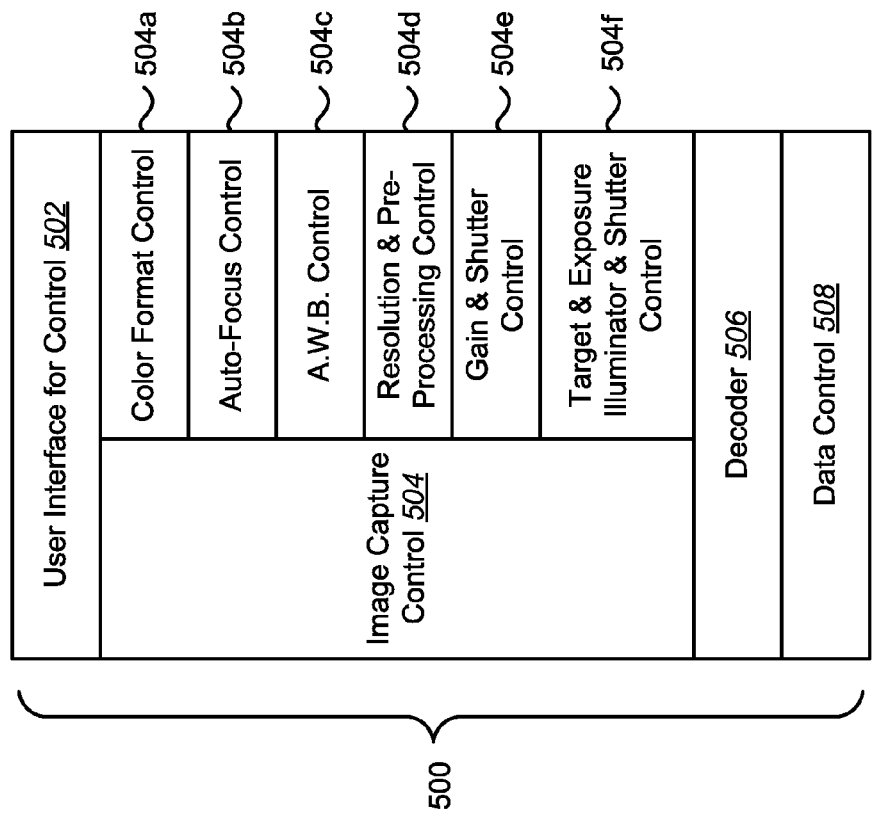
FIG. 16 illustrates exemplary methods useful for an application for a barcode reading enhancement system.

FIG. 16 shows a block diagram of an exemplary barcode application 500. The exemplary barcode application 500 may include permutations of a user interface control method 502, image capture control methods 504, a decoder 506, and a data control method 508.

Figure 17:
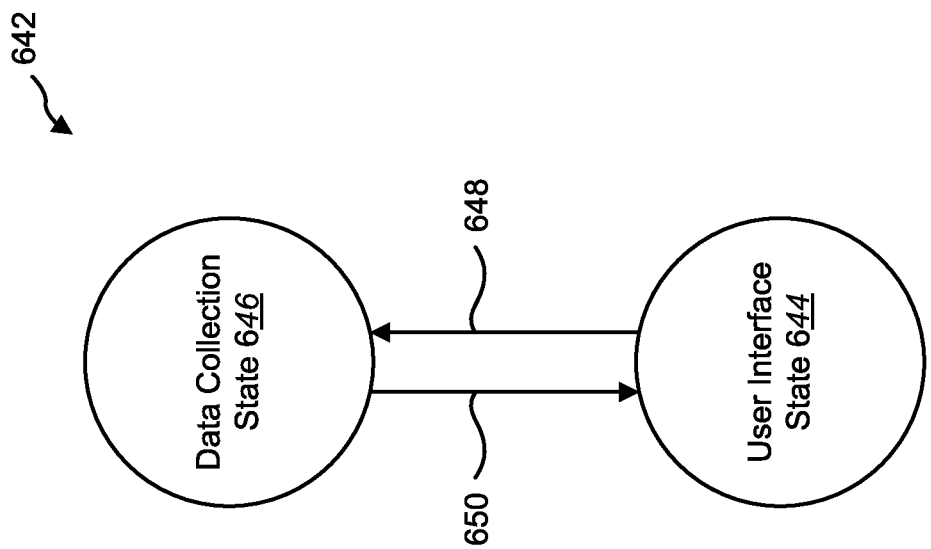
FIG. 17 illustrates an exemplary state machine useful for an application for a barcode reading enhancement system.

FIG. 17 depicts a state machine 642 useful for user interface control methods 502 of the barcode application 500. The state machine 642 may operate either in a user interface state 644 or in a data collection state 646.

When in the user interface state 644, the (capacitive touch) display screen 66 and the backlight for the display screen are active and the contents of the display screen 66 may be controlled by the barcode application 500. When in the data collection state 646, the (capacitive touch) display screen 66 may be turned off; the (capacitive touch) display screen 66 may be turned on, but the backlight may be turned off; or both the (capacitive touch) display screen 66 and the backlight may be turned on, but the backlight intensity may be set to a minimum. The data collection state 646 is intended for conserving power (i.e., for extending battery life) when the operator is using the mobile device 18 to read barcodes and does not need to simultaneously use the (captive touch) display screen 66 for manual data entry.

To transition 648 from the user interface state 644 to the data collection state 646, the barcode application 500 utilizing the data control methods 508 may make a processing call to the operating system of the mobile device 18 requesting to i) turn off the display and backlight; ii) turn off the backlight (in the event the operating system does not make the function of turning off the display available to the application); or iii) turn the backlight power to a minimum (in the event the operating system does not make the function of turning off the display or turning off the backlight available to the application). If none of the foregoing options are available, the barcode application may simply write a black image to the display and enter a state where all input though the touch panel is ignored, thereby giving the appearance that the display has been turned off.

When in the data collection state 646, multiple barcodes can be read in sequence (utilizing the camera and targeting structure described herein but not requiring use of the display for targeting) and processed, stored, and/or transmitted by the application without requiring any user interaction with the user interface. Examples of the functions that may be performed by the application when in the data collection state without requiring user input include the functions of the relay application described in co-pending U.S. patent application Ser. No. 14/319,193, entitled "BAR-CODE READING SYSTEM INCLUDING A SLED READER AND RELAY APPLICATION," filed on Jun. 30, 2014.

When a transition 650 to the user interface state 644 is required, the barcode application 500 may make a processing call to the operating system of the mobile device 18 requesting to i) turn on the display (i.e., the touch panel, backlight) in the event that these are turned off during the data collection state 646; ii) turn on the backlight (in the event the operating system does not make the function of turning off the display available to the application and therefore the display remains "on" while the backlight remains "off" during the data collection state 646); or iii) turn the backlight power up to a present level (in the event the operating system does not make the function of turning off the display or turning off the backlight available to the application both remain "on" during the data collection state 646 while the backlight power has been turned down).

Events that may trigger transition 648 from the user interface state 644 to the data collection state 646 include user activation of a hardware control on the mobile device 18 or activation of a software control present on the display screen when in the user interface state 644. Events that may trigger transition 650 from the data collection state 646 to the user interface state 644 include user activation of a hardware control on the mobile device 18 or a signal from a remote software application which may include the application to which the mobile device 18 is sending decoded barcode data.

Returning to FIG. 16, the image capture control methods 504 may comprise permutations of color format control methods 504a, autofocus control methods 504b, auto-white balance control methods 504c, resolution and pre-processing control methods 504d, gain and shutter control methods 504e, and target and exposure illumination and shutter control methods 504f.

Permutations of these methods may be performed when the barcode application 500 enters the data collection state 646 such that the mobile device 18 is configured for barcode reading prior to the operator triggering or otherwise initiating a barcode read. Permutation of these methods may be performed immediately following an unsuccessful decode with adjustments made to certain image capture settings based on analysis of the image that yielded the unsuccessful decode so that the mobile device 18 is re-configured for barcode reading prior to the next image capture. Permutations of these methods may be performed after the user has triggered or otherwise initiated a barcode read but prior to actual image capture to configure the mobile device 18 for the image capture.

As stated with respect to FIGS. 2A and 2E, the camera assembly 36 may be capable of generating both Y.U.V and R.G.B. color formatted outputs. The color format control methods 504a may query whether the image sensor and/or associated circuitry has been set to provide an output in the Y.U.V. color space. If not, the color format control method 504a may issue a command to the operating system 48, the processor 44, or the system-on-chip circuits 92 to set the image sensor output to the Y.U.V. color space.

The R.G.B. format may commonly be used for general-purpose photography. However, for barcode reading and/or decoding, it may be advantageous to use the Y.U.V. format instead. This is because decoding a barcode image may be mostly reliant upon the pattern defined by the luminous intensity 168 (shown in FIG. 2D) of each pixel in the barcode image. Optionally, the first chromatic 170 and the second chromatic 172 may even be ignored by the application that decodes the barcode image.

Thus, the output module 91 of the system on-chip circuits 92 may be set to provide the output 162 in the form of the Y.U.V. data format 166 (or use Y.U.V data for the input to image processing circuits within the system-on-chip circuits 92). Accordingly, the application 50 may instruct the output module 91, directly, through the operating system 48, or through other control circuitry to cause the output module 91 to provide the digital image output 162, or use for image processing circuits, data in the Y.U.V format when the photo sensor 42 is to be used for capturing a barcode image and return to R.G.B. format for general photography when barcode capturing operations are complete.

In one embodiment, for barcode images, the output module 91 may be set to provide the digital image output 162, or use for image processing, data in the form of the luminous intensity 168 for each pixel, and the first chromatic 170 and the second chromatic 172 may not even be provided or used. This may reduce the traffic on the data bus, reduce image processing time for image processing circuits, reduce the processing load of the processor 44, and/or save space in the image data buffer 89 of the memory 46.

As discussed with respect to FIG. 2A, the mobile device 18 may include an auto focus module 98. The auto focus module 98 may be optimized for photography. The image capture control methods 504 of the application 500 may include auto focus control methods 504b for adjusting the autofocus settings of the auto focus module 98 for barcode image capture. More specifically, the distance between the mobile device 18 and a barcode 142 within a target area 140 may be within a relatively predictable range of distances which is a much smaller ranger of distances between mobile device and the subject of a general purpose photograph. Thus, using customized autofocus settings for barcode image capture may facilitate obtaining proper focus and/or expedite the image capture process.

Figure 18B:
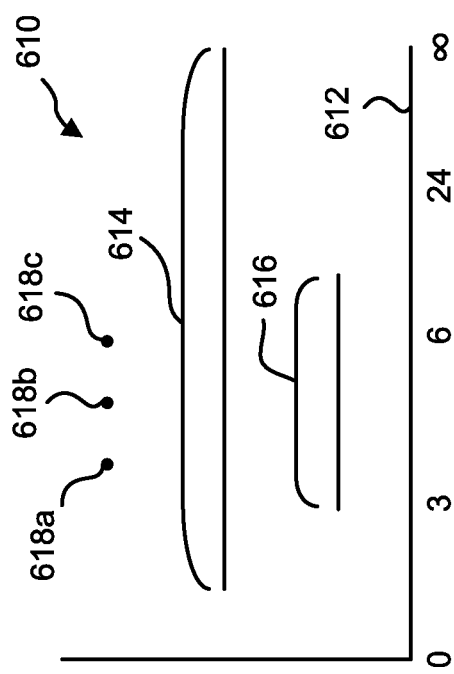
FIG. 18B illustrates exemplary resolution binning methods that can be used to reduce the resolution of a barcode image.
Figure 18A:
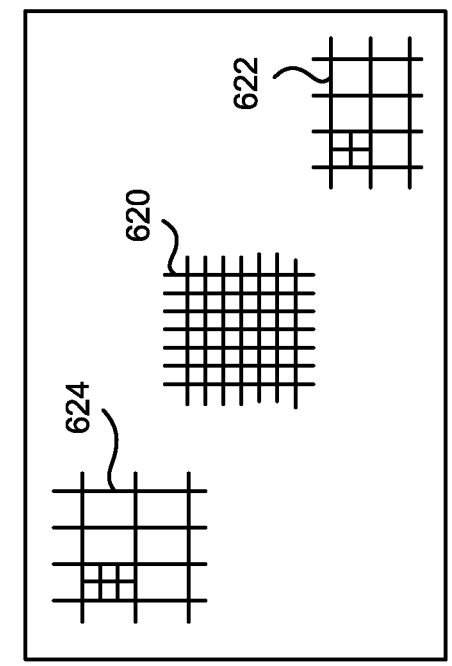
FIG. 18A illustrates exemplary autofocus options.

FIG. 18A illustrates exemplary autofocus options in the form of a graph 610. As shown, a horizontal axis 612 represents a nonlinear continuum of focus positions (object distance that is best focused onto the photo sensor). The camera assembly 36 of the mobile device 18 may have a full range 614 of focus positions. However, those on the upper and lower ends of the full range 614 may not be needed for barcode image capture because they represent object distances which are less than, or greater than, the typical distance between a barcode reader and a barcode. Accordingly, the autofocus settings of the camera assembly 36 may be configured specifically for barcode image capture, for example, via commands to the autofocus module 98 (or the operating system 48 controlling the autofocus module 98).

By way of example, the commands to the autofocus module 98 (or operating system 48) may allow the camera assembly 36 to focus at object distances within a limited range 616. The limited range 616 may represent the useful range of object distances for barcode image capture, and exclude object distances too close to the mobile device 18 and object distances too far from the mobile device 18 for barcode reading.

As another example, the commands to the autofocus module 98 (or the operating system 48) may limit focus positions to discrete positions such as a first position 618a, a second position 618b, and a third position 618c. The first position 618a, the second position 618b, and the third position 618c may represent useful object distances for barcode image capture. The optic system may have sufficient depth of field at each of the discrete positions to accommodate image capture of a barcode within the target area 140 with sufficient sharpness for decoding.

Setting auto focus to one of a plurality of discrete focus settings may utilize a feedback-loop algorithm that is faster than the feedback-loop algorithms for auto focus when performing photography wherein the image is analyzed for sharpness and best focus position is determined within the entire range.

As discussed with respect to FIG. 2A, the system-on-chip circuits 92 may include an auto-white balance module 93. As such the auto-white balance control methods 504c of the application 500 (shown in FIG. 16) may issue a command to the operating system 48, the processor 44, or the auto-white balance module 93 to disable the auto-white balance function of the image sensor and/or associated circuitry. This may be done, as indicated previously, to avoid degrading contrast when a narrow band of illumination frequency is focused onto the image sensor for barcode reading.

As such, for barcode images, the output module 91 may be set to provide the digital image output 162, or use for image processing, data that has not been subjected to modification by the disabled auto-white balance module 93.

The resolution and pre-processing control methods 504d may control the resolution for the output image as well as other image processing which may be performed on the output image prior to storing in the image data buffer 89 for decoding. Speed enhancements for image processing and decoding may be obtained by altering the resolution of the captured image. While high resolution images (e.g. 8 megapixels or more) may be desirable for conventional photography, this resolution may not be needed for barcode imaging and decoding. As long as the resolution is sufficient for successful decoding of a barcode, there is typically no need for an image of greater resolution.

Selection of the resolution may be done, for example, based on the type of barcode to be scanned, the size of the barcode within the output image, and other factors, which may be determined from previous images captured of the barcode. The resolution selected may be full resolution (i.e., one output pixel for each pixel captured by the image sensor) or binned (i.e., one output pixel for each group of x pixels captured by the image sensor).

FIG. 18B illustrates exemplary resolution binning methods that can be used to reduce the resolution of a barcode image. An exemplary image may be captured, by way of example, in three different ways. In a first scheme 620, no binning may be applied, and the image output may be the native resolution (full resolution) of the photo sensor 42 (one digital pixel value for each pixel captured by the photo sensor 42). In a second scheme 622, moderate binning may be applied so that the output has one digital pixel value, for example, for every four pixels captured by the photo sensor 42. The resulting output image data may thus be one-quarter of the resolution of the captured image data. In a third scheme 624, more aggressive binning may be applied so that the output has one digital pixel value, for example, for every six pixels captured by the photo sensor 42. The resulting output image data may thus be vertical binning (non-square) and one-sixth of the resolution of the captured image data.

When binning is applied, various mathematical algorithms may be used to obtain the value of an output pixel, based on its constituent pixels of the captured image. According to some examples, the intensity values of the constituent pixels may be averaged to provide the value of the resulting output pixel.

The foregoing description is illustrative of certain imaging processing that may be performed on image data while being transferred through the hardware circuits 90 and DMA 86 to the image data buffer 89. A more complete description of image processing algorithms that may be implemented in the hardware circuits 90 (or the system-on-chip circuits 92) is included in U.S. patent application Ser. No. 14/717,112, entitled "BARCODE READER," filed on May 20, 2015. In the exemplary embodiment, the image resolution and pre-processing control methods 504d of the barcode application 500 may provide instructions to the hardware circuits 90, the system-on-chip circuits 92, and/or the operating system to set any of the foregoing image pre-processing options as well as image pre-processing options described in the Ser. No. 14/171,112 application.

In all cases, setting the resolution and image pre-processing selections may entail the resolution and pre-processing control methods 504d issuing a command to the operating system 48, the processor 44, the applicable image processing circuits within the hardware circuits 90, or the applicable image processing circuits within the system-on-chip circuits 92.

Gain and shutter control methods 504e may comprise setting image capture parameter values for one or more image frames to be sequentially captured, including a gain setting and an exposure setting for each frame as described in more detail in the Ser. No. 14/171,112 application.

FIG. 19A depicts an exemplary embodiment of target and exposure illumination and shutter control methods 504f in accordance with one embodiment. Step 542 represents receiving a trigger signal indicating that a barcode is to be read. The trigger signal may be received in several alternative ways as represented by steps 542a-542e. As discussed, the barcode application 500 may have a user interface (not shown) with one or more graphical elements displayed on the display screen 66. The user may use such graphical elements to initiate the barcode scanning process (for example, by tapping a "scan" soft button on the display screen 66) (542a).

Alternatively, the application may monitor the microphone input 34b and the trigger signal may be a microphone input signal generated by the attachment as described with respect to FIG. 14 (542b).

Alternatively, the application may monitor the data connector 64b and the trigger signal may be a data input signal generated by the attachment as described with respect to FIG. 13 (542c).

Alternatively, the application may monitor the wireless communication system 52 and the trigger signal may be a wireless (RF) trigger signal generated by the attachment (542d).

Alternatively the application may monitor the target area 140 utilizing a sensor and the trigger signal may be automatically generated by the application detecting the presence of a barcode within the target area 140 (542e).

Step 544 represents pulsing the target illumination to generate a distinct illumination pattern within the target area 140 to assist the operator in aiming the mobile device 18 with respect to the barcode for image capture. The pulse may be generated for a duration sufficient for the operator to aim the mobile device 18 or may be a shorter period of time (on the order of 10 ms). As discussed, the target illumination may be generated by the white light source 84 of the mobile device 18 (step 544a) or may be an external target illumination source (step 544b) within the attachment.

Step 546 represents a step of activing the exposure illumination. In certain embodiments ambient illumination is used for providing diffuse illumination for image capture of a barcode. In these embodiments step 546 may not be performed. In other embodiments the exposure illumination may be activated for image capture (step 546). As discussed, the exposure illumination may be generated by the white light source 84 of the mobile device 18 (step 546a) or may be an external exposure illumination source (step 546b) within the attachment. The barcode image is then captured (step 548).

Step 550 represents determining whether there has been a successful decode of the barcode represented in the captured image. If it has been successful, then the method may end. If there has not been a successful decode, the image capture parameters may be adjusted at step 552 and the target illumination system may again be pulsed to further assist the user in aiming the mobile device 18 with respect to the barcode at step 544. It is recognized that several repeats of this process may be required for: i) the operator to properly aim the mobile device 18 with respect to the barcode (if the target illumination pulse is short), and ii) the operator to have a correct combination of image capture parameters such that the resulting image is decodable.

FIG. 19B depicts another exemplary embodiment of target and exposure illumination and shutter control methods 504f' in accordance with another embodiment. Some of the steps in FIGS. 19A and 19B are the same and such steps will not be explained in detail for simplicity.

Step 542' (i.e., any one of 542a' to 542e') represents receiving a trigger signal indicating that a barcode is to be read.

Step 554' represents turning on a combination of targeting and exposure illumination. As discussed with respect to FIG. 8D, the intense targeting illumination pattern 400 may include diffuse illumination across a region that coincides with the system field of view 207 such that the targeting illumination is also the exposure illumination. As discussed, the targeting and exposure illumination may be generated by the white light source 84 of the mobile device 18 (step 554a') or may be an external illumination source within the attachment (step 554b').

Step 548' represents image capture of a barcode, step 550' represents determining whether there was a successful decode, and step 552' represents adjusting image capture parameters based on the previous image captured all as discussed with respect to FIG. 19A. If there is a successful decoding the targeting exposure illumination may be turned off at step 556'. If the decoding is not successful another image of the barcode may be captured (step 548') following adjustment of image capture parameters (step 552') if any.

FIG. 19C represents a filtering arrangement for the targeting illumination and the supplemental optics which enable use of the methods of FIG. 19B even if the intense targeting illumination pattern is not also a diffuse illumination pattern across the entire barcode within the field of view.

The visible illumination spectrum 560 generally ranges from about 430 nm to approximately 660 nm. In a first embodiment the targeting illumination structure may include a first narrow band pass filter which passes a narrow band of illumination 564 within the visible spectrum 560 while attenuating illumination with wavelengths 566a below the narrow band 564 and wavelengths 566b above the narrow band 564. In an exemplary embodiment, the first narrow band pass filter may have its narrow band 564 centered at a wavelength between 430 nm and 470 nm which are the wavelengths corresponding to blue illumination. When such a filter is used to filter white illumination, the color of the intense targeting illumination passed by the filter appears blue.

In another embodiment, a first low pass filter passes wavelengths of illumination 570 which are within the visible spectrum 560 below a predetermined threshold while attenuating illumination with wavelengths 572 above the threshold. In an exemplary embodiment, the predetermined threshold may be between 470 nm and 500 nm such that the passed illumination spectrum 570 is substantially blue. When such a filter is used to filter white illumination, the color of the illumination passed by the filter appears blue.

Although the first narrow band pass filter is depicted as having very distinct edges (e.g. wavelengths within the band are passed with no attenuation and wavelengths outside the band are completely attenuated) it is recognized in the art that the edges are not as distinct as depicted, and some illumination within the narrow band 564 will be attenuated and some illumination outside of the narrow band 566*a* and 566*b* will be passed. A most efficient filter will minimize the amount of illumination within the narrow band 564 that is attenuated and further minimize the amount of illumination that is outside of the narrow band 566*a* and 566*b* to be passed.

Similarly, although the low pass filter is depicted as having a very distinct edge at the threshold (e.g. wavelengths below the threshold are passed with no attenuation and wavelengths above the threshold are completely attenuated) it is recognized in the art that the edge is not as distinct as depicted, and some illumination within the pass band 570 will be attenuated and some illumination 572 above the pass band will be passed. A most efficient filter will minimize the amount of illumination within the pass band 570 that is attenuated and further minimize the amount of illumination 572 that is outside of the pass band 570 to be passed.

In other embodiments a second filter may be a high pass filter. The high pass filter passes wavelengths of illumination 578 which are within the visible spectrum 560 above a predetermined threshold while attenuating illumination with wavelengths 576 below the threshold. In an exemplary embodiment, the predetermined threshold may be 500 nm such that the passed illumination spectrum 570 includes the entire visible spectrum excluding illumination which is substantially blue.

As with the low pass filter, the high pass filter is depicted as having a very distinct edge at the threshold (e.g. wavelengths above the threshold are passed with no attenuation and wavelengths below the threshold are completely attenuated) it is recognized in the art that the edge is not as distinct as depicted, and some illumination above the threshold will be attenuated and some illumination below the threshold will be passed. A most efficient filter will minimize the amount of illumination above the threshold that is attenuated and further minimize the amount of illumination below the threshold that is passed.

It should be appreciated that when illumination from a white light source 84 of a mobile device 18 is filtered utilizing the narrow band pass filter (a passing band 564) or the low pass filter (a passing band 570) such that it appears blue and the illumination incident on the camera lens is filtered by a high pass filter (a passing band 478 while attenuating blue illumination), the illumination generated by the white light source 84, as filtered, may not be visible to the camera because the portion of the illumination passed by the band pass filter (band 564) or the low pass filter (band 570) is attenuated by the high pass filter. As such, if the white light source 84 is used for generating an intense targeting illumination pattern within the field of view 207, the targeting pattern may not be visible to the camera (attenuated by the high pass filter) and ambient illumination passed by the high pass filter (band 578) is visible to the camera and is typically sufficient for imaging and decoding a barcode.

This structure enables the accessory to further utilize optics to generate a targeting pattern utilizing the white light source 84 (filtered before or after being shaped by the optic) and enables the intense targeting illumination pattern to continue to illuminate the barcode during image capture (enabling the operator to aim the mobile device 18 with respect to the barcode) without the targeting pattern being visible to the camera and producing hot regions (intense illumination) corresponding to the targeting pattern within the image.

Returning to FIG. 16, the decoder 506 of the barcode application 500 may comprise known methods for image processing and decoding, including methods described in U.S. patent application Ser. No. 14/717,112. As discussed with respect to FIGS. 19A and 19B, if decoding is unsuccessful, then a new barcode image may need to be captured. This may be done by returning to the image capture control methods 504 and selecting new image capture parameters. This process may be repeated until the barcode image has been successfully decoded, or until the user cancels further image capture and/or decoding attempts.

In general the data control methods 508 of the barcode application 500 control what processes are performed on data decoded from the barcode 142 (decoded data) within the target area 140. In more detail, and with reference to FIG. 1, in a first aspect the data control methods 508 may function as a mobile client to a remote non-legacy system 22 which supports maintaining a Transmission Control Protocol/Internet Protocol (TCP/IP) connection with mobile devices (such as mobile device 18) via the network 12 for exchanging data with the mobile device 18 (including receiving decoded data from the mobile device 18) and controlling operation of certain aspects of the barcode application 500.

In a second aspect, the data control methods 508 may function as a mobile client to an intermediary device 24. The intermediary device 24 supports maintaining a TCP/IP connection with mobile devices (such as mobile device 18) via the network 12 for receiving decoded data from the mobile device 18. In turn the intermediary device may further support providing decoded data received from the mobile device 18 to a legacy system 26 via a connection 15. This is useful when the legacy system 26 is incapable of receiving decoded data directly from the mobile device 18 via a TCP/IP connection and therefore the application 500 may function independently of, and requires no compatibility with, the communication protocols and functions of the legacy system 26, including those used for communication between the legacy system 26 and the intermediary device 24. The intermediary device 24 may communicate with the legacy system 26 via a connection 15, which may be a TCP/IP connection separate from the TCP/IP connection through which the mobile device 18 communicates with the intermediary device 24.

Figure 20A:
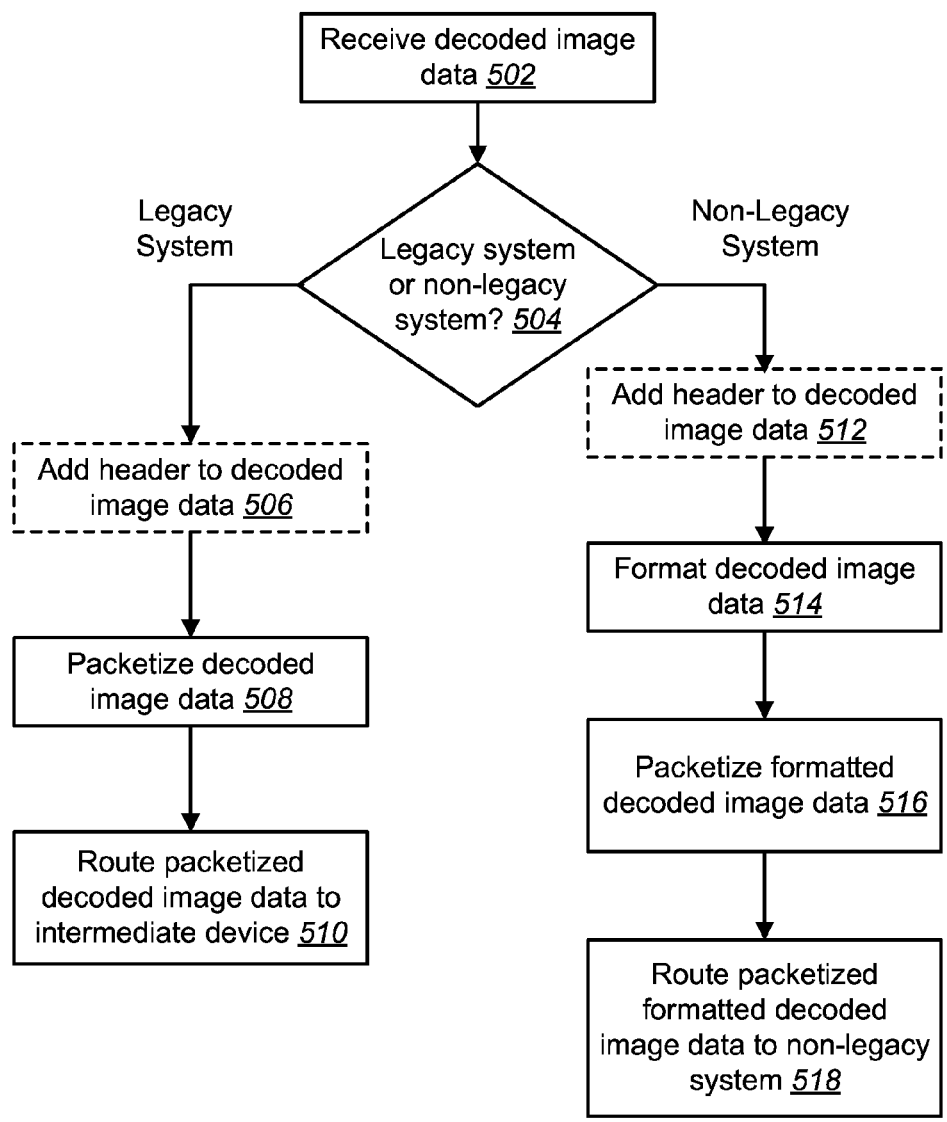
FIGS. 20A and 20B illustrate methods and systems useful for an application for a barcode reading enhancement system.
Figure 20B:
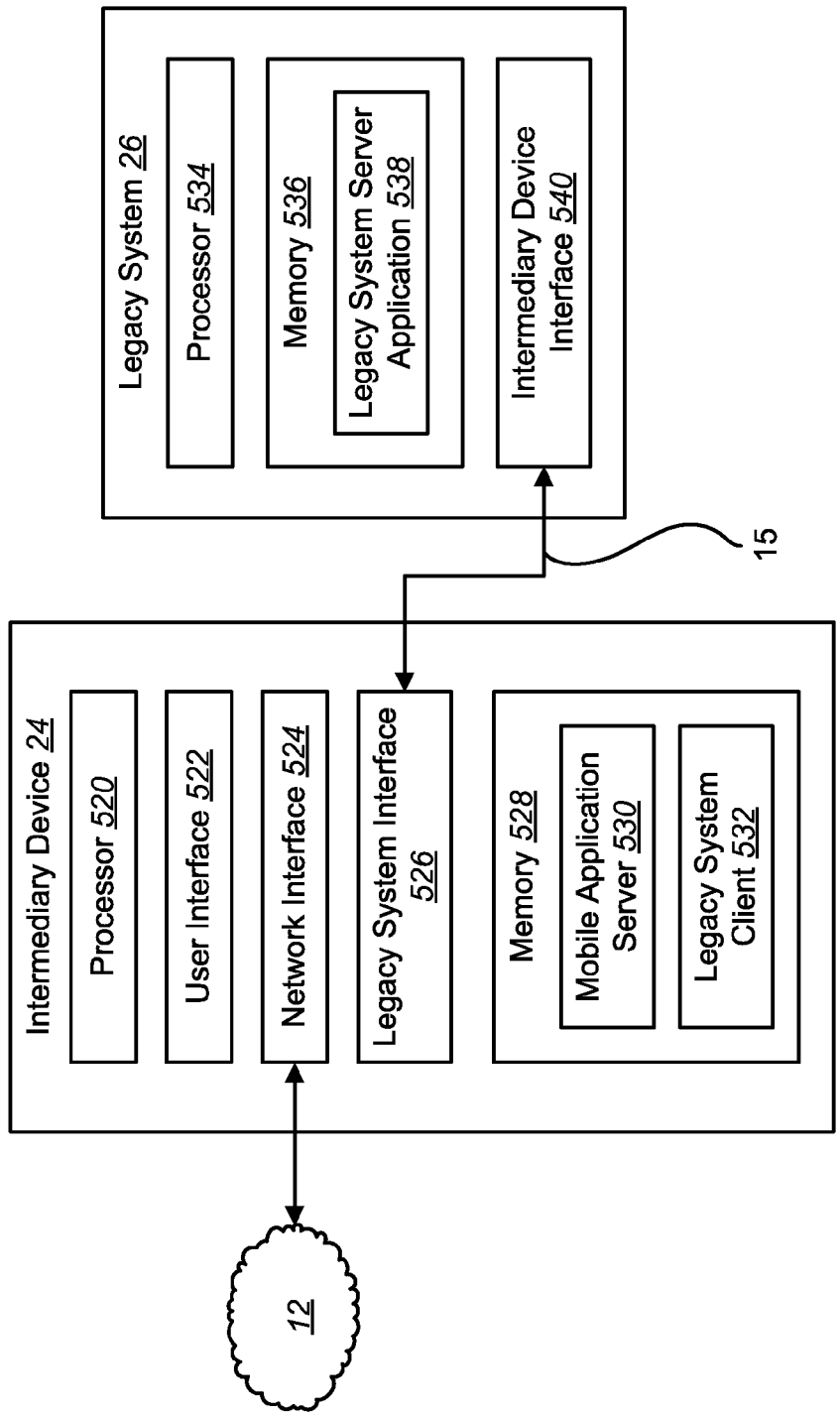

FIGS. 20A-20B illustrate methods useful for an application for a barcode reading enhancement system. Referring to FIG. 20A, in operation, step 502 represents that the data control methods 508 receive decoded image data from the decoder (or a separate barcode reader within the accessory 20).

Decision block 504 represents determining if the received decoded data is intended for the legacy system 26 or the non-legacy system 22 operating on the mobile device 18. The decision may be predetermined. For example, one application may be configured to operate as a mobile client to the non-legacy system 22 (application 50a for example) and as such the method 508 may be configured to send the decoded data to the non-legacy system 22 as part, and formatted as part, of the exchange of data between the non-legacy system 22 and the application 50a in its ordinary course of operation.

As another example, another application may be configured to operate as a relay application (application 50b for example) and as such the method 508 may be configured to send the decoded data as plain text to the intermediary device 24 (e.g. relay the decoded data directly to the intermediary device 24 without substantive processing by the application 50b).

If the received decoded data is intended for the legacy system 26, a header may be added to the decoded data at step 506 and, at step 508, the decoded data may be packetized for TCP/IP transmittal to the intermediary device 24 as described above. At step 510 the packetized decoded data is sent to the intermediary device 24. As described above, upon receiving the decoded data, the intermediary device 24 transfers the decoded data to the legacy system 26.

Alternatively, if the received decoded data is intended for the non-legacy system 22, a header may be optionally added to the decoded data at step 512 as described above. Step 514 represents formatting the decoded data or otherwise processing the decode data within the application 50a. Step 516 represents packetizing the formatted decoded data for transmission to the non-legacy system 22 via TCP/IP and, at step 518, the packetized formatted decoded data is sent to the non-legacy system 22.

Referring to FIG. 20B, the intermediary device 24 may include a user interface 522 such as a display and a keyboard, a network interface 524, a legacy system interface 526, a processor 520, and memory (i.e. a non-transient computer readable medium) 528 storing a legacy system client application 532 and a mobile application server 530.

The network interface 524 may include hardware and software components to implement a TCP/IP stack and a hard wired (e.g. Ethernet) or wireless connection to the network 12 to establish the TCP/IP connection with the mobile device 18 and enable communication between the mobile application server 530 and the corresponding client application 50b operating on the mobile device 18, including receiving decoded data from the client application 50b operating on the mobile device 18.

The legacy system interface 526 enables communication between the legacy system client 532 and the legacy application (server) 538 operating on the legacy system 26. The legacy system interface 526 may, in certain embodiments wherein communication between the intermediary device 24 and the legacy system 26 is via TCP/IP, be the same component as network interface 524. In other embodiments the legacy system interface 526 may implement a proprietary communication link with a corresponding intermediary device interface 540 of the legacy system 26. It should be noted that even if TCP/IP is used for communication between the intermediary device 24 and the legacy system 26, the legacy system may still not be accessible by the mobile device 18 via a TCP/IP connection.

In the exemplary embodiment, the processor 520 executing the legacy system client 532 drives a work flow (e.g. a menu managed sequence of text and/or graphic display forms displaying data and data entry fields for user input of data) on the user interface 522 to facilitate a user performing tasks within, for example, a healthcare, commercial, or other work environment. More specifically, the legacy application 538 may provide information regarding the tasks to the processor 520 operating the legacy system client 532 which renders the information to the user on the user interface 522. The user interface 522, under control of the processor 520 executing the legacy system client 532, may include data entry fields for user input of data related to the tasks which are subsequently sent to the legacy system 26.

In the exemplary embodiment, the processor 520 executing the mobile application server 530 operates in response to receiving decoded data from the client application 50b operating on the mobile device 18 and provides the decoded data to the legacy system client 532. More specifically, the processor 520 executing the mobile application server 530 receives the decoded data from the mobile device 18 and places the decoded data, in plain text form, within the data entry field at which a cursor (not shown) is then currently positioned within the legacy system client 532. In certain embodiments, the mobile application server 530 may add certain formatting to the plain text image data, such as adding a carriage return character, to automatically advance the cursor to a next data entry field upon entry of the decoded data.

The legacy system 26 may include an intermediary device interface 540, a processor 534, and memory (i.e. a non-transient computer readable medium) 536 storing the legacy server application 538 executable by the processor 534.

In embodiments where the legacy system 26 communicates with the intermediary device 24 via TCP/IP the intermediary device interface 540 may include hardware and software components to implement a TCP/IP stack and a hard wired (e.g. Ethernet) or wireless connection to a network to establish a TCP/IP connection with the intermediary device 24. In other embodiments the intermediary device interface 540 may implement a proprietary communication link with the legacy system interface 526 of the intermediary device 24.

The processor 534 executing the legacy system server application 538 may execute workflows that: i) drive the presentation of forms with fields via the legacy system client 532 operating on the intermediary device 24 (e.g. thick client/server architecture); and ii) store and manage data input to the legacy system client 532, including both data input by keyboard and decoded data input to the legacy system client 532 via the mobile application server 530.

As discussed, the legacy system 26 is not capable of interfacing directly with an application 500 written for a mobile device 18 and is not capable of receiving decoded data via a TCP/IP connection such as WI-FI directly from the mobile device 18. Rather, the legacy system 526 may receive data via communication with the legacy system client application 532 operating on the intermediary device 24 via a connection 15.

The foregoing discussion describes various methods which may be implemented in applications 50 operating on the mobile device 18. It should be appreciated that there may be multiple applications 50 operating on the mobile device 18 and each of the multiple applications 50 may utilize different permutations of the methods described. As an example, one application may provide decoded data to a legacy system and a separate application may provide decoded data to a non-legacy system.

What is claimed is:

1. A barcode reading system for a mobile device, the mobile device comprising a camera for capturing an image of a field of view, a microphone input connector embodied in an audio jack, a memory and a processor for executing an operating system and applications stored in the memory, the barcode reading system comprising:

a barcode reading enhancement accessory secured to the mobile device, the barcode reading enhancement accessory comprising a user-activated barcode read control and circuitry for generating a barcode read signal on the microphone input connector of the mobile device in response to user activation of the barcode read control, wherein the circuitry comprises a magnet and a conductor, and wherein the user activation of the barcode read control moves the magnet with respect to the conductor to generate or modify a potential differential between a microphone contact and a ground contact of the audio jack; and a barcode reading application stored in the memory and executable by the processor, the barcode reading application including an image capture and decode function for controlling the camera to capture an image of a barcode within the field of view of the camera and generating decoded data representing data encoded in the barcode in response to the barcode read signal on the microphone input connector.

2. The barcode reading system of claim 1, wherein:

the microphone input connector is embodied in a four-contact audio jack, the four-contact audio jack comprising the ground contact, a left speaker contact, a right speaker contact, and the microphone contact; and the barcode reading enhancement accessory comprises a mating audio jack configured to be inserted into the four-contact audio jack of the mobile device when the barcode reading enhancement accessory is secured to the mobile device, and when inserted into the four-contact audio jack, the mating audio jack comprises at least a ground contact coupled to the ground contact of the four-contact audio jack and a microphone contact coupled to the microphone contact of the four-contact audio jack.

3. The barcode reading system of claim 1, wherein:

the barcode reading enhancement accessory comprises a gun-shaped case for the mobile device and includes a handle extending downward from a back side of the mobile device, the back side of the mobile device being parallel to an upward-facing face side of the mobile device, the face side including a display screen; and the user-activated barcode read control comprises a trigger switch positioned where the handle meets a portion of the case adjacent to the back side of the mobile device.

4. The barcode reading system of claim 3, wherein:

the field of view of the camera of the mobile device is to the back side of the mobile device; and the barcode reading enhancement accessory further comprises an optic system with a first reflective surface for folding the field of view of the camera towards a target area positioned at a top side of the mobile device.

5. The barcode reading system of claim 4, wherein:

the mobile device further includes a white light source for projecting a field of illumination towards the back side of the mobile device; and the optic system further includes a second reflective surface for folding the field of illumination of the white light source towards the target area.

6. The barcode reading system of claim 5, wherein the optic system further includes a target-generating structure for modifying the field of illumination of the white light source to emit a targeting pattern of illumination into the target area.

7. The barcode reading system of claim 6, wherein the optic system further includes an illumination filter positioned within the field of illumination of the white light source for passing a portion of a spectrum of the illumination from the white light source, the targeting pattern being of a color corresponding to the portion of the spectrum passed by the illumination filter.

8. The barcode reading system of claim 7, wherein the illumination filter is a narrow band filter for passing a narrow band of the spectrum and attenuating portions of the spectrum to each side of the narrow band.

9. The barcode reading system of claim 7, wherein the optic system further includes a camera filter positioned within the field of view of the camera for passing a portion of a spectrum of illumination reflected from objects within the target area, the camera filter attenuating the portion of the spectrum passed by the illumination filter.

10. The barcode reading system of claim 6, wherein the target-generating structure comprises an optical component for narrowing the field of illumination of the white light source in at least one direction.

11. The barcode reading system of claim 10, wherein the target-generating structure is configured to narrow the field of illumination of the white light source to a divergence angle in the at least one direction that is approximately the same as a divergence angle of the field of view of the camera.

12. The barcode reading system of claim 11, wherein the target-generating structure is further configured to narrow the field of illumination of the white light source in a second direction, orthogonal to a first direction, to a divergence angle approximately the same as the divergence angle of the field of view of the camera in the second direction.

13. A method of reading a barcode utilizing a mobile device, the mobile device comprising a camera for capturing an image of a field of view, a microphone input connector embodied in an audio jack, a memory and a processor for executing an operating system and applications stored in the memory, and the method comprising:

directing the operating system to obtain a barcode reading application from a remote application server and to install the barcode reading application in the memory for execution by the processor;

securing a barcode reading enhancement accessory to the mobile device, the barcode reading enhancement accessory comprising:

a user-activated barcode read control; and circuitry for generating a barcode read signal on the microphone input connector of the mobile device in response to user activation of the barcode read control, wherein the circuitry comprises a magnet and a conductor, and wherein the user activation of the barcode read control moves the magnet with respect to the conductor to generate or modify a potential differential between a microphone contact and a ground contact of the audio jack; and executing the barcode reading application by the processor to capture an image of the barcode within the field of view and generate decoded data representing data encoded in the barcode in response to the barcode read signal on the microphone input connector.

14. The method of claim 13, wherein:

the microphone input connector is embodied in a four-contact audio jack, the four-contact audio jack comprising the ground contact, a left speaker contact, a right speaker contact, and the microphone contact; and the barcode reading enhancement accessory comprises a mating audio jack configured to be inserted into the four-contact audio jack of the mobile device when the barcode reading enhancement accessory is secured to the mobile device, and when inserted into the four-contact audio jack, the mating audio jack comprises at least a ground contact coupled to the ground contact of the four-contact audio jack and a microphone contact coupled to the microphone contact of the four-contact audio jack.

15. The method of claim 13, wherein:
the barcode reading enhancement accessory comprises a gun-shaped case for the mobile device and includes a handle extending downward from a back side of the mobile device, the back side of the mobile device being parallel to an upward-facing face side of the mobile device, the face side including a display screen; and
the user-activated barcode read control comprises a trigger switch positioned where the handle meets a portion of the case adjacent to the back side of the mobile device.

16. The method of claim 15, wherein:
the field of view of the camera of the mobile device is to the back side of the mobile device; and
the barcode reading enhancement accessory further comprises an optic system with a first reflective surface for folding the field of view of the camera towards a target area positioned at a top side of the mobile device.

17. The method of claim 16, wherein:
the mobile device further includes a white light source projecting a field of illumination towards the back side of the mobile device; and
the optic system further includes a second reflective surface for folding the field of illumination of the white light source towards the target area.

18. The method of claim 17, wherein the optic system further includes a target-generating structure for modifying the field of illumination of the white light source to emit a targeting pattern of illumination into the target area.

19. The method of claim 18, wherein the optic system further includes an illumination filter positioned within the field of illumination of the white light source and for passing a portion of a spectrum of the illumination from the white light source, the targeting pattern being of a color corresponding to the portion of the spectrum passed by the illumination filter.

20. The method of claim 19, wherein the illumination filter is a narrow band filter for passing a narrow band of the spectrum and attenuating portions of the spectrum to each side of the narrow band.

21. The method of claim 19, wherein the optic system further includes a camera filter positioned within the field of view of the camera and passing only a portion of a spectrum of illumination reflected from objects within the target area, the camera filter attenuating the portion of the spectrum passed by the illumination filter.

22. The method of claim 18, wherein the target-generating structure comprises an optical component for narrowing the field of illumination of the white light source in at least one direction.

23. The method of claim 22, wherein the target-generating structure is configured to narrow the field of illumination of the white light source to a divergence angle in the at least one direction that is approximately the same as a divergence angle of the field of view of the camera.

24. The method of claim 23, wherein the target-generating structure is further configured to narrow the field of illumination of the white light source in a second direction, orthogonal to a first direction, to a divergence angle approximately the same as the divergence angle of the field of view of the camera in the second direction.

25. A barcode reading enhancement accessory secured to a mobile device, the mobile device comprising a camera having a field of view to a backside of the mobile device, a microphone input connector embodied in an audio jack, a memory and a processor for executing an operating system and a barcode read application stored in the memory, the barcode read application utilizing the camera to capture an image of, and decode, a barcode and the barcode reading enhancement accessory comprising:
a user-activated barcode read control; and
circuitry for generating a barcode read signal on the microphone input connector of the mobile device in response to user activation of the barcode read control, wherein the circuitry comprises a magnet and a conductor, and wherein the user activation of the barcode read control moves the magnet with respect to the conductor to generate or modify a potential differential between a microphone contact and a ground contact of the audio jack.

26. The barcode reading enhancement accessory of claim 25, wherein:
the microphone input connector is embodied in a four-contact audio jack, the four-contact audio jack comprising the ground contact, a left speaker contact, a right speaker contact and the microphone contact; and
the barcode reading enhancement accessory comprises a mating audio jack configured to be inserted into the four-contact audio jack of the mobile device when the barcode reading enhancement accessory is secured to the mobile device, and when inserted into the four-contact audio jack, the mating audio jack comprises at least a ground contact coupled to the ground contact of the four-contact audio jack and a microphone contact coupled to the microphone contact of the four-contact audio jack.

27. The barcode reading enhancement accessory of claim 25, comprising:
a gun-shaped case for the mobile device; and
a handle extending downward from a back side of the mobile device, the back side of the mobile device being parallel to an upward-facing face side of the mobile device, the face side including a display screen, wherein the user-activated barcode read control comprises a trigger switch positioned where the handle meets a portion of the case adjacent to the back side of the mobile device.

28. The barcode reading enhancement accessory of claim 27, wherein:
the field of view of the camera of the mobile device is to the back side of the mobile device; and
the barcode reading enhancement accessory further comprises an optic system with a first reflective surface for folding the field of view of the camera towards a target area positioned at a top side of the mobile device.

29. The barcode reading enhancement accessory of claim 28, wherein:
the mobile device further includes a white light source for projecting a field of illumination towards the back side of the mobile device; and
the optic system further includes a second reflective surface for folding the field of illumination of the white light source towards the target area.

30. The barcode reading enhancement accessory of claim 29, wherein the optic system further includes a target-generating structure for modifying the field of illumination of the white light source to emit a targeting pattern of illumination into the target area.

31. The barcode reading enhancement accessory of claim 30, wherein the optic system further includes an illumination filter positioned within the field of illumination of the white light source for passing a portion of a spectrum of the illumination from the white light source, the targeting pattern being of a color corresponding to the portion of the spectrum passed by the illumination filter.

32. The barcode reading enhancement accessory of claim 31, wherein the illumination filter is a narrow band filter for passing a narrow band of the spectrum and attenuating portions of the spectrum to each side of the narrow band.

33. The barcode reading enhancement accessory of claim 31, wherein the optic system further includes a camera filter positioned within the field of view of the camera for passing a portion of the spectrum of illumination reflected from objects within the target area, the camera filter attenuating the portion of the spectrum passed by the illumination filter.

34. The barcode reading enhancement accessory of claim 30, wherein the target-generating structure comprises an optical component for narrowing the field of illumination of the white light source in at least one direction.

35. The barcode reading enhancement accessory of claim 34, wherein the target-generating structure is configured to narrow the field of illumination of the white light source to a divergence angle in the at least one direction that is approximately the same as a divergence angle of the field of view of the camera.

36. The barcode reading enhancement accessory of claim 35, wherein the target-generating structure is further configured to narrow the field of illumination of the white light source in a second direction, orthogonal to a first direction, to a divergence angle approximately the same as the divergence angle of the field of view of the camera in the second direction.

* * * * *